(12) United States Patent
Farkas et al.

(10) Patent No.: US 12,272,967 B2
(45) Date of Patent: Apr. 8, 2025

(54) AUTOMATICALLY-ALIGNING MAGNETIC FIELD SYSTEM

(71) Applicant: The Alfred E. Mann Foundation for Scientific Research, Valencia, CA (US)

(72) Inventors: Leslie G. Farkas, Ventura, CA (US); Brian R. Dearden, Pasadena, CA (US); Justin Cheng-Tsu Loo, San Marino, CA (US)

(73) Assignee: The Alfred E. Mann Foundation for Scientific Research, Valencia, CA (US)

( * ) Notice: Subject to any disclaimer, the term of this patent is extended or adjusted under 35 U.S.C. 154(b) by 53 days.

(21) Appl. No.: 18/179,821

(22) Filed: Mar. 7, 2023

(65) Prior Publication Data

US 2023/0299620 A1    Sep. 21, 2023

Related U.S. Application Data

(60) Provisional application No. 63/321,554, filed on Mar. 18, 2022.

(51) Int. Cl.
| | | |
|---|---|---|
| *H02J 50/40* | (2016.01) | |
| *H02J 50/12* | (2016.01) | |
| *H02J 50/70* | (2016.01) | |
| *H02J 50/80* | (2016.01) | |
| *H02J 50/90* | (2016.01) | |

(52) U.S. Cl.
CPC ............ *H02J 50/402* (2020.01); *H02J 50/12* (2016.02); *H02J 50/70* (2016.02); *H02J 50/80* (2016.02); *H02J 50/90* (2016.02)

(58) Field of Classification Search
CPC .......... H02J 50/402; H02J 50/80; H02J 50/90; H02J 50/12; H02J 50/70

USPC ......................................................... 307/104
See application file for complete search history.

(56) References Cited

U.S. PATENT DOCUMENTS

| | | | |
|---|---|---|---|
| 6,504,369 B1 | 1/2003 | Varjo et al. | |
| 7,126,450 B2 | 10/2006 | Baarman et al. | |
| 7,286,881 B2 | 10/2007 | Schommer et al. | |
| 7,525,283 B2 | 4/2009 | Cheng et al. | |

(Continued)

FOREIGN PATENT DOCUMENTS

| | | |
|---|---|---|
| EP | 3018797 A1 | 5/2016 |
| KR | 2014 0129930 A | 11/2014 |

(Continued)

OTHER PUBLICATIONS

International Search Report and Written Opinion from related International Application PCT/US2023/063871, dated Jun. 21, 2023, 19 pages.

(Continued)

*Primary Examiner* — Alfonso Perez Borroto
(74) *Attorney, Agent, or Firm* — Womble Bond Dickinson (US) LLP

(57) ABSTRACT

A wireless power transfer system includes a wireless power transfer device. The wireless power transfer device includes a first transmitting coil oriented along a first axis; a second transmitting coil on the first transmitting coil and oriented along a second axis different from the first axis; and a nonmagnetic material magnetically decoupling the first transmitting coil from the second transmitting coil in an area of overlap between the first and second transmitting coils.

28 Claims, 31 Drawing Sheets

(56) References Cited

U.S. PATENT DOCUMENTS

| | | | |
|---|---|---|---|
| 8,138,875 B2 | 3/2012 | Baarman et al. | |
| 8,460,816 B2 | 6/2013 | Julstrom et al. | |
| 9,855,436 B2 | 1/2018 | Dearden et al. | |
| 9,962,085 B2 | 5/2018 | Griffith | |
| 10,348,116 B2 | 7/2019 | Arendarik | |
| 10,374,460 B2 | 8/2019 | Oshima et al. | |
| 10,403,979 B2 | 9/2019 | Ryu et al. | |
| 10,566,853 B2 | 2/2020 | Chen | |
| 10,650,963 B2 | 5/2020 | Hanabusa et al. | |
| 10,811,186 B2 | 10/2020 | Hanabusa et al. | |
| 10,960,219 B2 | 3/2021 | Aghassian et al. | |
| 11,192,276 B2 | 12/2021 | Lopatin et al. | |
| 2003/0090434 A1 | 5/2003 | Masudaya | |
| 2011/0046438 A1 | 2/2011 | Iwaisako | |
| 2011/0084654 A1 | 4/2011 | Julstrom et al. | |
| 2012/0153893 A1 | 6/2012 | Schtaz et al. | |
| 2012/0169139 A1 | 7/2012 | Kudo | |
| 2012/0235501 A1 | 9/2012 | Masudaya | |
| 2012/0306282 A1* | 12/2012 | Tan | H02J 50/12 307/104 |
| 2013/0093253 A1 | 4/2013 | Norconk et al. | |
| 2013/0241308 A1* | 9/2013 | Bilbrey | H02J 50/10 307/104 |
| 2014/0002015 A1* | 1/2014 | Tripathi | B60L 3/0069 320/108 |
| 2014/0111151 A1* | 4/2014 | Keeling | B60L 53/122 320/108 |
| 2014/0232330 A1 | 8/2014 | Robertson et al. | |
| 2015/0188365 A1 | 7/2015 | Wang et al. | |
| 2015/0326060 A1* | 11/2015 | Young | H02J 50/80 320/108 |
| 2016/0134126 A1 | 5/2016 | Tillotson et al. | |
| 2016/0365737 A1 | 12/2016 | Vladan | |
| 2017/0018971 A1 | 1/2017 | Oshima et al. | |
| 2017/0202467 A1 | 7/2017 | Zitnik | |
| 2017/0222483 A1 | 8/2017 | Feng et al. | |
| 2017/0352475 A1 | 12/2017 | Ishida | |
| 2017/0354344 A1 | 12/2017 | Schmale et al. | |
| 2018/0019624 A1 | 1/2018 | Chen | |
| 2018/0048177 A1 | 2/2018 | Huang et al. | |
| 2018/0212451 A1* | 7/2018 | Schmidt | H02J 50/80 |
| 2018/0254671 A1 | 9/2018 | Murata et al. | |
| 2018/0262037 A1 | 9/2018 | Meskens | |
| 2018/0286578 A1 | 10/2018 | Hanabusa et al. | |
| 2018/0287435 A1 | 10/2018 | Wilson et al. | |
| 2018/0358815 A1 | 12/2018 | Li et al. | |
| 2019/0089187 A1 | 3/2019 | Konomi | |
| 2019/0214851 A1 | 7/2019 | Sasaki et al. | |
| 2019/0247669 A1* | 8/2019 | Nielsen | H02J 50/10 |
| 2019/0263057 A1 | 8/2019 | Beetz | |
| 2019/0308514 A1 | 10/2019 | Parimi et al. | |
| 2019/0311848 A1 | 10/2019 | Chen et al. | |
| 2019/0331937 A1 | 10/2019 | Owens et al. | |
| 2019/0331938 A1 | 10/2019 | Owens et al. | |
| 2019/0348863 A1 | 11/2019 | De Masi et al. | |
| 2019/0393710 A1 | 12/2019 | Kim et al. | |
| 2020/0027653 A1 | 1/2020 | Terauchi et al. | |
| 2020/0076241 A1 | 3/2020 | Tandai et al. | |
| 2020/0136435 A1 | 4/2020 | Mitomo et al. | |
| 2020/0204013 A1 | 6/2020 | Chen | |
| 2021/0001131 A1 | 1/2021 | Lyer et al. | |
| 2021/0027928 A1 | 1/2021 | Patel | |
| 2021/0083634 A1 | 3/2021 | Aldhaher | |
| 2021/0152027 A1 | 5/2021 | Kanakasabai et al. | |
| 2022/0060057 A1 | 2/2022 | Hao et al. | |
| 2023/0077596 A1 | 3/2023 | Hurwitz et al. | |

FOREIGN PATENT DOCUMENTS

| | | |
|---|---|---|
| WO | WO2012/166126 A1 | 12/2012 |
| WO | WO 2021/031444 A1 | 2/2021 |
| WO | WO 2023/177996 A1 | 9/2023 |

OTHER PUBLICATIONS

International Search Report and Written Opinion issued in related International Application No. PCT/US2021/057772, mailed Feb. 8, 2022, 12 pages.

Finkenzeller, Klaus, "Battery powered tags for ISO/IEC 14443, actively emulating load Modulation", *RFID SysTech 2011 7th European Workshop on Smart Objects: Systems, Technologies and Applications*(2011), retrieved from http://www.rfid-handbook.de/downloads/Active-load-modulation_Finkenzeller_20110413_final.pdf (retrieved on Mar. 7, 2022), 8 pages.

Written Opinion issued in related International Application No. PCT/US2021/057772, date of mailing Jun. 30, 2022, 6 pages.

Zhangwei Chen et al., 3D printing of ceramics: A review, Journal of the European Ceramic Society, Nov. 6, 2018, 27 pages.

Thomas Hanemann et al., 3D Printing of ABS Barium Ferrite Composites, Materials, Mar. 24, 2020, 13 pages.

Lanbing Liu et al., UV-curable Ferrite Paste for Additive Manufacturing of Power Magnetics, IEEE Magnetics Letters, 2018, 5 pages.

Maria Väätäjä et al., 3D printed dielectric ceramic without a sintering stage, Scientific Reports, Oct. 29, 2018, 8 pages.

Yunqi Wang et al., 3D Printing of NiZn ferrite/ABS Magnetic Composites for Electromagnetic Devices, Cambridge University Press, Jul. 1, 2015, 5 pages.

International Preliminary Report on Patentability issued in related International Application No. PCT/US2021/057772, date of mailing Mar. 6, 2023, 6 pages.

Final Rejection issued in U.S. Appl. No. 18/153,991 on Sep. 23, 2024.

International search Report and Written Opinion issued in related International Application No. PCT/US2023/060586, Apr. 21, 2023 (13 pages).

\* cited by examiner

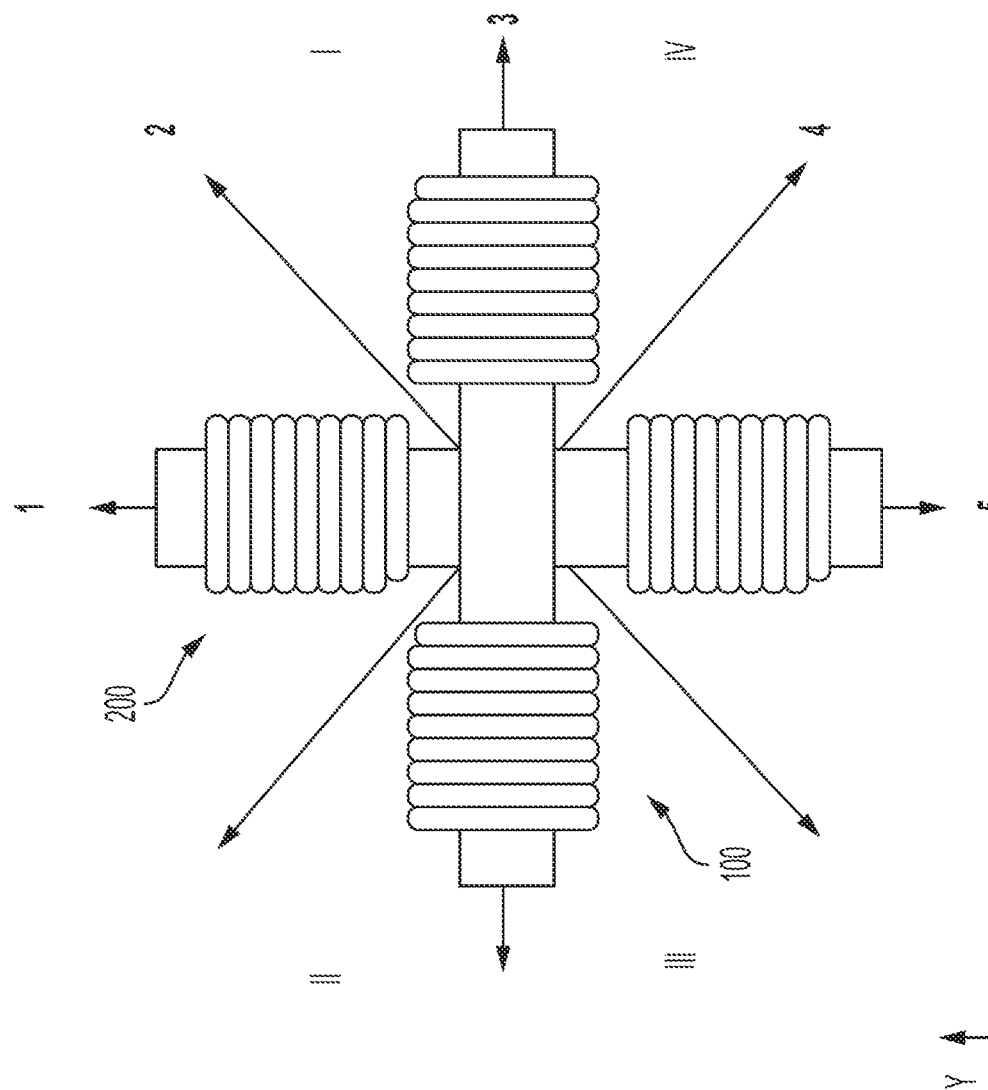

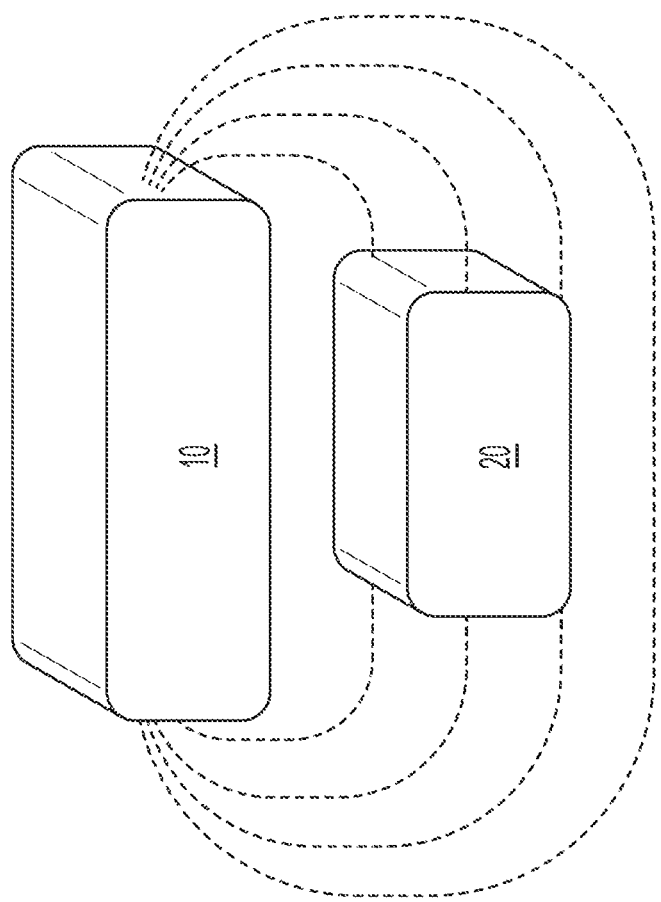

AUTOMATICALLY-ALIGNING MAGNETIC FIELD SYSTEM

CROSS-REFERENCE TO RELATED APPLICATIONS

This application claims priority to, and the benefit of, U.S. Provisional Application No. 63/321,554, filed on Mar. 18, 2022, the entire content of which is hereby incorporated by reference.

This application is related to U.S. Non-provisional application Ser. No. 17/517,518, filed on Nov. 2, 2021, the entire content of which is hereby incorporated by reference.

BACKGROUND

1. Field

The present disclosure relates to a wireless power transfer device configured to generate a magnetic field and control a direction of the magnetic field.

2. Description of the Related Art

A primary coil may be driven with AC current to generate an oscillating magnetic field, and the magnetic field can generate a current in a secondary coil in proximity to the primary coil via electromagnetic induction. Electromagnetic induction can be utilized to wirelessly transfer energy and is utilized in one or more suitable industries and devices such as electric vehicles, medical devices, and electronic devices. The magnitude of the current generated in the secondary coil, and thus the effectiveness of the primary coil in transferring energy to the secondary coil, depends on how aligned the magnetic field is with the secondary coil. However, in related art devices, the primary coil cannot control the direction of the magnetic field, and improving alignment between the magnetic field with the secondary coil requires physically moving and/or orientating the primary coil or the secondary coil, which may be inconvenient and cumbersome. The primary coil in related art devices also generates a magnetic field that generates eddy currents in electronic components in the proximity of the primary coil, thereby reducing the efficiency of the primary coil to transfer energy to the secondary coil.

SUMMARY

The present disclosure relates to one or more suitable embodiments of a wireless power transfer system.

In one embodiment, the wireless power transfer system includes a wireless power transfer device, the wireless power transfer device including: a coil assembly, including: a first transmitting coil oriented along a first axis, a second transmitting coil on the first transmitting coil and oriented along a second axis different from the first axis, and a nonmagnetic material magnetically decoupling the first transmitting coil from the second transmitting coil in an area of overlap between the first and second transmitting coils; and an electronics assembly, including at least one electronic component.

In one embodiment, the wireless power transfer system includes a wireless power transfer device, the wireless power transfer device including: a first transmitting coil oriented along a first axis; a second transmitting coil on the first transmitting coil and oriented along a second axis different from the first axis; a nonmagnetic material magnetically decoupling the first transmitting coil from the second transmitting coil in an area of overlap between the first and second transmitting coils; and at least one electronic component in a magnetic field shallow zone angularly positioned in a plan view between a portion of the first transmitting coil extending in the plan view from the area of overlap and a portion of the second transmitting coil extending in the plan view from the area of overlap.

In one embodiment, the wireless power transfer system includes a wireless power transfer device, the wireless power transfer device including: a first transmitting coil oriented along a first axis; a second transmitting coil on the first transmitting coil and oriented along a second axis different from the first axis; a nonmagnetic material magnetically decoupling the first transmitting coil from the second transmitting coil in an area of overlap between the first and second transmitting coils; a first LC resonant circuit corresponding to the first transmitting coil; and a second LC resonant circuit corresponding to the second transmitting coil.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter.

BRIEF DESCRIPTION OF THE DRAWINGS

The accompanying drawings, together with the specification, illustrate example embodiments of the present disclosure. These drawings, together with the description, serve to better explain aspects and principles of the present disclosure.

FIG. 5A shows a plan view of first and second transmitting coils of a wireless power transfer device according to some embodiments and the direction of a magnetic field generated by the first and second transmitting coils pursuant to five states in which the first and second transmitting coils may be driven.

FIG. 6B shows a schematic side view of the wireless power transfer system of FIG. 6A with the wireless power transfer device above the electronic device.

DETAILED DESCRIPTION

Figure 1:
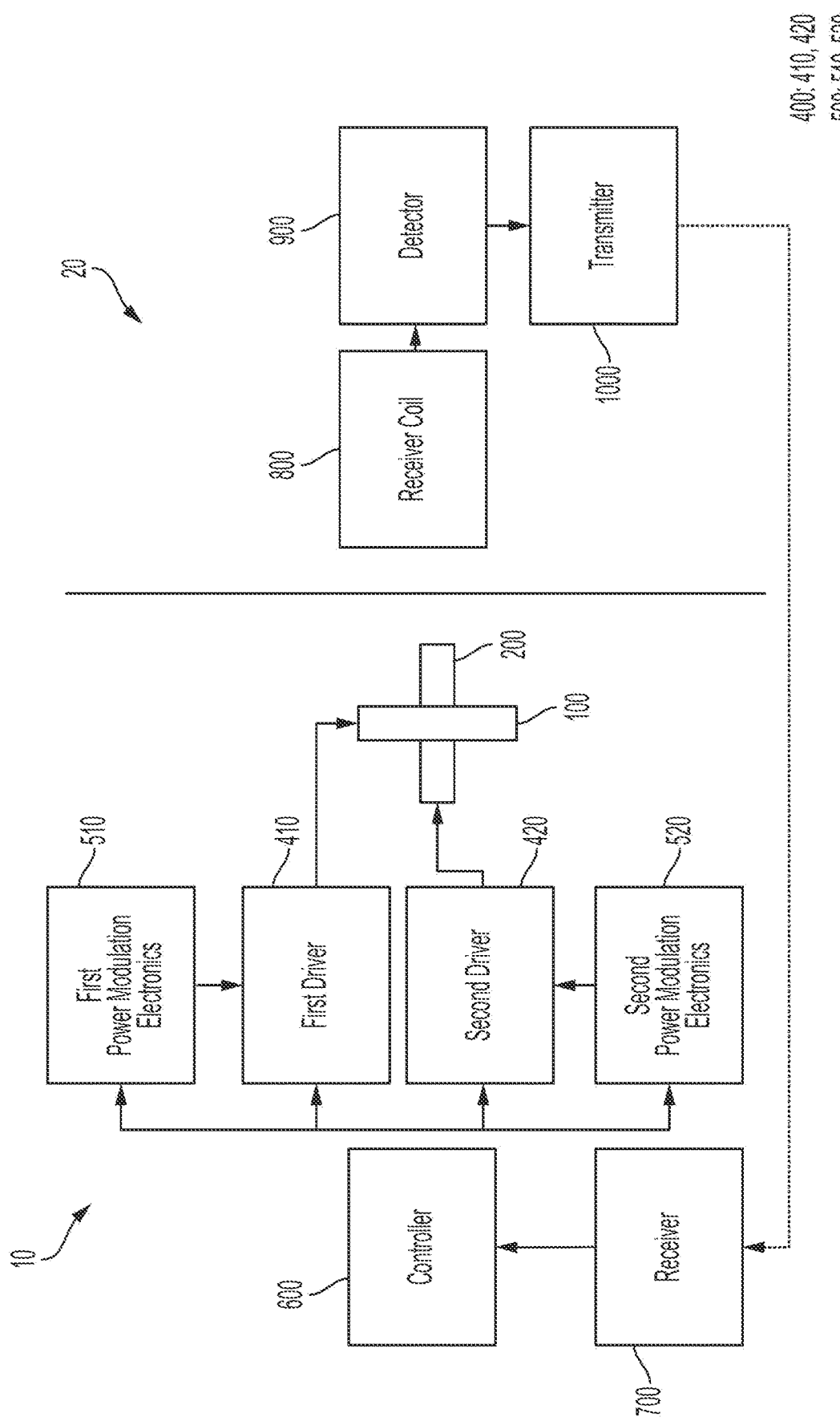
FIG. 1 shows a schematic view of a wireless power transfer system according to some embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. As used herein, the term "and/or" includes any and all combinations of one or more of the associated listed items.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the present disclosure.

It will be understood that when an element or layer is referred to as being "on", "connected to", "coupled to", or "adjacent to" another element or layer, it can be directly on, connected to, coupled to, or adjacent to the other element or layer, or one or more intervening element(s) or layer(s) may be present. In contrast, when an element or layer is referred to as being "directly on," "directly connected to", "directly coupled to", or "immediately adjacent to" another element or layer, there are no intervening elements or layers present.

As used herein, the term "substantially" and similar terms are used as terms of approximation and not as terms of degree, and are intended to account for the inherent deviations in measured or calculated values that would be recognized by those of ordinary skill in the art. Also, the terms "about," "approximately," and similar terms, when used herein in connection with a numerical value or a numerical range, are inclusive of the stated value and mean within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Example embodiments of the present disclosure will now be described with reference to the accompanying drawings. In the drawings, the same or similar reference numerals refer to the same or similar elements throughout. As used herein, the use of the term "may," when describing embodiments of the present disclosure, refers to "one or more embodiments of the present disclosure."

FIG. 1 schematically illustrates a wireless power transfer system according to some embodiments. The wireless power transfer system may include a wireless power transfer device 10 and an electronic device 20.

The wireless power transfer device 10 may include a first transmitting coil 100, a second transmitting coil 200 on (e.g., positioned on) the first transmitting coil 100, a driver 400 configured to drive the first transmitting coil 100 with a first AC current and the second transmitting coil 200 with a second AC current, power modulation electronics 500 configured to modulate the first and second AC currents provided by the driver 400, a controller 600 (e.g., a microcontroller) configured to control the operations of the driver 400 and the power modulation electronics 500, and a receiver 700 for receiving information (e.g., information transmitted by the electronic device 20).

The electronic device 20 may include a receiver coil 800, a detector 900 configured to detect information about power received in the receiver coil 800, and a transmitter 1000 configured to transmit information (e.g., transmit information to the wireless power transfer device 10). In some embodiments, the transmitter 1000 may be a radio or an RF transmitter.

The wireless power transfer device 10 may be configured to generate an oscillating magnetic field by driving the first and second transmitting coils 100 and 200 with the first and second AC currents, respectively, and to rotate the direction of the magnetic field by controlling (e.g., setting or adjusting) a first magnitude of the first AC current, a second magnitude of the second AC current, and a phase difference between the first and second AC currents (e.g., the wireless power transfer device 10 is configured to rotate the direction of the magnetic field by differentially driving the first and second transmitting coils 100 and 200). When the wireless power transfer device 10 generates the magnetic field and the electronic device 20 is in the proximity to the wireless power transfer device 10, a current may be generated in the receiver coil 800 by electromagnetic induction (e.g., wireless resonant induction). The detector 900 may be configured to detect information (e.g., power, amplitude, etc.) about the current generated in the receiver coil 800, and the transmitter 1000 may be to transmit (e.g., wirelessly transmit) the detected information to outside of the electronic device 20, for example, to the receiver 700 of the wireless power transfer device 10. The controller 600 may control the driver 400 and the power modulation electronics 500 based on the information received by the receiver 700 to control the direction of the magnetic field at the receiver coil 800.

Figure 2:
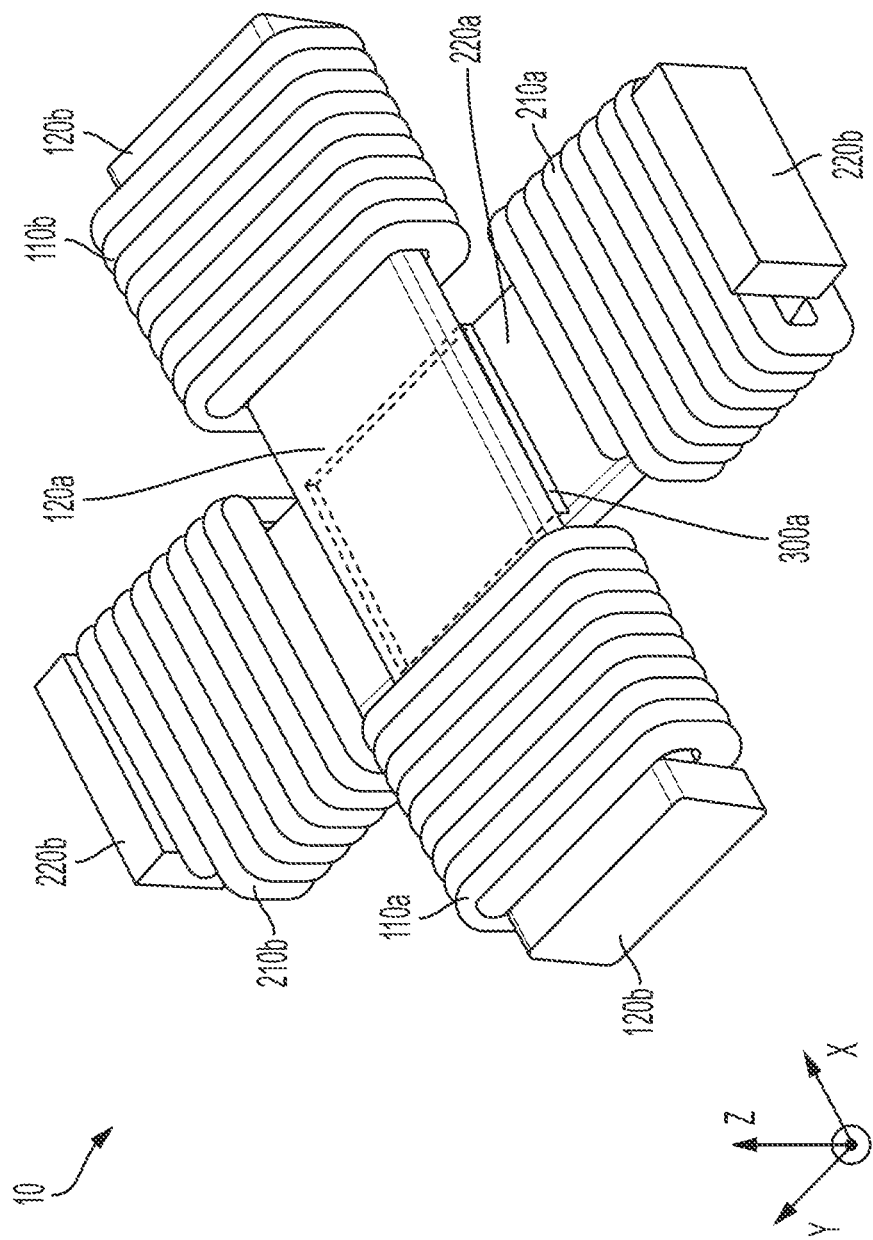
FIG. 2 shows a perspective view of first and second transmitting coils of a wireless power transfer device according to some embodiments.
Figure 3:
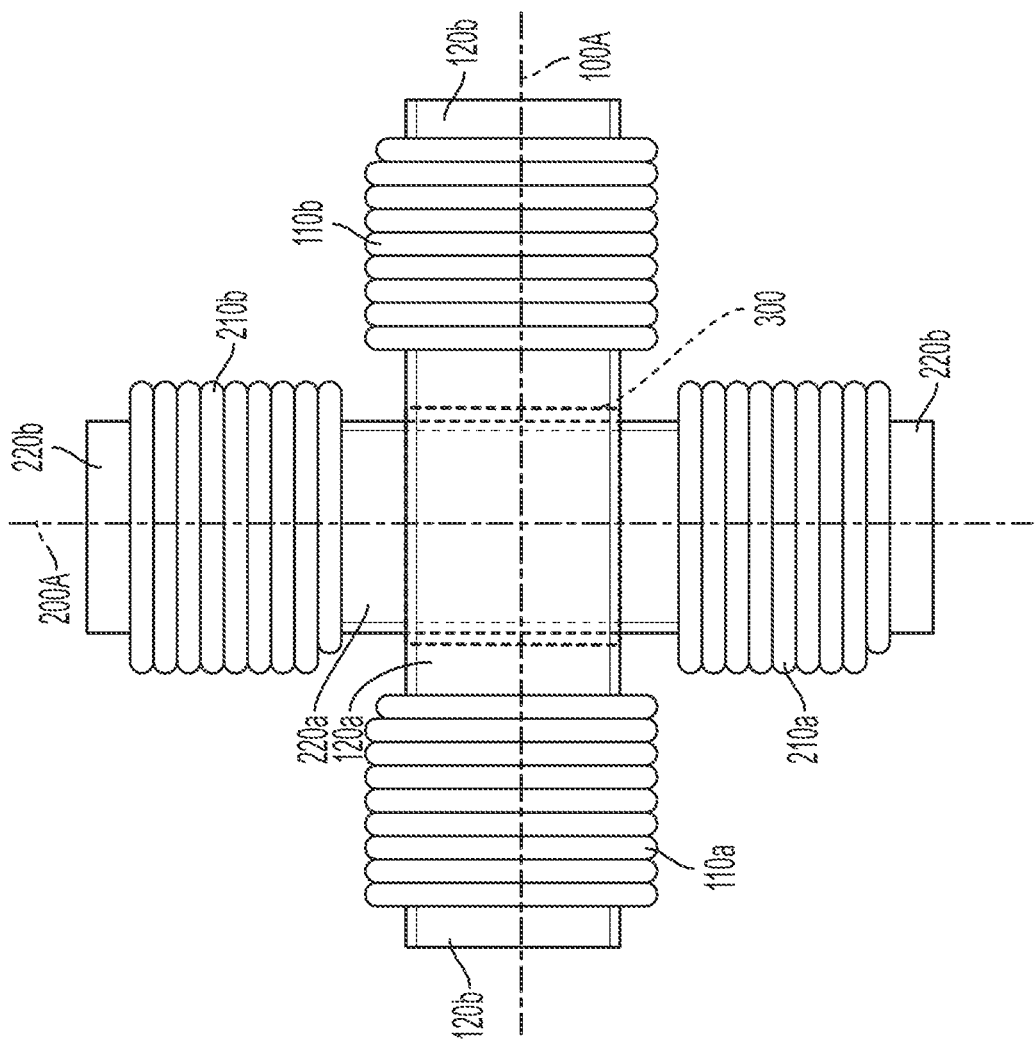
FIG. 3 shows a plan view of the first and second transmitting coils of FIG. 2.
Figure 4:
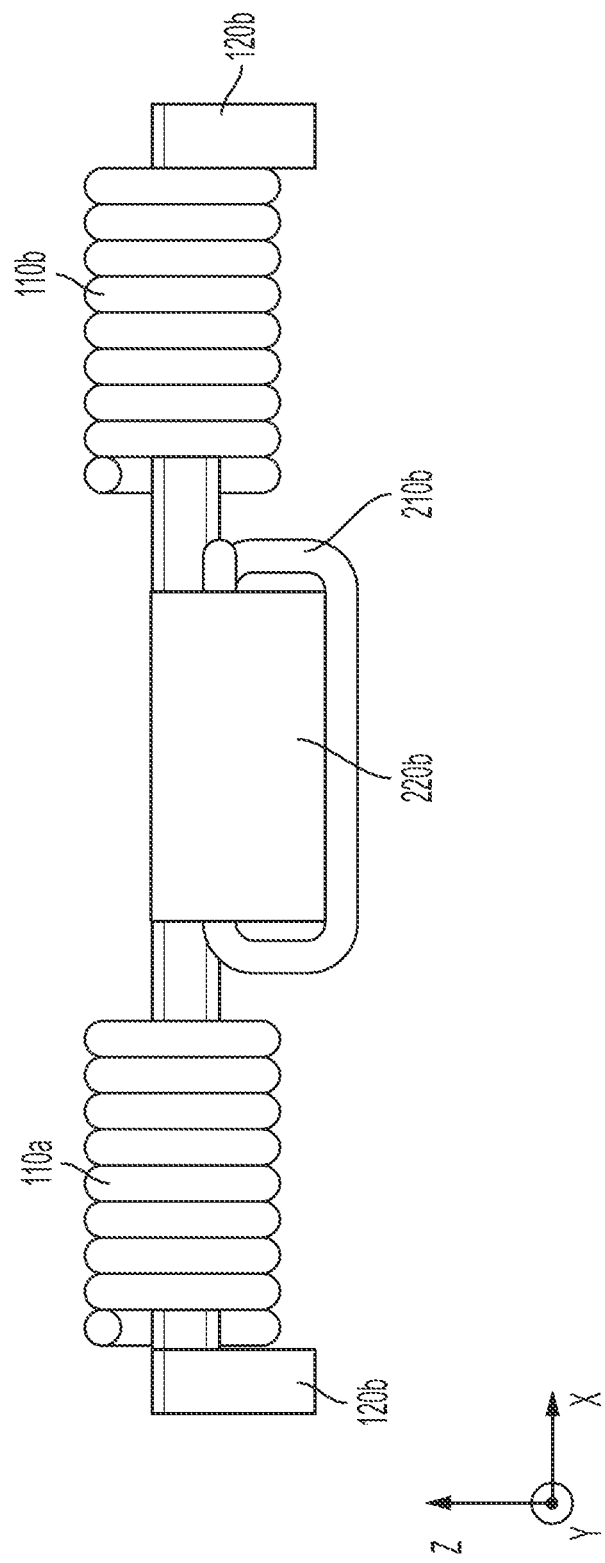
FIG. 4 shows a side view of the first and second transmitting coils of FIG. 2.

The first and second transmitting coils 100 and 200 will now be described in more detail with reference to FIGS. 2-4. FIG. 2 shows a perspective view of the first and second transmitting coils 100 and 200 according to some embodiments, FIG. 3 shows a plan view of the first and second transmitting coils 100 and 200 of FIG. 2, and FIG. 4 shows a side view of the first and second transmitting coils 100 and 200 of FIG. 2.

The first transmitting coil 100 may include a first rod 120 and a first wire 110 wound around the first rod 120, and the second transmitting coil 200 may include a second rod 220 and a second wire 210 wound around the second rod 220.

The first transmitting coil 100 may be aligned along a first axis 100A, and the second transmitting coil 200 may be aligned along a second axis 200A different from the first axis 100A. In some embodiments, the second axis 200A is perpendicular (or substantially perpendicular) to the first axis 100A. For example, an angle between the second axis 200A and the first axis 100A may be approximately (about) 90°. When the first and second axes 100A and 200A are perpendicular, coupling between the first and second transmitting coils 100 and 200 may be reduced or substantially prevented. Coupling between the first and second transmitting coils 100 and 200 may be at a maximum when the first and second axes 100A and 200A are parallel, and coupling between the first and second transmitting coils 100 and 200 may decrease as an angle between the first and second axes 100A and 200A increases towards 90°, at which point coupling is at a minimum. However, the angle between the first axis 100A and the second axis 200A may be any suitable angle, for example, within the range of about 45° to about 90°. In FIGS. 2-4, the first axis 100A is shown as being aligned along an X-axis, and the second axis 200A is shown as being aligned along a Y-axis.

The second transmitting coil 200 may be on (e.g., above) the first transmitting coil 100 and may overlap the first transmitting coil 100 in a plan view (shown in FIG. 3) at an area of overlap 300. In some embodiments, the area of overlap 300 corresponds to a center region of the first transmitting coil 100 and a center region of the second transmitting coil 200. The second transmitting coil 200 may be spaced apart (e.g., separated) from the first transmitting coil 100 in a thickness direction (e.g., a Z-axis direction) at the area of overlap 300.

An intermediate space 300a between the first and second transmitting coils 100 and 200 in the area of overlap 300 may include (e.g., be filled or at least partially filled with) a nonmagnetic material having a low permeability, for example, air, plastic, foam, one or more non-ferrimagnetic materials, one or more low permeability metals (e.g., aluminum and/or copper), etc. In some embodiments, when the intermediate space 300a is filled with air, a frame or housing may be utilized to hold the first and second transmitting coils 100 and 200 and/or to maintain the relative positions of the first and second transmitting coils 100 and 200 with respect to each other. In some embodiments, the material in the intermediate space 300a has a relative permeability of equal to or less than about 5 $\mu_r$, for example, in the range of about 1 $\mu_r$ to about 1.5 $\mu_r$. In some embodiments, the material in the intermediate space 300a may be diamagnetic (e.g., a material having a relative permeability in the range of about 0 $\mu_r$ to about 1 $\mu_r$). Therefore, in some embodiments, the second transmitting coil 200 does not contact the first transmitting coil 100, and the first and second transmitting coils 100 and 200 are magnetically independent (e.g., magnetically decoupled and/or magnetically isolated from each other) and/or electrically independent (e.g., electrically decoupled and/or electrically isolated) from each other. Because the first and second transmitting coils 100 and 200 are not in contact, coupling between the first and second transmitting coils 100 and 200 may be reduced or substantially prevented. For example, the first transmitting coil 100 may generate a first magnetic field without being significantly influenced by the presence of the second transmitting coil 200, and the second transmitting coil 200 may generate a second magnetic field without being significantly influenced by the presence of the first transmitting coil 100. A magnetic field generated by the wireless power transfer device 10 may be a superposition of the first and second magnetic fields generated by the first and second transmitting coils 100 and 200, respectively.

The first rod 120 may include a magnetic material having a high permeability, such as a ferrimagnetic material (e.g., soft ferrite material), such as nickel- or manganese-based ferrites (e.g., MnZn, NiZn, and/or the like). The magnetic material may increase the intensity of a magnetic field generated by the first transmitting coil 100 compared to an otherwise comparable coil without the magnetic rod. In some embodiments, the material of the first rod 120 may have a relative permeability equal to or greater than about 5 $\mu_r$, for example, in the range of about 10 $\mu_r$ to about 10,000 $\mu_r$. The second rod 220 may include any material that the first rod 120 may include, and the second rod 220 may include a material that is the same as, or different from, a material included in the first rod 120. In some embodiments, a ratio of the permeability of a material in the first rod 120 to the permeability of the material in the intermediate space 300a may be equal to or greater than approximately (about) 5. When the permeability of the materials of the first and second rods 120 and 220 are significantly larger than the permeability of the material in the intermediate space 300a, coupling between the first and second transmitting coils 100 and 200 may be reduced or substantially prevented. For example, a magnetic field flowing through the first rod 120 may be blocked (by the material in the intermediate space 300a) from permeating through the intermediate space 300a and into the magnetic material of the second rod 220. Thus, the presence of the second transmitting coil 200 may not substantially affect the first magnetic field generated by the first transmitting coil 100, and vice versa.

The first rod 120 may include a material based on a frequency of an AC current to be driven through the first wire 110 (e.g., the designed or intended operational frequency of the first and/or second coils 100 and 200). In some embodiments, the first rod 120 may include a material (e.g., MnZn ferrite) having a relative permeability within the range of about 1000 $\mu_r$ to about 4000 $\mu_r$ when the frequency of the AC current to be driven through the first wire 110 is within the range of about 100 kHz to about 1 MHz. In some embodiments, the first rod 120 may include a material (e.g., NiZn ferrite) having a relative permeability within the range of about 10 $\mu_r$ to about 200 $\mu_r$ when the frequency of the AC current to be driven through the first wire 110 is above about 1 MHz.

In some embodiments, the first rod 120 may include a material having a relative permeability within the range of about 2300 $\mu_r$ to about 4000 $\mu_r$. In some embodiments, the first rod 120 may include a material having low resistive, low eddy currents, low hysteresis, and/or low flux losses at the operation frequency.

In some embodiments, the wireless power transfer device 10 is to be operated (e.g., operated at normal operating conditions) so that the flux density within the first and second rods 120 and 220 is operated or controlled (e.g., set) to be within the substantially linear region of a BH curve of the material included in the first rod 120 and/or the second rod 220. When the wireless power transfer device 10 is operated above this region, losses may increase, system efficiency may be reduced, and a desired intensity of the magnetic field may not be generated due to nonlinear increases in losses in the first rod 120 and/or the second rod 220 lowering the first coil 100 and/or the second coil's 200 quality factor. This will distort the directionality of the combined magnetic field of the first and second coils 100 and 200.

Because the first and second rods 120 and 220, and a rod of the receiver coil 800, may be rods rather than closed magnetic cores, such as in transformers, the effective permeability of the rods may be far lower than the manufacturer specified initial permeability of the material(s) of the rods. A rod with a low length to width (e.g., diameter) ratio may have a very low effective permeability. In some embodiments, the first rod 120 and/or the second rod 220 may have an effective permeability (e.g., relative effective permeability) between about 20 $\mu_r$ and about 50 $\mu_r$. However, the present disclosure is not limited thereto.

The first rod 120 may include a first main rod 120a and first thick portion (e.g., a tab or a flange) 120b at an end (e.g., both ends) of the first main rod 120a, and the second rod 220 may include a second main rod 220a and a second thick portion (e.g., a tab or a flange) 220b at an end (e.g., both ends) of the second main rod 220a. The first main rod 120a may have any suitable shape. The second main rod 220a may have any shape that the first main rod 120a may have, and the shape of the second main rod 220a may be the same as, or different from, the shape of the first main rod 120a. In some embodiments, the first main rod 120a has a cylindrical shape. In other embodiments, the first main rod 120a has a rectangular shape having a length along the X-axis, a width along the Y-axis, and a thickness along the Z-axis. The width of the first main rod 120a may be less than the length of the first main rod 120a, and the thickness of the first main rod 120a may be less than the width of the first main rod 120a, but the present disclosure is not limited thereto.

A thickness of the intermediate space 300a may be relatively small compared to the dimensions of the first and second transmitting coils 100 and 200. For example, the thickness of the intermediate space 300a may be less than the length, the width, and/or the thickness of the first main rod 120a. Because the first and second magnetic fields generated by the first and second transmitting coils 100 and 200 will each generally decrease in magnitude as respective distances from the first and second transmitting coils 100 and 200 increase, it is advantageous for the thickness of the intermediate space 300a to be small in order to minimize or at least reduce a disparity between a distance between the electronic device 20 and the first transmitting coil 100 and a distance between the electronic device 20 and the second transmitting coil 200. When the disparity is large, one of the first and second transmitting coils 100 and 200 may have an unintended disproportionate effect on the electronic device 20 compared to the other one of the first and second transmitting coils 100 and 200. Accordingly, in one or more embodiments, the thickness of the intermediate space 300a may be sufficiently small such that the first and second transmitting coils 100 and 200 are substantially coplanar to advantageously minimize or at least reduce the disproportionate effect of one of the first and second transmitting coils 100 and 200 on the electronic device 20.

In some embodiments, a thickness of the first main rod 120a at the area of overlap 300 is less than a thickness of the first main rod 120a at an area outside of the area of overlap 300. For example, the first main rod 120a may have an indent or recess (e.g., a step) at the area of overlap 300 that faces the second main rod 220a. When one or both of the first and second main rods 120a and 220a have such an indent or recess, the distance between the first and second transmitting coils 100 and 200 may be reduced. In some embodiments, the indent or recess in one or both of the first and second main rods 120a and 220a may allow the first and second wires 110 and 210 to be coplanar (or substantially coplanar).

The first thick portion 120b may be at an end (or end portion) of the first main rod 120a, and a thickness of the first thick portion 120b may be greater than a thickness of the first main rod 120a. For example, as shown in FIG. 3, the first thick portion 120b may protrude toward the second transmitting coil 200 (e.g., in the negative Z-axis direction). Similarly, the second thick portion 220b may be at an end (or end portion) of the second main rod 220a, and a thickness of the second thick portion 220b may be greater than a thickness of the second main rod 220a. For example, the second thick portion 220b may protrude toward the first transmitting coil 100 (e.g., in the Z-axis direction). For example, the second thick portion 220b of the second transmitting coil 200 may protrude in a direction opposite to a protruding direction of the first thick portion 120b of the first transmitting coil 100. Because the first and second thick portions 120b and 220b of the first and second transmitting coils 100 and 200 may protrude toward the second and first transmitting coils 200 and 100, respectively, the distance along the Z-axis direction between the ends of the first rod 120 and the ends of the second rod 220 may be reduced or eliminated, and thus, the ends of the first and second rods 120 and 220 may be substantially coplanar.

The first wire 110 may be wound around the first rod 120 in any suitable configuration. The second wire 210 may be wound around the second rod 220 in any configuration that the first wire 110 may be wound around the first rod 120. In some embodiments, the first wire 110 is wound around the first main rod 120a and is not wound around the first thick portion 120b. The first wire 110 may be wound around substantially the entire length of the first main rod 120a. For example, the first wire 110 and the first main rod 120a may form a solenoid. In some embodiments, the first wire 110 is wound around two ends (or two end portions) of the first main rod 120a to form first and second sub-coils 110a and 110b at the two ends (or two end portions) of the first main rod 120a, and the first wire 110 exposes, and is not wound around, a portion (e.g., an exposed intermediate or central portion) of the first main rod 120a between the first and second sub-coils 110a and 110b. The exposed portion of the first main rod 120a may include a portion of the first main rod 120a corresponding to the area of overlap 300 between the first and second transmitting coils 100 and 200. When the first wire 110 is not wound around the first main rod 120a at the area of overlap 300, the thickness of the first transmitting coil 100 at the area of overlap 300 may be reduced.

The first sub-coil 110a may be electrically coupled (e.g., electrically connected) to the second sub-coil 110b in series or in parallel. When the first sub-coil 110a is electrically coupled (e.g., electrically connected) to the second sub-coil 110b in series, the first wire 110 may electrically couple (e.g., electrically connect) the first sub-coil 110a to the second sub-coil 110b by extending across the area of overlap 300 on the first main rod 120a and on a side of the first main rod 120a facing away from the second transmitting coil 200.

In some embodiments, the first sub-coil 110a is not electrically coupled (e.g., electrically connected) to the second sub-coil 110b, and the first and second sub-coils 110a and 110b are separately driven. In such embodiments, the first and second sub-coils 110a and 110b may be synchronously driven so that the magnetic fields generated by the first and second sub-coils coils 110a and 110b oscillate in phase.

The wireless power transfer device 10 may generate a magnetic field by driving the first AC current through the first wire 110 and/or driving the second AC current through the second wire 210. The first and second AC currents may be driven in phase (i.e., with about 0° phase difference between the first and second AC currents) or about 180° out of phase. A direction of the magnetic field generated by the wireless power transfer device 10 may be controlled or selected by controlling (e.g., setting or changing) a first amplitude of the first AC current, a second amplitude of the second AC current, and a phase difference between the first and second AC currents (e.g., the wireless power transfer device 10 is configured to rotate the direction of the magnetic field by differentially driving the first and second transmitting coils 100 and 200). Accordingly, the direction of the magnetic field can be rotated by changing these parameters.

Figure 5B:
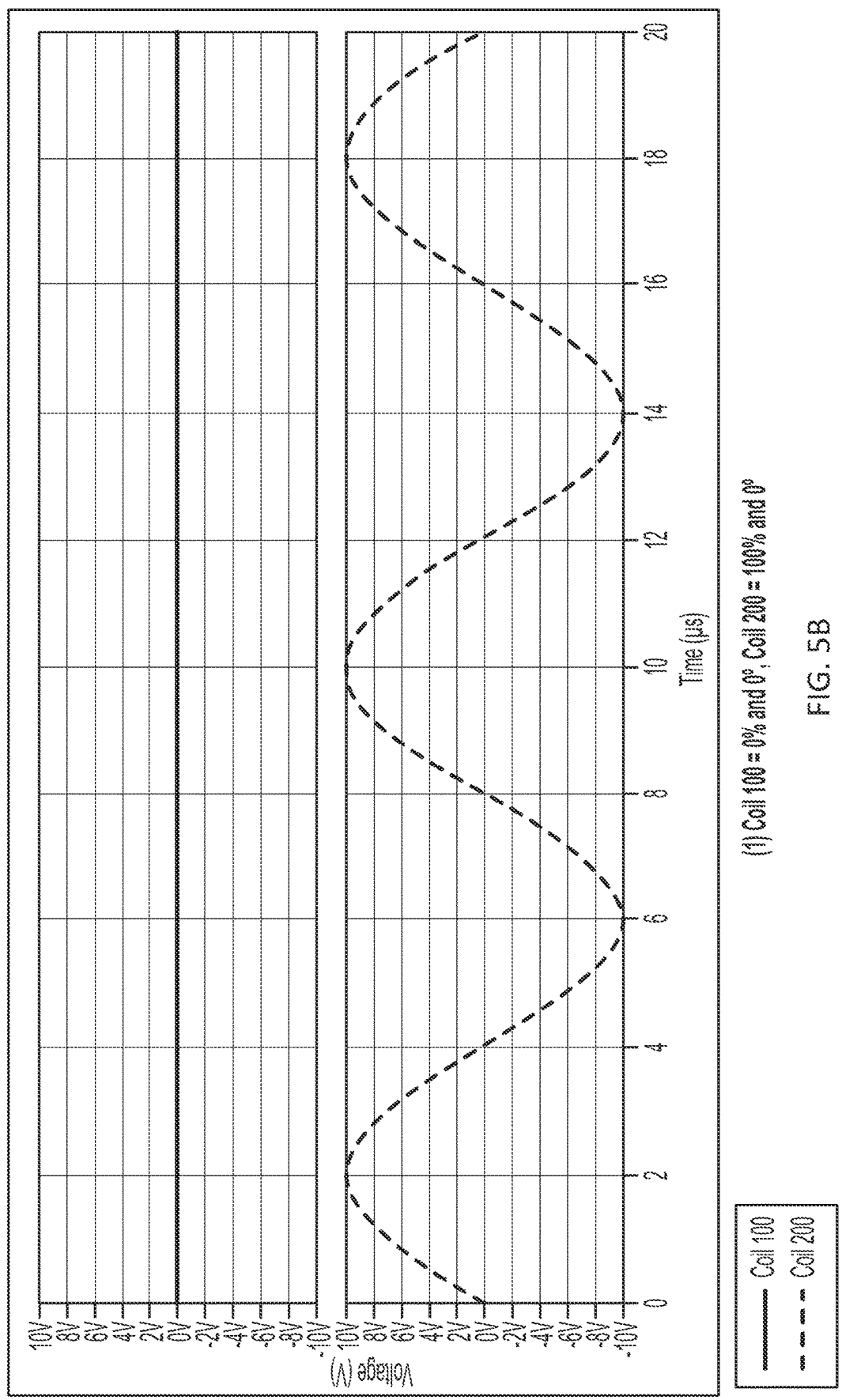
FIGS. 5B-5F show graphs of the voltages applied to the first and second transmitting coils as a function of time for the five states of FIG. 5A.

FIG. 5A shows how the direction of a magnetic field generated by the wireless power transfer device 10 can be rotated according to a non-limiting example. FIGS. 5B-5F show graphs of the voltages applied to the first and second transmitting coils 100 and 200 as a function of time for five states shown in FIG. 5A. The numerical values shown in the graphs of FIGS. 5B-5F represent non-limiting examples. Beginning with a first state (1) as shown in FIGS. 5A and 5B, the first amplitude of the first AC current of the first wire 110 is at 0, the second amplitude of the second AC of the second wire 210 current is at 10, and the direction of the magnetic field at a point above the area of overlap 300 may oscillate between the Y-axis direction and the negative Y-axis direction.

Figure 5C:
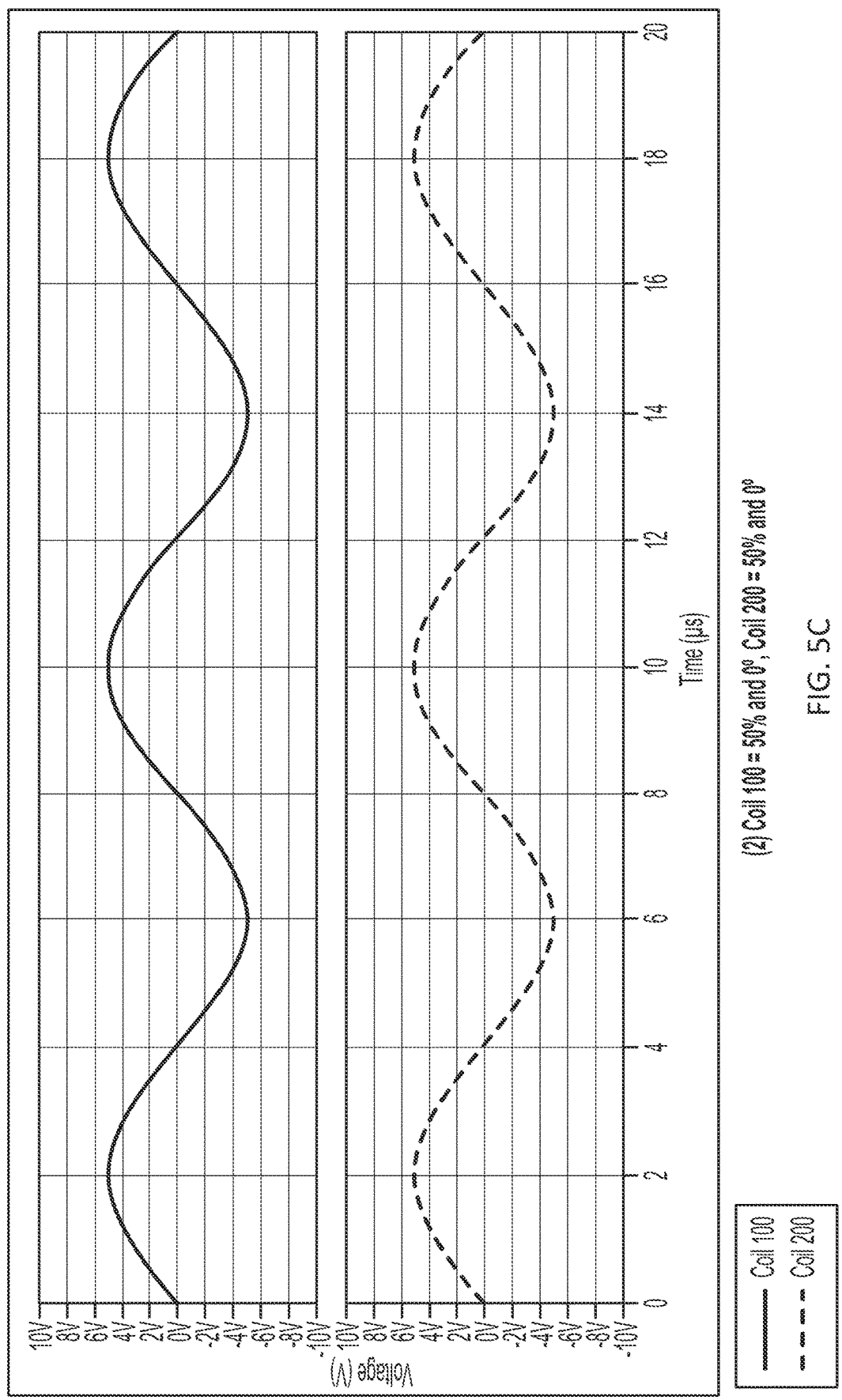

To rotate the magnetic field clockwise to a second position corresponding to a second state (2) as shown in FIGS. 5A and 5C, the first and second AC currents are driven in phase, the first amplitude is increased while the second amplitude is decreased until they are the same (each at an amplitude of 5), and the direction of the magnetic field at the point will oscillate between 45° between the X-axis direction and the Y-axis direction and 45° between the negative X-axis direction and the negative Y-axis direction.

Figure 5D:
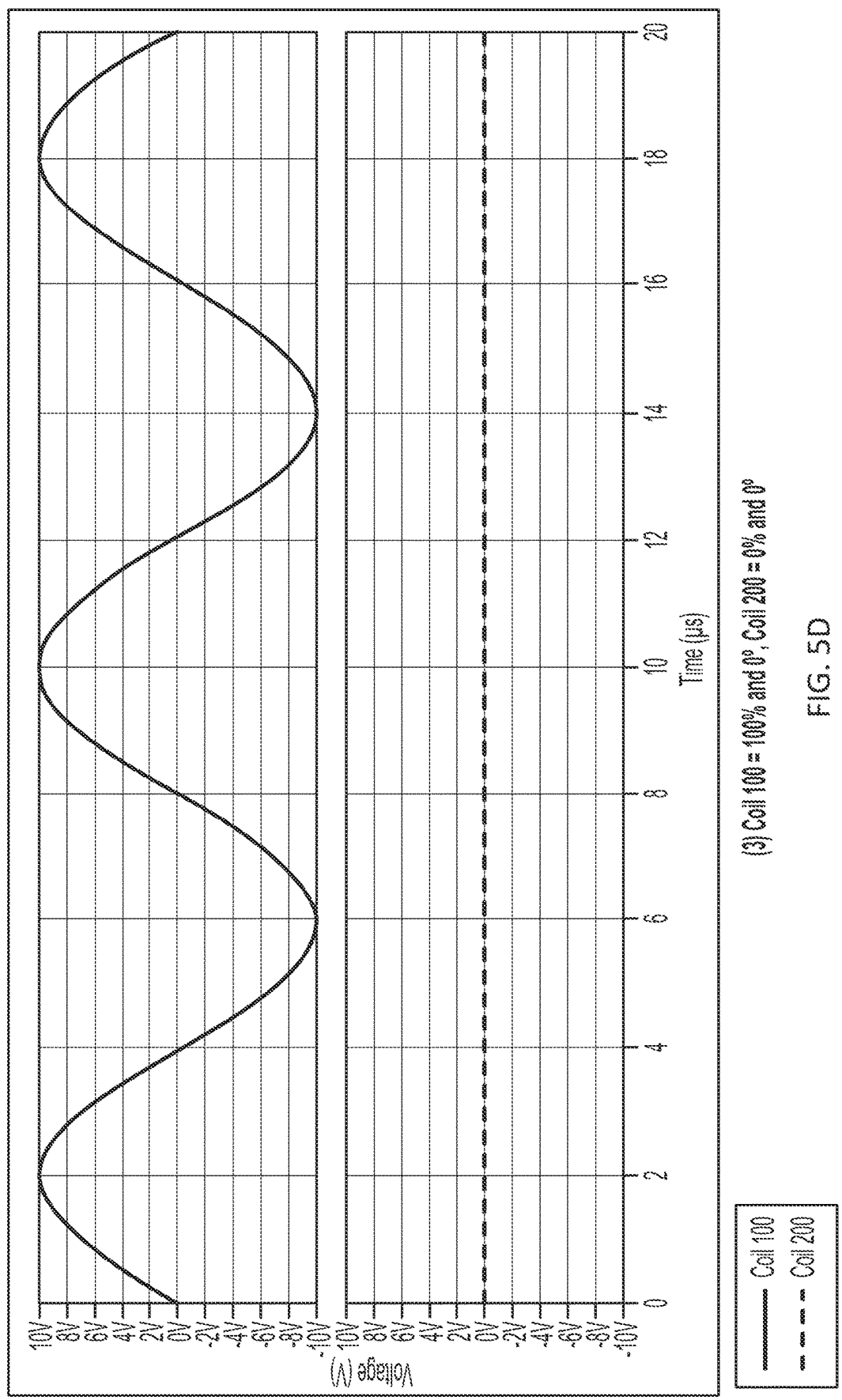

To rotate the magnetic field clockwise to a third position corresponding to a third state (3) as shown in FIGS. 5A and 5D, the first and second AC currents are driven in phase, the first amplitude is increased while the second amplitude is decreased until the first amplitude is at 10 and the second amplitude is at 0, and the direction of the magnetic field at the point will oscillate between the X-axis direction and the negative X-axis direction.

Figure 5E:
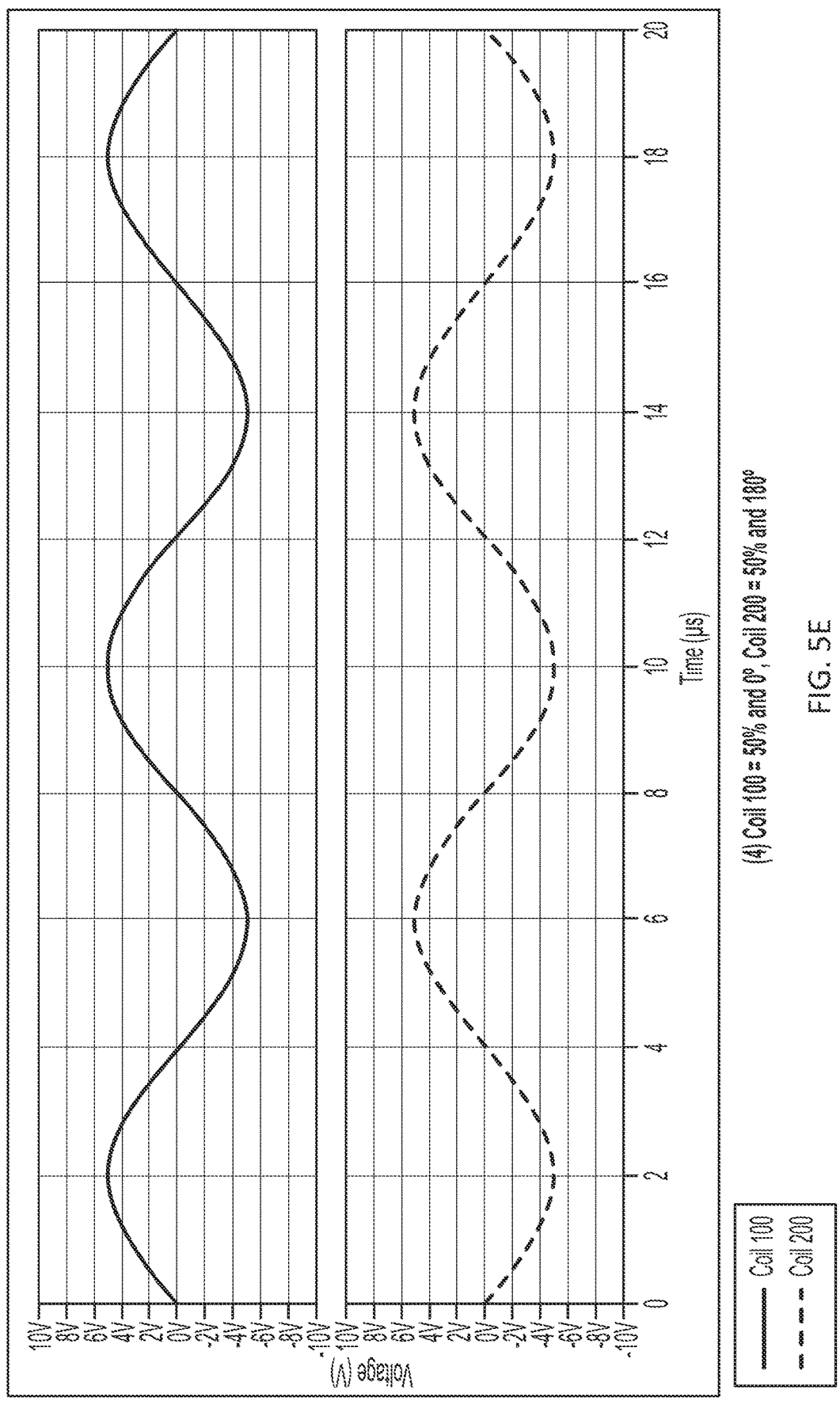

To rotate the magnetic field to a fourth position corresponding to a fourth state (4) as shown in FIGS. 5A and 5E, the first and second AC currents are driven 180° out of phase, the first amplitude is decreased while the second amplitude is increased until the first and second amplitudes are the same (each at 5), and the direction of the magnetic field at the point will oscillate between 45° between the X-axis direction and the negative Y-axis direction and 45° between the negative X-axis direction and the Y-axis direction.

Figure 5F:
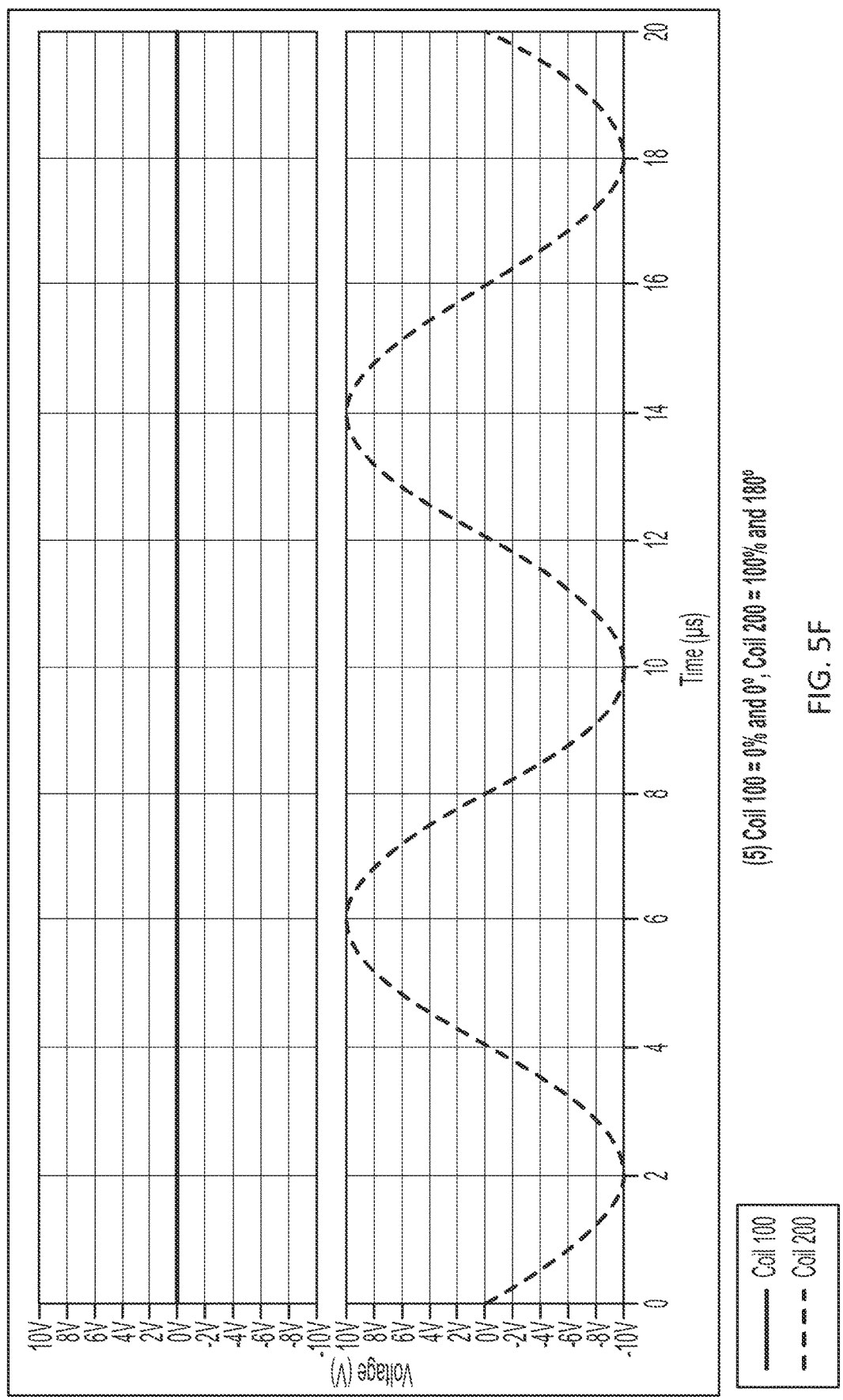

To rotate the magnetic field to a fifth position corresponding to a fifth state (5) as shown in FIGS. 5A and 5F, the first and second AC currents are driven 180° out of phase, the first amplitude is decreased while the second amplitude is increased until the first amplitude is at 0 and the second amplitude is at 10, and the direction of the magnetic field at the point may oscillate between the negative Y-axis direction and the Y-axis direction, similar to the first state (1). As used herein, the terms "first amplitude" and "second amplitude" refer to the peak amplitude.

Accordingly, the direction of the magnetic field at a point above the area of overlap 300 may be rotated to have any direction in the X-Y plane (any of quadrants I-IV of the X-Y plane in FIG. 5) by gradually adjusting the first amplitude of the first AC current and the second amplitude of the second AC current, and by shifting the first and second AC currents between being in-phase and being 180° out of phase. For example, when the first and second AC currents are in phase, the magnetic field at the point may have any direction in the first and third quadrants I and III of the X-Y plane by suitably setting the first and second amplitudes. Furthermore, when the first and second AC currents are 180° out of phase, the magnetic field at the point may have any direction in the second and fourth quadrants II and IV of the X-Y plane by suitably setting the first and second amplitudes.

Although a direction of the magnetic field generated by the wireless power transfer device 10 at a point above the area of overlap 300 has been described with respect to FIG. 5, it will be understood that the direction of the magnetic field at any point around the wireless power transfer device 10 may be controlled (e.g., rotated) or selected as described above by controlling the first and second amplitudes and/or by controlling the phase difference between the first and second AC currents. The direction of the magnetic field at points away from regions above or below the area of overlap 300 may have a directional component along the Z-axis direction, whereas a direction of the magnetic field at regions above or below the area of overlap 300 may have substantially no Z-axis component.

The wireless power transfer device 10 may also include a power source, such as a rechargeable battery (e.g., a lithium-ion battery pack) or non-rechargeable battery (e.g., a replaceable battery), or the wireless power transfer device 10 may be configured to couple to (e.g., connect to), and be powered from, an external power source, such an electrical outlet. In some embodiments, the wireless power transfer device 10 includes a rechargeable battery and a power management system. A charger profile of the rechargeable battery may be set to not perform trickle charging, and the rechargeable battery may be allowed to charge to a set percentage of battery state of charge (SoC) of the rechargeable battery, for example, a percentage within a range of about 80% to about 90% of the SoC. The SoC of the rechargeable battery may refer to the maximum charge that the rechargeable battery is able to store.

Figure 6A:
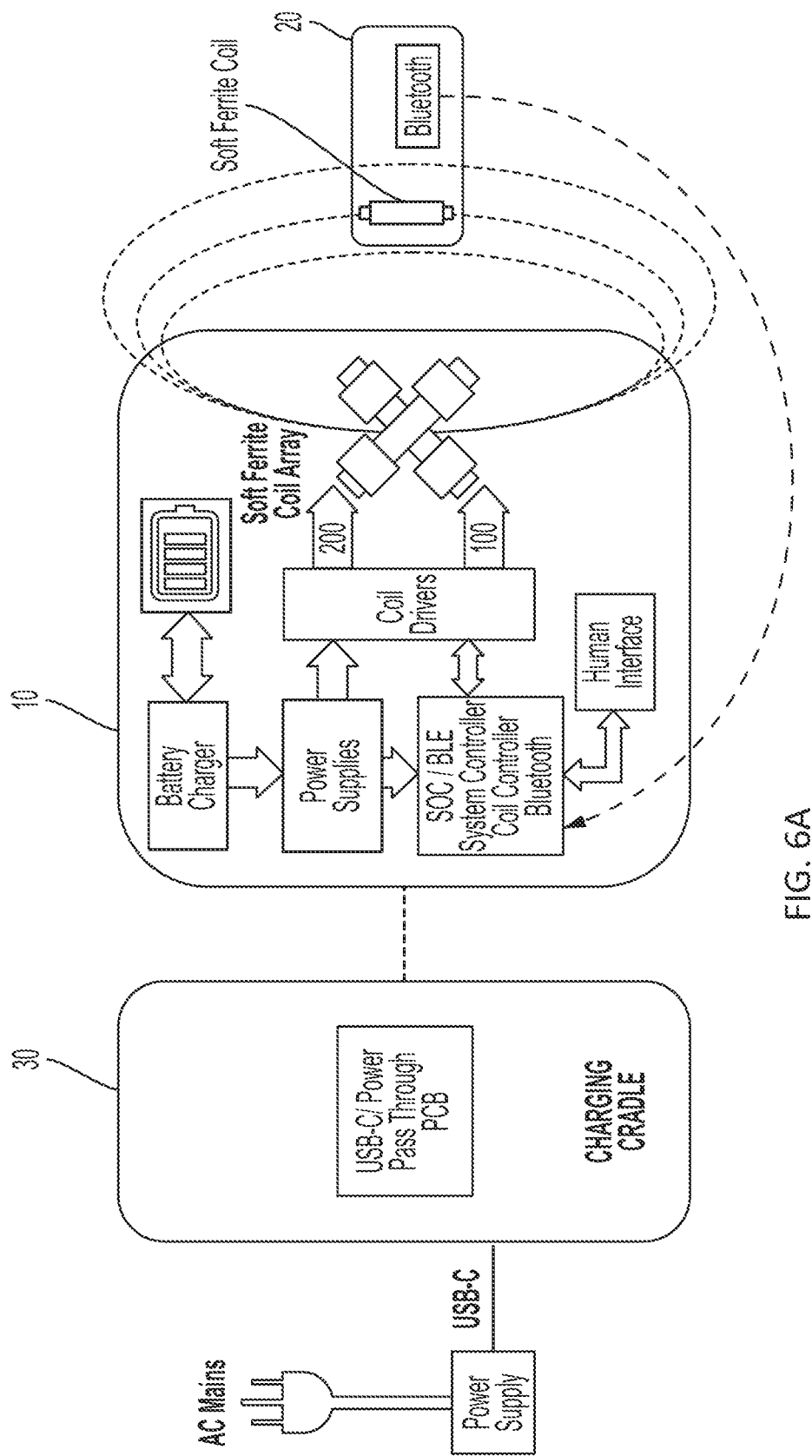
FIG. 6A shows a schematic view of a wireless power transfer system according to some embodiments.

Referring to FIG. 6A, which illustrates a wireless power transfer system according to some embodiments, the rechargeable battery of the wireless power transfer device 10 may be recharged through a power port or connector of the wireless power transfer device 10 that interfaces with a charging cradle 30. The wireless power transfer device 10 may be configured to be placed in or fixed to the charging cradle 30, and the wireless power transfer device 10 may be configured to detect the presence of a voltage at the power port or connector when it is placed in or fixed to the charging cradle 30. In some embodiments, the wireless power transfer device 10 is configured to allow the rechargeable battery to charge when the detected voltage value is equal to a set value or within a set range.

Referring again to FIG. 1, the driver 400 may include a first driver 410 to drive the first transmitting coil 100 and a second driver 420 to drive the second transmitting coil 200. In some embodiments, each of the first and second drivers 410 and 420 include a class D MOSFET bridge module, and the first and second drivers 410 and 420 may be respectively coupled (e.g., connected) in series to the first and second wires 110 and 210 through a capacitor to create a series resonant tank circuit, which may be tuned to 125 kHz. At the tuned frequency, the circuit may have the lowest impedance and highest quality factor. In some embodiments, each of the first and second drivers 410 and 420 may include a half or full bridge MOSFET switch.

Each of the first and second drivers 410 and 420 may receive an independent digital output signal from a digital port of the controller 600. Each of the digital output signals may be a driver signal, for example, a 125 kHz frequency, 50% duty cycle square wave. The two independent digital output signals may allow phase shifting between the first and second AC currents. However, the present disclosure is not limited thereto, and these quantities are provided as an example. In some embodiments, the first and second coils 100 and 200 may be driven with AC frequency within a range of about 1 kHz to 100 MHz (e.g., within a range of about 120 kHz to about 130 kHz). As the frequency at which the first and second coils 100 and 200 are operated increases, the efficiency of wireless charging of the electronic device 200 may increase because the quality factor increases when the frequency increases. The frequencies at which the first and second coils 100 and 200 are to be operated at may be limited by secondary effects, such as losses in the first and second cores 120 and 220 and the first and second wires 110 and 210 caused by skin and proximity effects. The frequencies at which the first and second coils 100 and 200 are to be operated at may be limited by regulations from governments and authorities, such as regulations from the Federal Communications Commission (FCC) and the international electrotechnical commission (IEC) regarding EM field strength and energy levels vs. frequency that create effective bands for operating for wireless charging systems.

Each of the first and second drivers 410 and 420 may include an isolation current sensor respectively coupled (e.g., connected) in series with the first and second wires 110 and 210. The isolation current sensors may be configured to convert a current passing through the first and second drivers 410 and 420 into a proportional voltage which is rectified and signal conditioned. The signal may then be routed to an analog port of the controller 600 to be utilized as current feedback.

In some embodiments, the power modulation electronics 500 includes first power modulation electronics 510 and second power modulation electronics 520. The first and second power modulation electronics 510 and 520 may be respectively configured to provide power to the first and second drivers 410 and 420. The first and second power modulation electronics 510 and 520 may be independently controlled by respective analog output control signals received from the controller 600. In some embodiments, each of the first and second power modulation electronics 510 and 520 includes a single-ended primary-inductor converter (SEPIC) DC-to-DC converter that is configured to step-up or step-down a system bus voltage received at an input and to output the stepped-up or stepped-down voltage.

Each of the first and second power modulation electronics 510 and 520 may be configured to monitor their respective output voltages and provide overcurrent protection. In some embodiments, the first and second power modulation electronics 510 and 520 are configured to attenuate their respective output voltages, filter their output voltages via a capacitor, and couple (e.g., connect) their output voltages to respective analog inputs of the controller 600. For example, the first and second power modulation electronics 510 and 520 may be configured to provide their respective output voltages to the controller 600 as analog voltage feedback signals. The controller 600 may be configured to then provide respective digital signals to the first and second power modulation electronics 510 and 520 to enable or disable the first and second power modulation electronics 510 and 520 from providing power to the first and second drivers 410 and 420.

In some embodiments, the controller 600 is a Bluetooth™ low energy system on chip controller (BLE SOC). The controller 600 may be programmed via a JTAG or USB-C connector. In some embodiments, the controller 600 is configured to provide two analog output control signals to the first and second power modulation electronics 510 and 520, and the controller 600 is configured to receive two analog voltage feedback signals from the first and second power modulation electronics 510 and 520, which are utilized to monitor and adjust output power and to detect supply faults. Furthermore, the controller 600 may be configured to provide two digital output signals to the first and second drivers 410 and 420 to drive the first and second transmitting coils 100 and 200, and the controller 600 may be configured to provide two digital output signals to enable or disable the first and second power modulation electronics 510 and 520. The two digital output signals may be wave pulses having a frequency and duty cycle, such as 125 kHz and 50% duty cycle.

The controller 600 may be configured to control the power output from each of the first and second drivers 410 and 420 by controlling the respective bus voltages of the first and second power modulation electronics 510 and 520. The controller 600 may also be configured to control the phase difference between the first and second AC currents by changing a phase difference between the digital output signal pulse signals it provides to the first and second drivers 410 and 420. Accordingly, by controlling the power of the first and second AC currents and the phase difference between the first and second AC currents, the controller 600 may control the direction and magnitude of the magnetic fields generated by the first and second transmitting coils 100 and 200.

The wireless power transfer device 10 may be configured (e.g., via the controller 600) to communicate various suitable information to the user. Such information may include information about charging of the wireless power transfer device 10, information about charging of the electronic device 20, and various faults (e.g., defects, overheating, etc.). More details regarding what information the wireless power transfer device 10 may communicate to the user will be described below with reference to FIGS. 17-22. The wireless power transfer device 10 may communicate the information via any suitable means, for example, auditory signals, visual signals, and/or haptic feedback signals (e.g., vibrational signals). For example, referring to FIG. 6A, the charger 10 may include a human interface circuit that includes a piezoelectric based speaker, a vibration motor, and/or an LED light configured to communicate information.

Figure 7B:
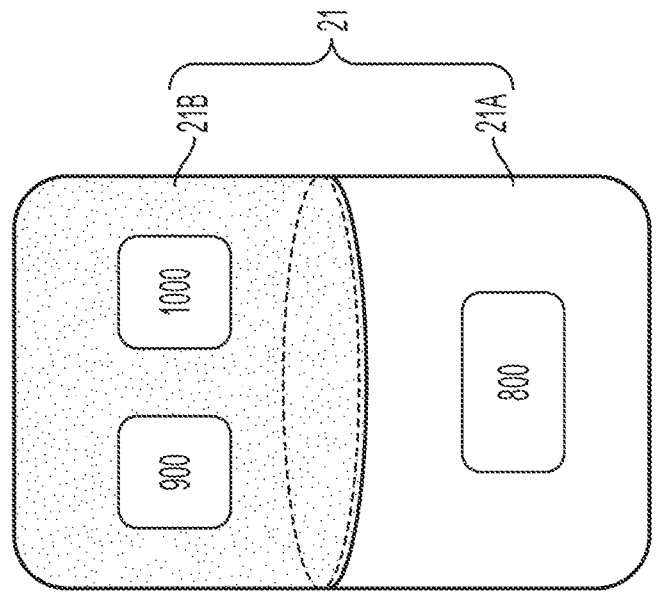
FIG. 7B shows a schematic view of an electronic device according to some embodiments.
Figure 7A:
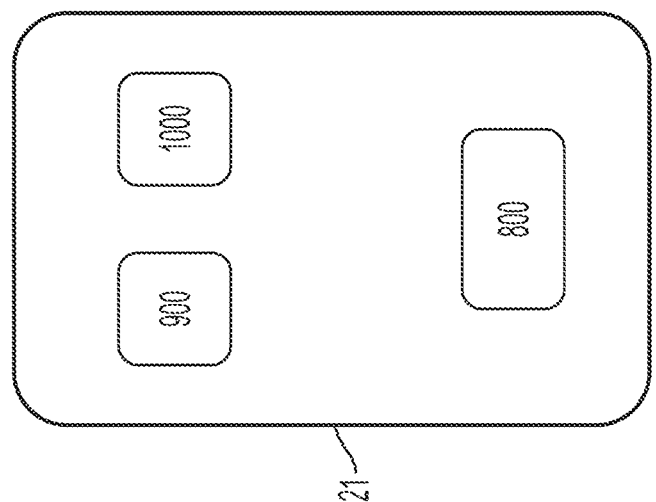
FIG. 7A shows a schematic view of an electronic device according to some embodiments.

The electronic device 20 may be an implantable device (e.g., a device that is configured to be inserted in vivo). In some embodiments where the electronic device 20 is an implantable medical device, the electronic device 20 may include a casing 21 that encases the components of the electronic device 20. In some embodiments, as shown in FIG. 7A, the entire casing 21 may include a metallic material. In some other embodiments, as shown in FIG. 7B, a first portion 21A of the casing 21 may include a ceramic material and a second portion of 21B of the casing 21 may include a metallic material. The first portion 21A may cover the receiver coil 800, and the second portion 21B may cover the other components of the electronic device 20 (e.g., the detector 900 and the transmitter 1000). The size and configuration of the first and second portions 21A and 21B may depend, for example, on the sizes, shapes, and relative positions of the receiver coil 800 and the other components of the electronic device 20. In some embodiments, a portion of the casing 21 may include a plastic, an epoxy, and/or a polymer material.

The electronic device 20 is not limited to implantable devices or medical devices, and the electronic device 20 may be any suitable device configured to receive power and/or generate an electrical current via electromagnetic induction. In some embodiments, the electronic device 20 may be configured to store energy of the current generated in the receiver coil 800, for example, in a capacitor. However, the present disclosure is not limited thereto, and the electronic device 20 may be configured in some embodiments to utilize the current without storing the energy of the current. For example, energy of the current generated in the receiver coil 800 may be utilized to drive or power other components in the electronic device 20.

When the electronic device 20 is in the proximity of the wireless power transfer device 10, and the wireless power transfer device 10 generates an oscillating magnetic field, a current may be generated in the receiver coil 800 by electromagnetic induction via the oscillating magnetic field. The receiver coil 800 may be, for example, a solenoid with a ferrimagnetic (e.g., soft ferrite) core.

The detector 900 may be electrically coupled (e.g., electrically connected) to the receiver coil 800 and configured to detect information about the current (e.g., the power or amplitude of the current) generated in the receiver coil 800.

The transmitter 1000 may be to transmit the information detected by the detector 900 to the receiver 700 of the wireless power transfer device 10, but the present disclosure is not limited thereto. The transmitter 1000 may be configured to transmit the information to any suitable receiver outside of the electronic device 20 that is able to receive the information transmitted by the transmitter 1000. In some embodiments, the transmitter 1000 transmits information wirelessly, for example, via Bluetooth™ low energy (BLE).

Aligning the orientation of magnetic field at the receiver coil 800 with the receiver coil 800 increases the efficiency at which the wireless power transfer device 10 transfers power to the electronic device 20 compared to otherwise comparable wireless power transfer devices and receiver coils in which the magnetic field is misaligned. Accordingly, the wireless power transfer device 10 may rotate the magnetic field in order to align (e.g., optimally align) the magnetic field with the receiver coil 800.

A feedback system that monitors (e.g., directly or indirectly monitors) the relative direction of the magnetic field at the receiver coil 800 may be utilized to align (or to enable an operator to align) the magnetic field with the receiver coil 800. The feedback system may allow the wireless power transfer device 10 to automatically align the magnetic field with, or to create a magnetic field that is aligned with, the receiver coil 800 at the receiver coil 800 without requiring a user to manually adjust the position and/or orientation of the wireless power transfer device 10 after placing the wireless power transfer device 10 in proximity with the electronic device 20. Two example feedback systems will now be described in more detail.

In a first feedback system, the wireless power transfer device 10 generates an initial magnetic field and rotates the initial magnetic field (e.g., in the manner described above with reference to FIG. 5). For example, the initial magnetic field may be continuously rotated through a range of angles, or rotated through the range of angles via a plurality of steps changes in angle (e.g., 10 degrees). As the initial magnetic field is rotated, the detector 900 detects information (e.g., power or amplitude) of the current generated in the receiver coil 800. The power received in the receiver coil 800 (e.g., the power of the current generated in the receiver coil 800) may correlate with how aligned the initial magnetic field is with the receiver coil 800. Accordingly, a maximum detected power may correspond to alignment (e.g., optimal alignment) between the initial magnetic field and the receiver coil 800. The maximum detected power also indicates what values of the first amplitude, the second amplitude, and the relative phase between the first and second AC currents generate a magnetic field that will be aligned with the receiver coil 800. After this information is obtained, the wireless power transfer device 10 may generate a magnetic field aligned with the receiver coil 800 to charge (or drive) the electronic device 20.

In a second feedback system, load modulation may be utilized. Load modulation is described in Griffith, U.S. Pat. No. 9,962,085 and Finkenzeller, "Battery Powered Tags for ISO/IEC 14443, Actively Emulating Load Modulation," *RFID Sys Tech* 2011 *7th European Workshop on Smart Objects: Systems, Technologies and Applications* (2011), the entire content of each of which is incorporated herein by reference.

In the second feedback system, the wireless power transfer device 10 may generate an initial magnetic field and rotate the initial magnetic field (e.g., in the manner described above with reference to FIG. 5). For example, the initial magnetic field may be continuously rotated through a range of angles, or rotated through the range of angles via a plurality of steps changes in angle (e.g., 10 degrees). The electronic device 20 may include a modulation resistance coupled (e.g., connected in parallel) to the receiver coil 800, and the modulation resistance can be turned on and off to cause the receiver coil 800 to transmit a signal back to the wireless power transfer device 10 while the electronic device 20 receives power from the wireless power transfer device 10. Information in the signal may be controlled or selected, for example, by the clock rate at which the modulation resistance is turned on and off. The signal may include information about how aligned (i.e., the degree or extent of alignment) the initial magnetic field is with the receiver coil 800. The signal may be measured by a demodulator in the wireless power transfer device 10 that is coupled to one or both of the first and second transmitting coils 100 and 200. The information in the signal may be utilized to determine what values of the first amplitude, the second amplitude, and the relative phase between the first and second AC currents generate a magnetic field that will be aligned with the receiver coil 800. After this information is obtained, the wireless power transfer device 10 may generate a magnetic field that is aligned with the receiver coil 800 to charge (or drive) the electronic device 20.

In some embodiments, the values of the first amplitude, the second amplitude, and the phase difference between the first and second AC currents that can generate a magnetic field that is aligned with the receiver coil 800 may be determined (e.g., by the wireless power transfer device 10) after the wireless power transfer device 10 rotates the magnetic field through a range of degrees (e.g., the wireless power transfer device 10 sweeps the magnetic field through a range of orientations), for example, a full 180° sweep (360° when taking into account the oscillating nature of the magnetic field), but the present disclosure is not limited thereto. For example, information regarding how aligned the initial magnetic field is with the receiver coil 800 may be continuously monitored, and the wireless power transfer device 10 (e.g., the controller 600 of the wireless power transfer device 10) may stop the rotation when alignment (e.g., optimal alignment) between the initial magnetic field and the receiver coil 800 has been detected.

In some embodiments, the initial magnetic field may be rotated via course angular step changes (e.g., 5°, 10°, 15°, 20°, 25°, or 30°) while the information regarding how aligned the initial magnetic field is with the receiver coil 800 at each course angular orientation is monitored. In response to detecting alignment (e.g., optimal alignment) between the initial magnetic field and the receiver coil 800 between two course angular orientations (e.g., two adjacent course angular orientations), the initial magnetic field may be rotated via fine angular step changes (e.g., 0.25°, 0.5°, 1.0°, or 2.0°) between the two course angular orientations between which alignment was determined.

In some embodiments, alignment may be determined to have been found between two adjacent course angular orientations in response to determining that the initial magnetic field is more aligned with the receiver coil 800 when the initial magnetic field is at a first course angular position than when the initial magnetic field is at a second course angular position tested subsequently to the first course angular position. The wireless power transfer device 10 may then determine that alignment occurs either between the first course angular position and the second course angular position, or between the first course angular position and a third course angular position tested previously to the first course angular position. For example, the first course angular position may be between the second course angular position and the third course angular position. The wireless power transfer device 10 may then scan, via fine angular changes, the initial magnetic field from the first course angular position toward the second course angular position and/or from the first course angular position toward the third course angular position to determine where alignment occurs. The information regarding how aligned the initial magnetic field is with the receiver coil 800 may be monitored at each fine angular orientation to determine which of the fine angular orientations corresponds to alignment of the initial magnetic field with the receiver coil 800.

Once an angular orientation of the initial magnetic field corresponding to alignment of the initial magnetic field with the receiver coil 800 is determined, or the wireless power transfer device 10 determines a magnetic field that has a direction aligned with the receiver coil 800, as described in more detail hereinbelow, the wireless power transfer device 10 may then charge (or drive) the electronic device 20 by generating the magnetic field having the determined angular orientation or direction.

Figure 6C:
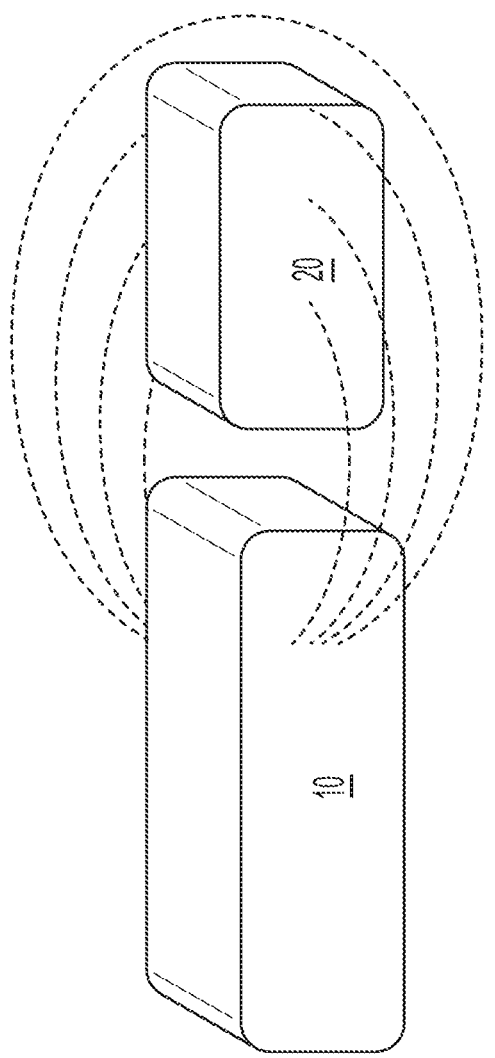
FIG. 6C shows a schematic side view of the wireless power transfer system of FIG. 6A with the electronic device at the side of the wireless power transfer device.

The wireless power transfer device 10 may be configured to transfer power to the electronic device 20 regardless of where the electronic device 20 is positioned relative to the wireless power transfer device 10. For example, FIGS. 6B and 6C show schematic side views of the wireless power transfer device 10 and electronic device 20 of the wireless power transfer system of FIG. 6A with the electronic device 20 in two different positions relative to the wireless power transfer device 10. For example, FIGS. 6B and 6C show side views of a plane substantially defined by the first and second transmitting coils 100 and 200. FIG. 6B shows a non-limiting example where the wireless power transfer device 10 transfers power to the electronic device 20 while being positioned above (e.g., while an area of overlap between the first and second transmitting coils 100 and 200 is positioned above) the electronic device 20. FIG. 6C shows a non-limiting example where the wireless power transfer device 10 transfers power to the electronic device while the electronic device 20 is positioned at the side of the wireless power transfer device 10 (e.g., at the side of the first and second transmitting coils 100 and 200).

Figure 8:
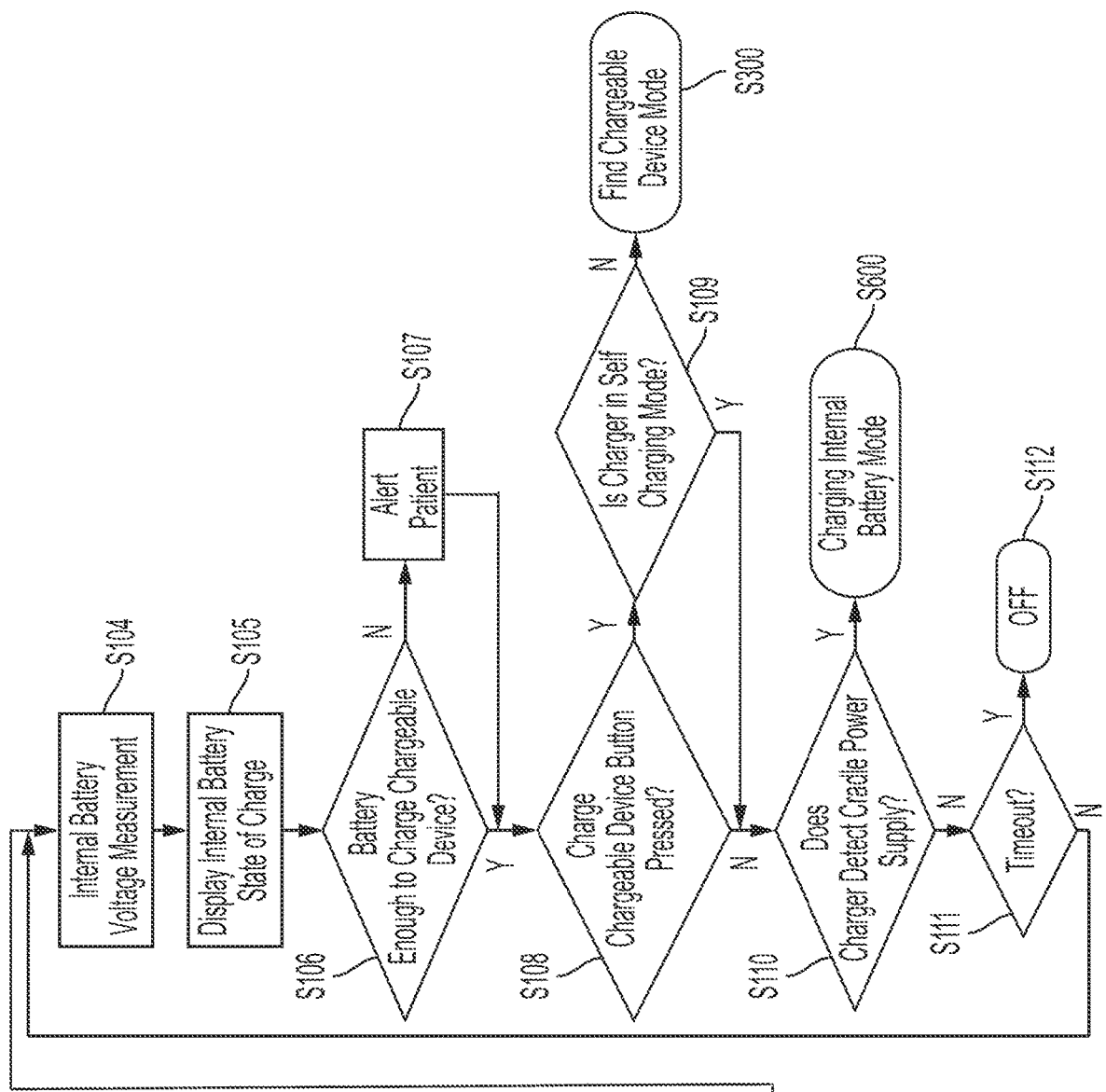
FIG. 8 shows a method flow chart for an initialization mode according to some embodiments.
Figure 8:
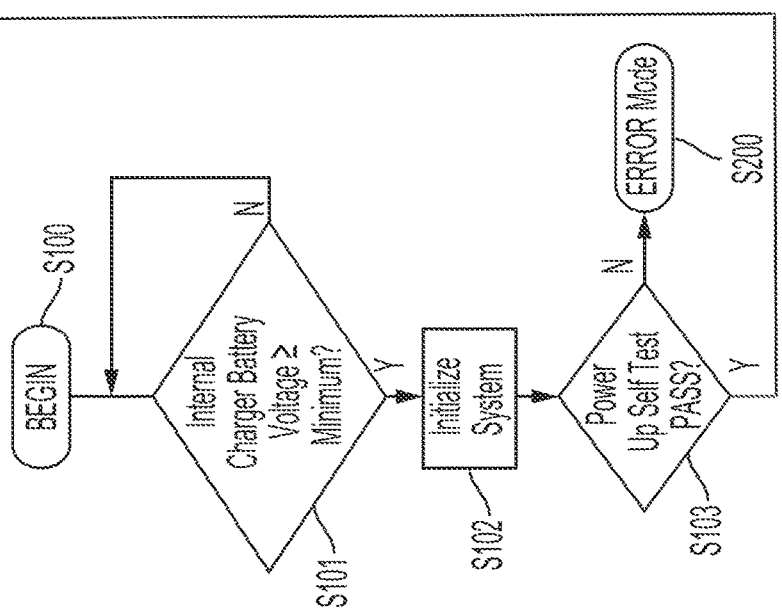
Figure 9:
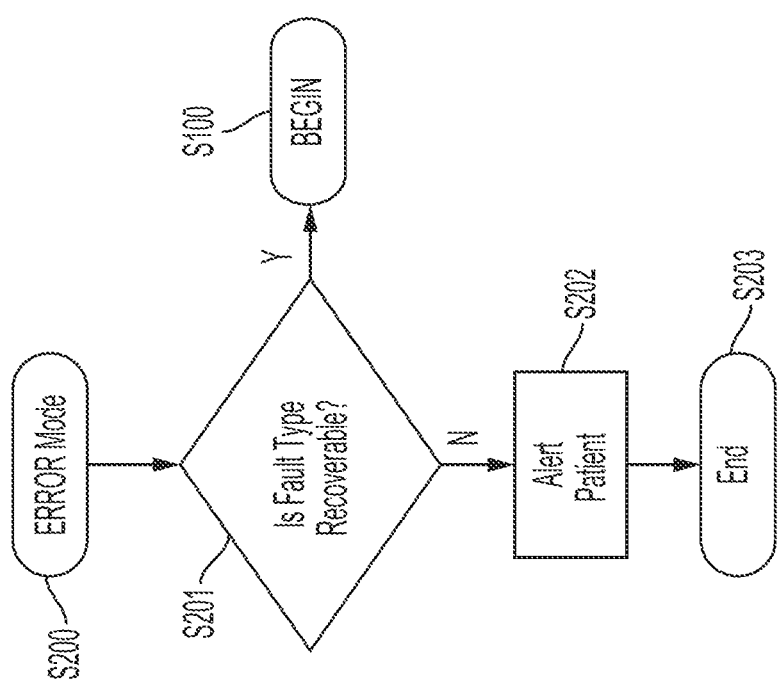
FIG. 9 shows a method flow chart for an error mode according to some embodiments.
Figure 10:
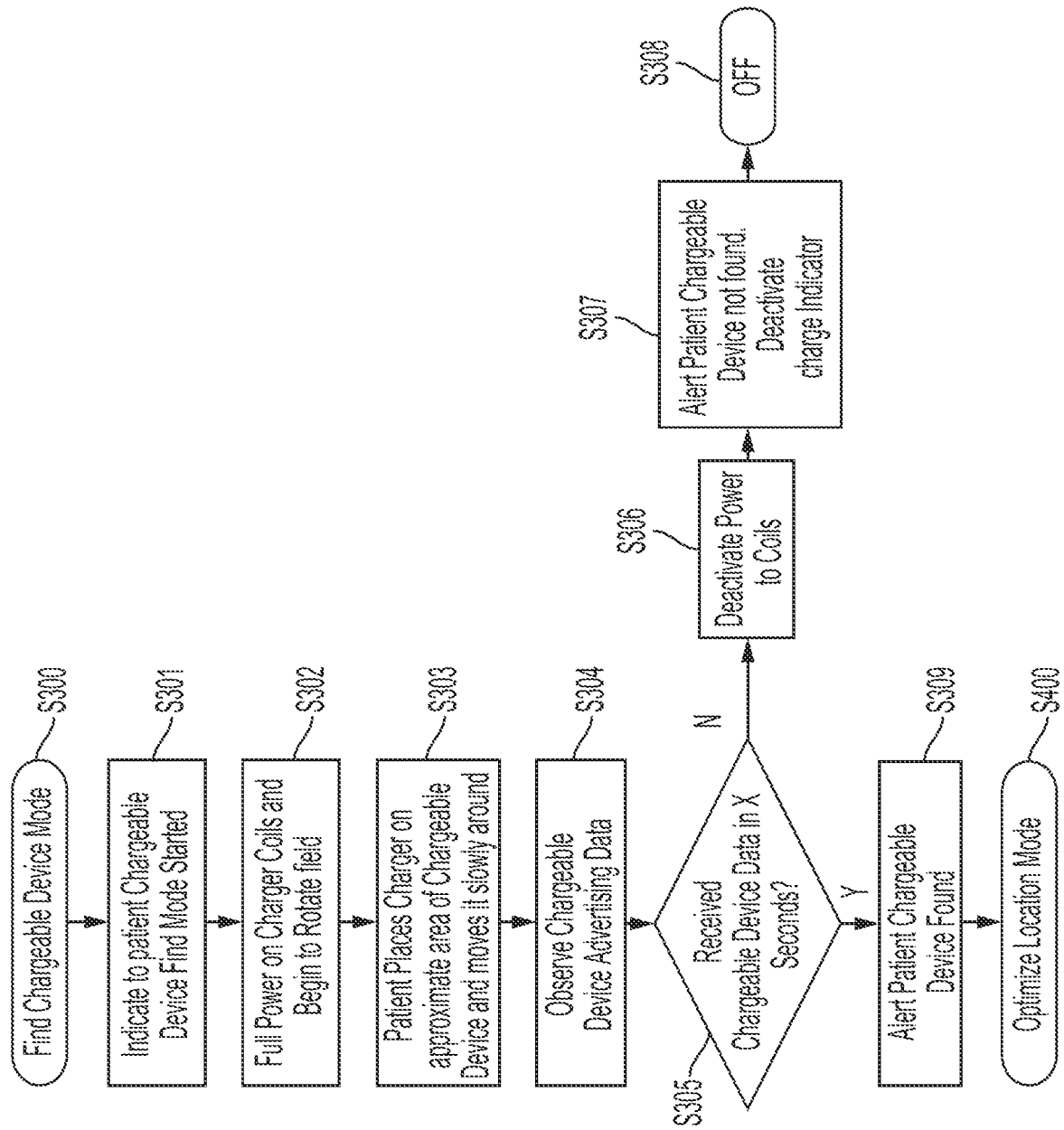
FIG. 10 shows a method flow chart for a find electronic device mode according to some embodiments.
Figure 11:
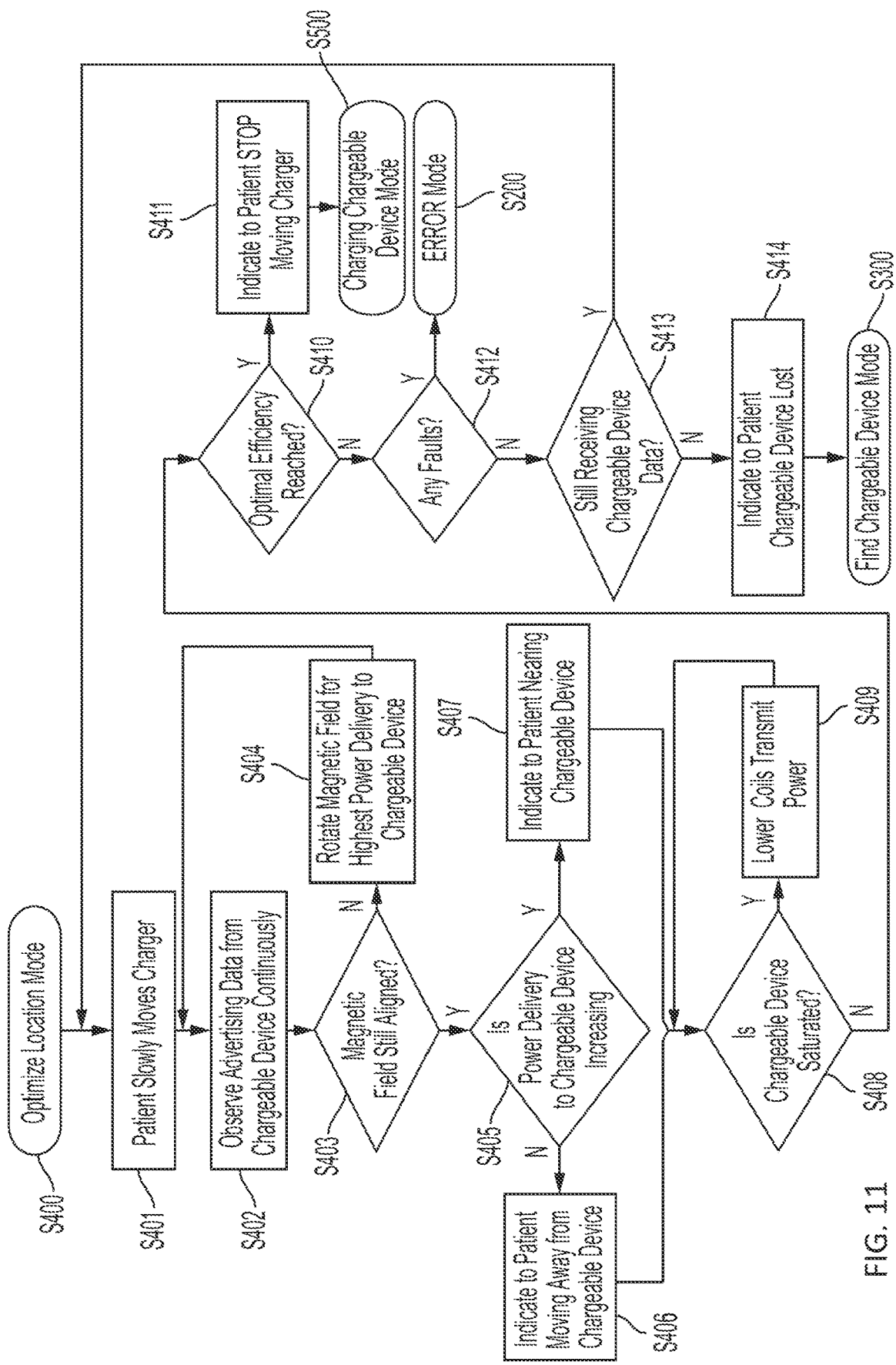
FIG. 11 shows a method flow chart for an optimize location mode according to some embodiments.
Figure 12:
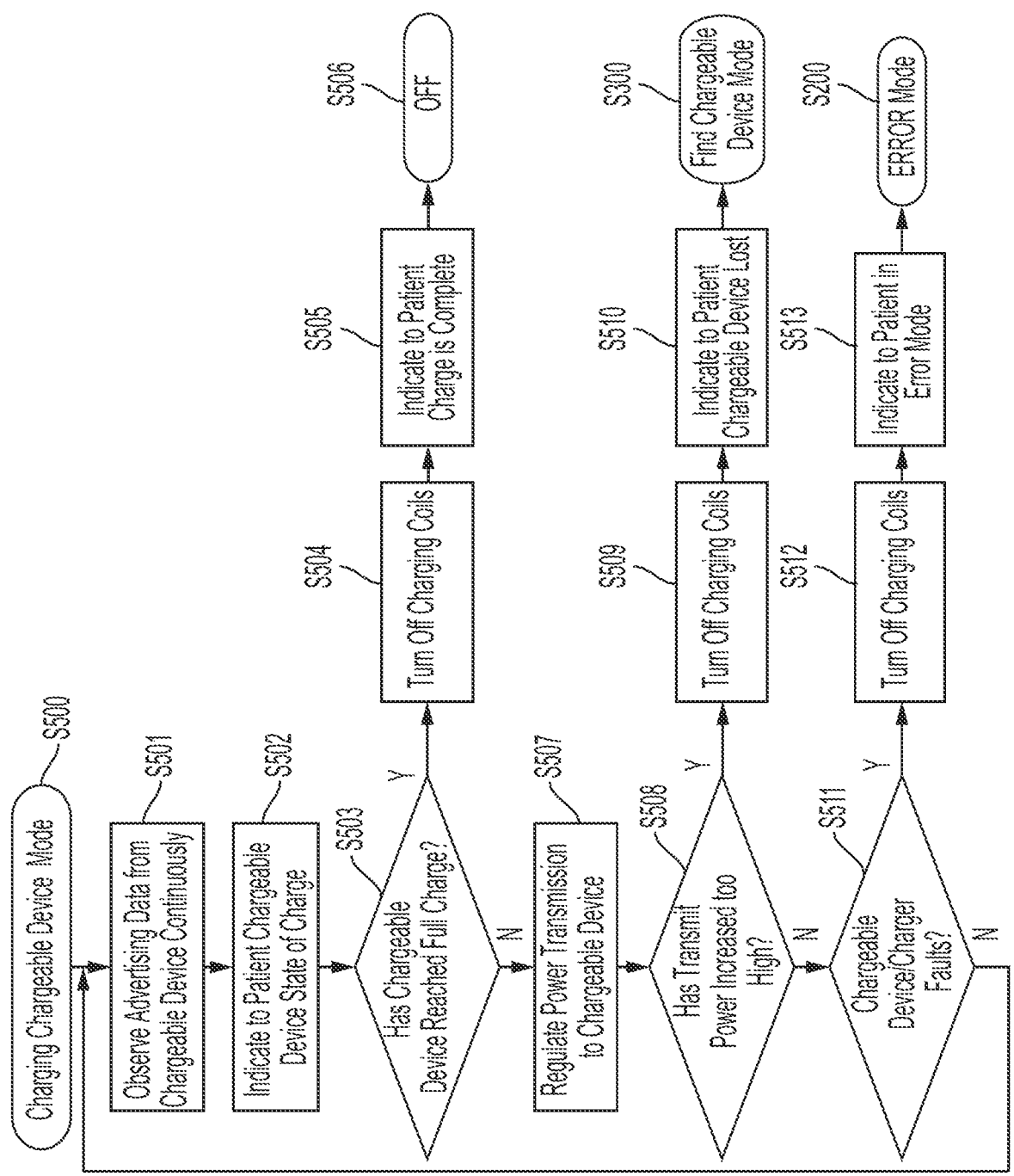
FIG. 12 shows a method flow chart for an electronic device charging mode according to some embodiments.
Figure 13:
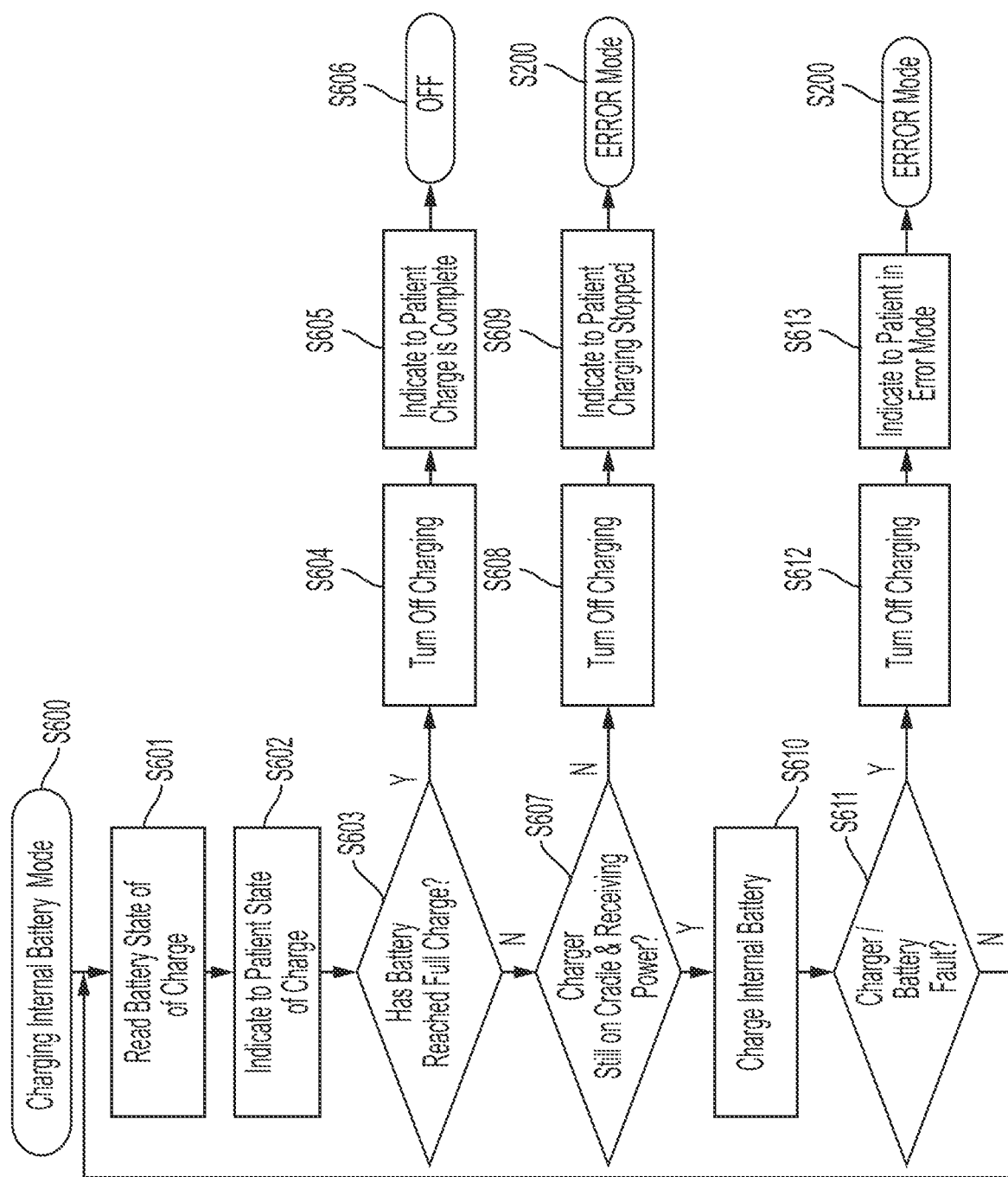
FIG. 13 shows a method flow chart for a wireless power transfer device charging mode according to some embodiments.

Various modes of operating a wireless power transfer system will now be described in more detail with reference to FIGS. 8-13. FIG. 8 illustrates an initialization mode; FIG. 9 illustrates an error mode; FIG. 10 illustrates a find the electronic device mode; FIG. 11 illustrates an optimize location mode; FIG. 12 illustrates an electronic device charging mode; and FIG. 13 illustrates a wireless power transfer device charging mode.

Referring to FIG. 8, an Initialization mode may begin at stage S100. The initialization mode may begin, for example, when the wireless power transfer device 10 is placed in the charging cradle 30, when a charge button is pressed, or when the wireless power transfer device 10 is trying to recover from a recoverable error. The charge button may be a button on the wireless power transfer device 10 that allows a user to initialize the wireless power transfer device 10 for charging the electronic device 20.

At stage S101, the wireless power transfer device 10 may determine whether a voltage of an internal battery (e.g., a rechargeable battery) of the wireless power transfer device 10 is greater than or equal to a minimum voltage. When the voltage of the internal battery is less than the minimum voltage, then the wireless power transfer device 10 may repeat stage S101. However, when the voltage of the internal battery is greater than or equal to the minimum voltage, the wireless power transfer device 10 may initialize the system of the wireless power transfer device 10 at stage S102.

After the wireless power transfer device 10 is initialized at stage S102, the wireless power transfer device 10 may perform a power up self-test at stage S103. For example, the wireless power transfer device 10 may test for internal faults (e.g., defects) or errors during stage S103, and the wireless power transfer device 10 may begin an error mode at stage S200 when the wireless power transfer device 10 detects an error such that the power up self-test fails. However, when at stage S103 the power up self-test is passed, the wireless power transfer device 10 may measure a voltage of the internal battery at stage S104 and communicate to the user the SoC of the internal battery at stage S105.

At stage S106, the wireless power transfer device 10 may determine whether the SoC of the internal battery is sufficient to charge (or drive) the electronic device 20. When the SoC of the internal battery is insufficiently low, the wireless power transfer device 10 may alert the user at S107 and proceed to stage S108. However, when at stage S106 the SoC is determined to be sufficient, the wireless power transfer device 10 may determine whether the charge button has been pressed at stage S108.

When the charge button has been pressed, the wireless power transfer device 10 may determine whether it is in a self-charging mode at stage S109. When the wireless power transfer device 10 is not in the self-charging mode, then the wireless power transfer device 10 may begin the find electronic device mode at stage S300. However, when at stage S109 the wireless power transfer device 10 is in the self-charging mode, the wireless power transfer device 10 may proceed to stage S110. Furthermore, when at stage S108 it is determined that the charge button has not been pressed, the wireless power transfer device 10 may detect whether a power supply from the charging cradle 30 is available.

When the wireless power transfer device 10 detects the power supply from the charger cradle 30, the wireless power transfer device 10 may begin the wireless power transfer device charging mode at stage S600. However, when at stage S110 the wireless power transfer device 10 does not detect the power supply from the charger cradle 30, the wireless power transfer device 10 may determine at stage S111 whether a set (e.g., predetermined) amount of time has passed since a previous stage, for example, stage S102 or stage S103.

When the wireless power transfer device 10 determines that the set amount of time has not elapsed, then the wireless power transfer device 10 may proceed to stage S104. However, when the set amount of time has elapsed, then the wireless power transfer device 10 may turn off at stage S112.

Referring to FIG. 9, after the error mode begins at stage S200, the wireless power transfer device 10 may determine at stage S201 whether it is able to recover from (e.g., resolve or remedy) the fault. When the wireless power transfer device 10 is able to recover from the fault, the wireless power transfer device 10 may begin the initialization mode at stage S100. However, when the wireless power transfer device 10 is unable to recover from the fault, the wireless power transfer device 10 may alert the user at stage S202 that the wireless power transfer device 10 is unable to recover. The wireless power transfer device 10 may then end the error mode at stage S203. In some embodiments, the wireless power transfer device 10 may turn off at stage S203.

Referring to FIG. 10, after the find electronic device mode begins at stage S300, the wireless power transfer device 10 may communicate to the user that the find electronic device mode has started. The wireless power transfer device 10 may drive the first and second transmitting coils 100 and 200 to generate and rotate an initial magnetic field at stage S302. At stage S303, the wireless power transfer device 10 may be placed at an initial position in approximate or estimated proximity to the electronic device 20, and the wireless power transfer device 10 may be moved slowly around the initial position. At stage S304, the wireless power transfer device 10 may communicate information to the user regarding whether the electronic device 20 has been located, for example, by receiving a signal from the electronic device 20, while the wireless power transfer device 10 is moved around the initial position.

The wireless power transfer device 10 may determine at stage S305 whether the electronic device 20 has been located within a set amount of time, for example, from a previous stage such as S303. When the electronic device 20 has not been located when the set amount of time elapses, the wireless power transfer device 10 may stop driving the first and second transmitting coils 100 and 200 to terminate the initial magnetic field at stage S306. The wireless power transfer device 10 may then communicate to the user that the electronic device 20 was not found at stage S307, and the wireless power transfer device 10 may turn off at stage S308. However, when at stage S305 the wireless power transfer device 10 determines within the set amount of time that the electronic device 20 has been found, then the wireless power transfer device 10 may communicate to the user that the electronic device 20 has been found at stage S309. The wireless power transfer device 10 may then begin an optimize location mode at stage S400.

Referring to FIG. 11, after the optimize location mode begins at stage S400 and at stage S401, the wireless power transfer device 10 may be slowly moved, for example, from a second position where the wireless power transfer device 10 was located when the electronic device 20 was found. The wireless power transfer device 10 may continuously communicate information to the user at stage S402 while the wireless power transfer device 10 is being moved. The information communicated at stage S402 may include whether the initial magnetic field is aligned with the receiver coil 800 and whether power delivered to the electronic device 20 is increasing or decreasing. The wireless power transfer device 10 may determine whether the initial magnetic field is aligned with the receiver coil 800 by utilizing a feedback system as described above.

At stage S403, the wireless power transfer device 10 may determine whether the initial magnetic field is aligned with the receiver coil 800. When the initial magnetic field is not aligned, the wireless power transfer device 10 may rotate the initial magnetic field as needed (e.g., by utilizing a feedback system as described above) at stage S404 to automatically align the initial magnetic field with the receiver coil 800. However, when at stage S403 the wireless power transfer device 10 determines that the initial magnetic field is aligned with the receiver coil 800, then the wireless power transfer device 10 may determine at stage S405 whether power delivered to the electronic device 20 is increasing as the wireless power transfer device 10 is moved. The wireless power transfer device 10 may then communicate to the user whether the wireless power transfer device 10 is being moved away from the electronic device 20 (stage S406) or toward the electronic device 20 (stage S407).

At stage S408, the wireless power transfer device 10 may determine whether the receiver coil 800 is saturated. Saturation of the receiver coil 800 may occur when an increase in magnitude of the initial magnetic field at the receiver coil 800 does not significantly increase the magnetization of the core material (e.g., ferrimagnetic material) of the receiver coil 800. When it is determined that the receiver coil 800 is saturated, the first and second amplitudes of the first and second currents utilized to generate the initial magnetic field may be reduced at stage S409, and the wireless power transfer device 10 may again determine whether the receiver coil 800 is saturated at stage S408. However, when at stage S408 it is determined that the receiver coil 800 is not saturated, the wireless power transfer device 10 may determine whether the wireless power transfer device 10 is at an optimal position and/or orientation at stage S410. The optimal position and/or orientation may correspond to a position and/or orientation of the wireless power transfer device 10 that results in a maximum power received in the receiver coil at set amplitudes of the first and second AC currents that do not saturate the receiver coil 800.

When it is determined that the wireless power transfer device 10 is at an optimal position and/or orientation, the wireless power transfer device 10 may communicate to the user to stop moving the wireless power transfer device 10 at stage S411, and the wireless power transfer device 10 may begin the electronic device charging mode at stage S500. However, when at stage S410 it is determined that the wireless power transfer device 10 is not at an optimal position and/or orientation, the wireless power transfer device 10 may conduct a test to detect faults at stage S412. When a fault is detected, the wireless power transfer device 10 may begin the error mode at stage S200. However, when no faults are detected, the wireless power transfer device 10 may determine whether information from the electronic device 20 is still being received at stage S413.

When information from the electronic device 20 is still being received, the user may continue to move the wireless power transfer device 10 at stage S401. For example, the wireless power transfer device 10 may prompt the user to continue to move the wireless power transfer device 10. However, when at stage S413 the wireless power transfer device 10 determines that information is not being received from the electronic device 20, the wireless power transfer device 10 may communicate to the user at stage S414 that the electronic device 20 has been lost, and the wireless power transfer device 10 may begin the find electronic device mode at stage S300.

Referring to FIG. 12, after the electronic device charging mode begins at stage S500, information from the electronic device 20 may be continuously received and monitored at stage S501, and the wireless power transfer device 10 may communicate information about the electronic device 20 (e.g., SoC of a battery or of an energy storage in the electronic device 20) to the user at stage S502.

At stage S503, the wireless power transfer device 10 may determine whether the electronic device 20 has reached a set SoC of the electronic device 20. For example, the wireless power transfer device 10 may determine whether the electronic device 20 has reached a fully charged state. When the electronic device 20 has reached the set SoC, the wireless power transfer device 10 may stop driving the first and second transmitting coils 100 and 200 at stage S504 to terminate the magnetic field generated by the wireless power transfer device 10. The wireless power transfer device 10 may then communicate to the user that the charge is complete at stage S505 before turning off at stage S506.

However, when at stage S503 the wireless power transfer device 10 determines that the set SoC of the electronic device 20 has not been reached, it may regulate power transmission to the electronic device 20 at stage S507. For example, the wireless power transfer device 10 may change the amplitudes of the first and second AC currents to reduce or increase the power provided to the electronic device 20.

At stage S508, the wireless power transfer device 10 may determine whether transmission power is at or above a set or predetermined threshold. When the transmission power is at or above the set or predetermined threshold, the wireless power transfer device 10 may turn off the first and second transmitting coils 100 and 200 at stage S509 to terminate the magnetic field. The wireless power transfer device 10 may then communicate to the user that the electronic device 20 has been lost at stage S510 and begin the find electronic device mode at stage S300.

However, when at stage S508 the wireless power transfer device 10 determines that the transmission power is below the set or predetermined threshold, then the wireless power transfer device 10 may determine whether any faults have occurred in the wireless power transfer device 10 and/or in the electronic device 20 at stage S511. When a fault is detected, the wireless power transfer device 10 may turn off the first and second transmitting coils 100 and 200 at stage S512. The wireless power transfer device 10 may then communicate to the user that a fault has been found and begin the error mode at stage S200.

However, when at stage S511 the wireless power transfer device 10 does not detect any faults, the wireless power transfer device 10 may proceed to stage S501 and continue to receive and monitor information received from the electronic device 20.

Referring to FIG. 13, the wireless power transfer device 10 may begin charging an internal battery via a power supply provided by the charging cradle 30 at stage S600 of the wireless power transfer device charging mode. The wireless power transfer device 10 may determine a SoC of the internal battery at stage S601 and communicate the SoC to the user at stage S602. At stage S603, the wireless power transfer device 10 may determine whether a set SoC of the internal battery has been reached. For example, the wireless power transfer device 10 may determine whether the internal battery has been fully charged.

When the wireless power transfer device 10 determines that the set SoC of the internal battery has been reached, the wireless power transfer device 10 may stop charging the internal battery at stage S604, communicate to the user that the charging process is complete at stage S605, and turn off at stage S606.

However, when at stage S603 the wireless power transfer device 10 determines that the internal battery has not reached the set SoC, the wireless power transfer device 10 may determine whether the wireless power transfer device 10 is still coupled to (e.g., on or in) the charger cradle 30 and receiving power from the charger cradle 30. When the wireless power transfer device 10 is not coupled to the charger cradle 30 or not receiving power from the charger cradle 30, the wireless power transfer device 10 may stop charging the internal battery at stage S608, communicate to the user that the charging process has stopped at stage S609, and begin the error mode at stage S200.

However, when at stage S607 the wireless power transfer device 10 determines that the wireless power transfer device 10 is coupled to the charger cradle 30 and is receiving power from the charger cradle 30, the wireless power transfer device 10 may continue to charge the internal battery at stage S610. At stage S611, the wireless power transfer device 10 may determine whether faults have occurred in the wireless power transfer device 10 and/or in the internal battery at stage S611. When a fault is detected, the wireless power transfer device 10 may stop the charging process at stage S612, communicate to the client that the charging process has stopped at stage S613, and begin the error mode at stage S200.

However, when at stage S611 the wireless power transfer device 10 does not detect any faults, the wireless power transfer device 10 may proceed to stage S601 to determine the SoC of the internal battery.

Figure 14:
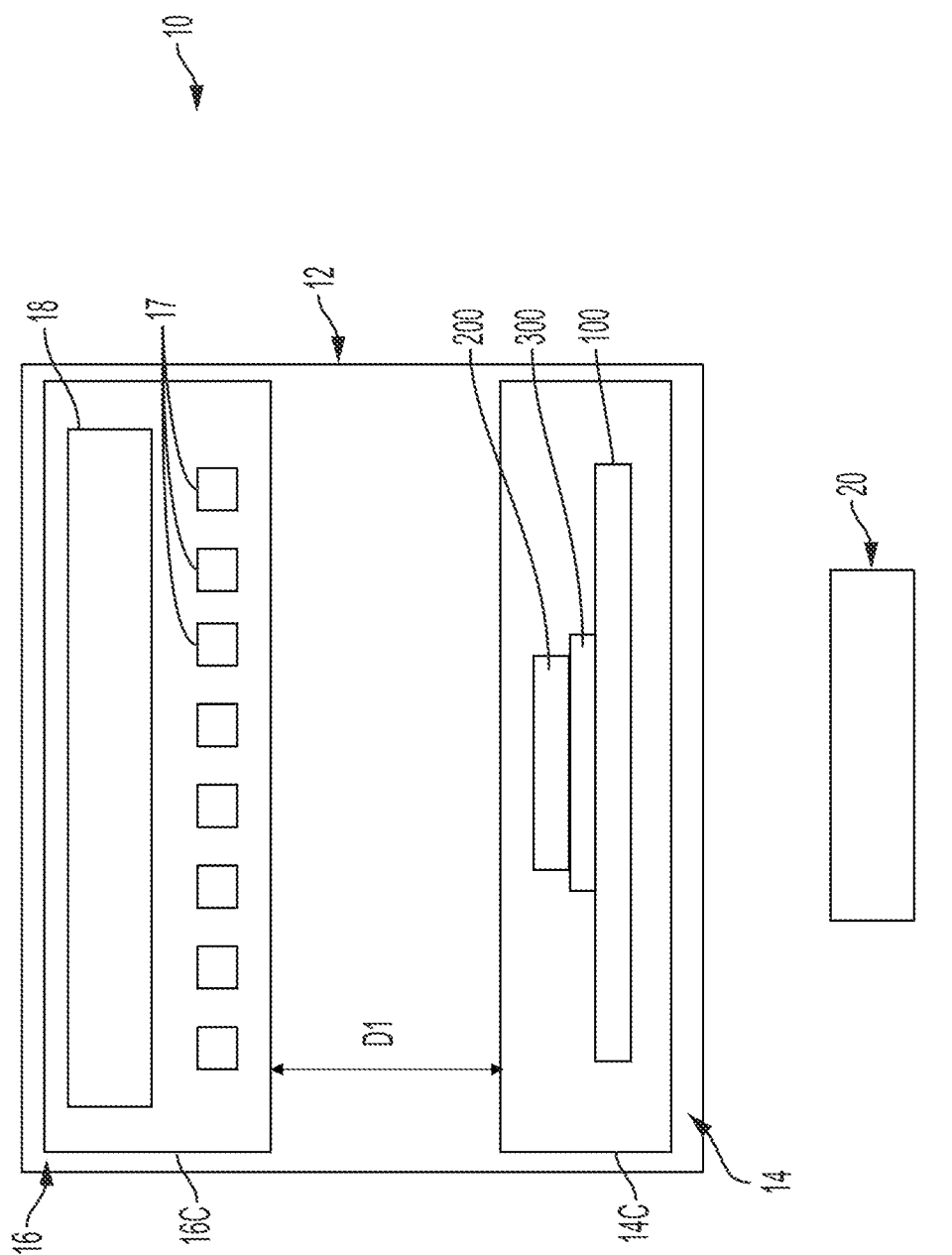
FIG. 14 shows a schematic view of a wireless power transfer system according to some embodiments.
Figure 15:
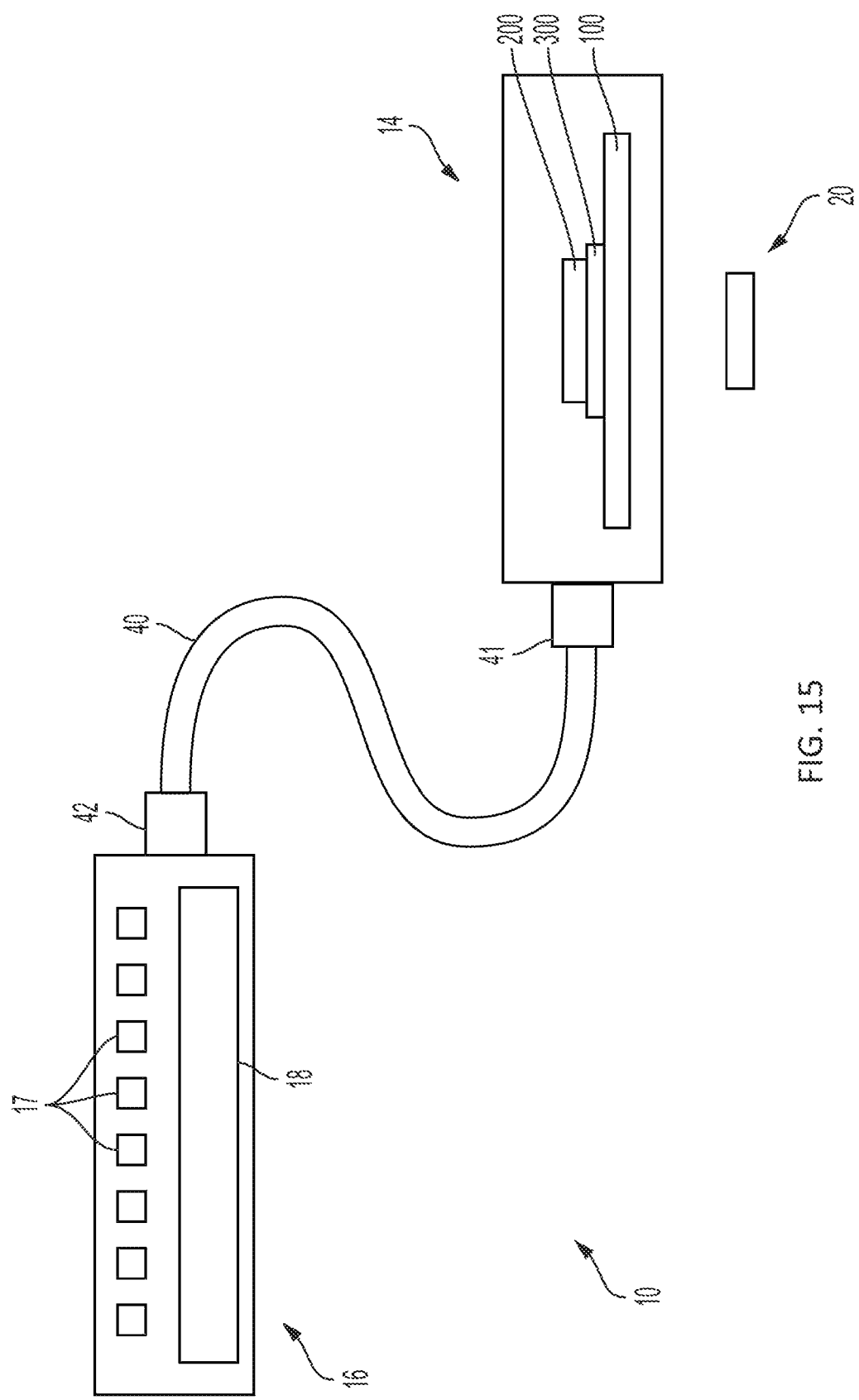
FIG. 15 shows a schematic view of a wireless power transfer system according to some embodiments.
Figure 16:
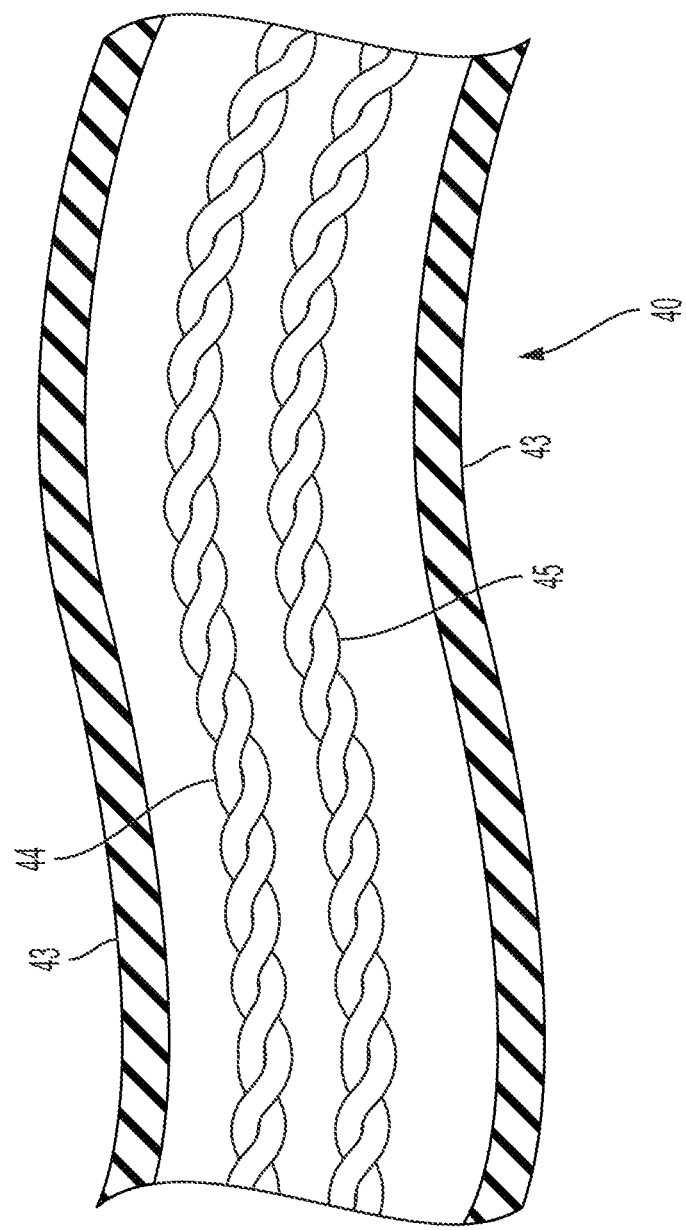
FIG. 16 shows a cross-sectional partial view of the cable illustrated in FIG. 15.

FIG. 14 shows a schematic view of a wireless power transfer system according to some embodiments. FIG. 15 shows a schematic view of a wireless power transfer system according to some embodiments. FIG. 16 shows a cross-sectional partial view of the cable illustrated in FIG. 15.

Referring to FIGS. 1 and 14-16, the wireless power transfer device 10 may include a coil assembly 14 and an electronics assembly 16 spaced apart from the coil assembly 14. The coil assembly 14 includes the first transmitting coil 100, the second transmitting coil 200, and the non-magnetic material in the intermediate space 300a, and the electronics assembly 16 may include one or more electronic components 17 of the wireless power transfer device 10. By including the electronic components 17 in the electronics assembly 16 and spacing the electronics assembly 16 apart from the coil assembly 14, negative interactions between the electronic components 17 and a magnetic field generated by the first and second transmitting coils 100 and 200 may be reduced or minimized, as explained in more detail below.

Figure 22A:
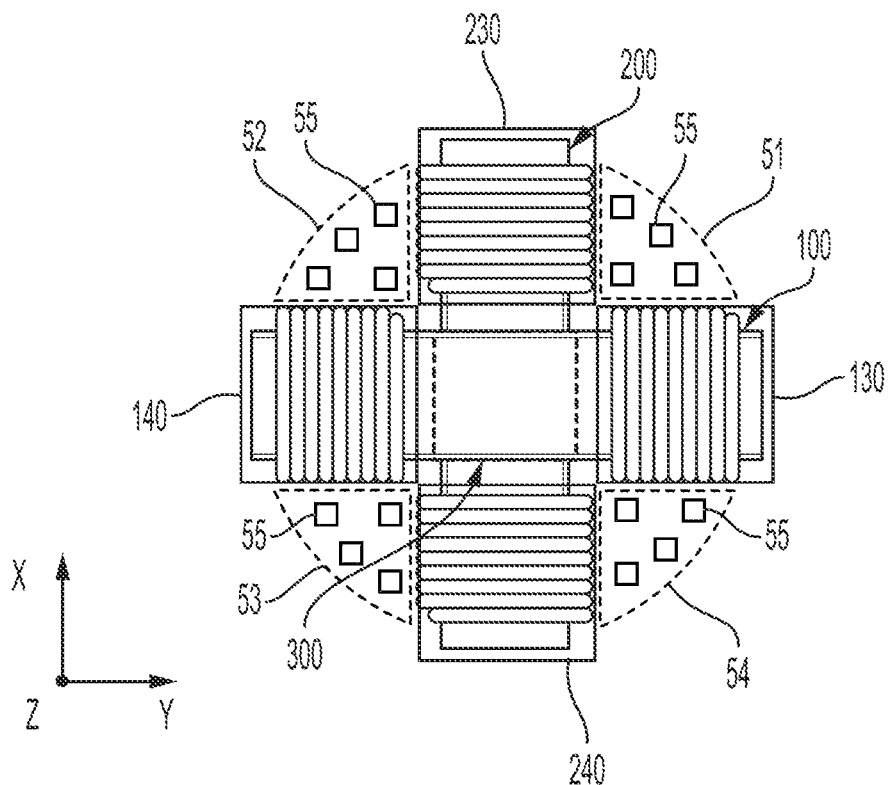
FIG. 22A shows a plan view of a coil assembly according to some embodiments.

The coil assembly 14 may include one or more electronic components (see 55 in FIG. 22A). The electronic components of the coil assembly 14 and the electronic components of the electronics assembly 16 may each include active electronic components and/or passive electronic components. Active electronic components may refer to electronic components that require a source of energy (e.g., a current) to perform their function, and passive electronic components may refer to electronic components that are able to influence the flow of electricity running through them. Active electronic components may include, for example, transistors and diodes, and passive electronic components may include, for example, resistors, capacitors, inductors, and transducers.

In some embodiments, the electronic components in the coil assembly 14 may include circuit elements of one or more LC resonant circuits and/or circuit elements of one or more current sensors. For example, the coil assembly 14 may include one or more transistors, one or more resistors, one or more capacitors, one or more inductors, one or more transformers, one or more diodes, one or more transducers, etc.

The electronics assembly 16 may include a battery 18, which may be a permanent or rechargeable battery. In some embodiments, the electronics components 17 of the electronics assembly 16 include the first and second drivers 410 and 420, the first and second power modulation electronics 510 and 520, the controller 600, the receiver 700, and/or other circuit elements (e.g., circuit elements of one or more LC resonant circuits and/or circuit elements of one or more current sensing circuits).

The components of the coil assembly 14 may be housed in a coil assembly container 14C that partially or entirely surrounds or encloses the components of the coil assembly 14 and that includes any suitable material such as plastic, glass, metal, etc.

The components of the electronics assembly 16 may be housed in an electronics assembly container 16C that partially or entirely surrounds or encloses the components of the electronics assembly 16 and that includes any suitable material such as plastic, glass, metal, etc.

The electronics assembly 16 may be spaced apart from the coil assembly 14 by a set distance in order to decrease the negative interactions between the electronic components 17 in the electronics assembly 16 and the magnetic field generated by the first and second transmitting coils 100 and 200. The electronic components 17 may convert energy from the magnetic field into eddy currents, which may reduce the efficiency of the wireless power transfer device 10 to wirelessly transfer energy to the electronic device 20, thereby requiring a larger power supply and a larger battery (e.g., battery 18). The eddy currents created in the electronic components 17 will also generate magnetic fields, which may distort the magnetic field generated by the first and second transmitting coils 100 and 200 at the electronic device 20, and thus, may reduce the accuracy of the wireless power transfer device's alignment of the magnetic field generated by the first and second transmitting coils 100 and 200 with the electronic device 20 at the electronic device 20. At least some of the energy of the eddy currents in the electronic components 17 will be dissipated as heat in regions around the electronic components 17, thereby increasing the temperature of the electronic components 17 and reducing their efficiency, thus requiring a larger power supply and a larger battery (e.g., battery 18).

The above-described negative interactions between electronic components 17 and the magnetic field generated by the first and second transmitting coils 100 and 200 may be reduced by including the electronic components 17 in the electronics assembly 16 and spacing the electronics assembly 16 apart from the coil assembly 14 by a set distance. Because the magnetic field generated by the first and second transmitting coils 100 and 200 will generally decrease in magnitude as distance from the first and second transmitting coils 100 and 200 increases, increasing the set distance between the electronics assembly 16 and the coil assembly 14 will reduce the above-described negative interactions.

Referring to FIG. 14, the coil assembly 14 and the electronics assembly 16 may be in a housing container 12 and spaced apart from each other in the housing container 12 by a first distance D1. The first distance D1 may be a smallest distance between the coil assembly 14 and the electronics assembly 16. The housing container 12 may include any suitable material, such as plastic, glass, etc.

The housing container 12 may partially or entirely surround the coil assembly 14 and the electronics assembly 16. The coil assembly 14 and the electronics assembly 16 may be set or fixed in respective regions within the housing container 12 by any suitable means. For example, the coil assembly 14 and the electronics assembly 16 may each be attached to a wall of the housing container 12 by an adhesive. In some embodiments, the coil assembly 14 and the electronics assembly 16 may each be integrated with the housing container 12.

In some embodiments, the coil assembly container 14C and/or the electronics assembly container 16C is not provided, and the components of the coil assembly 14 are spaced apart from the components of the electronics assembly 16 in the housing container 12 with or without a shielding material (e.g., a shielding layer) provided between the components of the coil assembly 14 and the components of the electronics assembly 16. The shielding material may include any suitable material such as a metal (e.g., steel, copper, brass, nickel, silver, and/or tin) and/or a nonmagnetic material. One or more wires may be provided to electrically couple the components of the electronics assembly 16 to the components of the coil assembly 14.

The first distance D1 may be a distance that suitably or desirably reduces interactions between the electronic components 17 in the electronics assembly 16 and the magnetic field generated by the first and second transmitting coils 100 and 200. Factors that may affect the distance D1 may include the length of the first transmitting coil 100, the length of the second transmitting coil 200, and/or the number, arrangement, and materials of the electronic components 17 in the electronics assembly 16. In some embodiments, the first distance D1 may be greater than or equal to 0.25, 0.5, 0.75, 1.0, 1.5, or 2.0 times a length of the first transmitting coil 100 along the first axis 100A and/or a length of the second transmitting coil 200 along the second axis 200A.

Although interaction between the electronic components 17 in the electronics assembly 16 and the magnetic field generated by the first and second transmitting coils 100 and 200 may be reduced by spacing the electronics assembly 16 away from the coil assembly 14, some such interaction may be unavoidable. However, a shape of a collective magnetic field (i.e., a magnetic field defined as a superposition of the magnetic fields) generated by the eddy currents in the electronic components 17 of the electronics assembly 16 in response to the magnetic field generated by the first and second transmitting coils 100 and 200 is determined at least in part by the configuration of the electronic components 17 (e.g., the position and/or orientation of the electronic components 17 relative to each other) in the electronics assembly 16.

The configuration of the electronic components 17 of the electronics assembly 16 may be a balanced configuration such that the magnitude of the collective magnetic field at the electronic device 20 is substantially reduced or minimized compared to other configurations and/or such that alignment between the direction of the collective magnetic field and the magnetic field generated by the first and second transmitting coils 100 and 200 at the electronic device 20 is increased or maximized compared to other configurations (e.g., compared to 85%, 87%, 90%, 93%, 95%, 97%, or 99% of all potential configurations of the electronic components 17). A balanced configuration of the electronic components 17 in the electronics assembly 16 may reduce or eliminate distortion in the direction of the magnetic field generated by the first and second transmitting coils 100 and 200 at the electronic device 20.

Referring to FIG. 15, the electronics assembly 16 may be electrically coupled to the coil assembly 14 by a cable (or board) 40. The cable 40 may include one or more internal wires electrically coupled between electronic components 17 in the electronics assembly 16 and electronic components in the coil assembly 14 to allow signals to be transmitted between the electronic components 17 in the electronics assembly 16 and the electronic components in the coil assembly 14.

A length of the cable 40 may be any length that suitably or desirably reduces interactions between the electronic components 17 in the electronics assembly 16 and the magnetic field generated by the first and second transmitting coils 100 and 200. Factors that may affect the length of the cable 40 may include the length of the first transmitting coil 100, the length of the second transmitting coil 200, and/or the number, arrangement, and materials of the electronic components 17 in the electronics assembly 16. In some embodiments, the first distance D1 may be greater than or equal to 0.5, 0.75, 1.0, 1.5, 2.0, 5.0, or 10.0 times the length of the first transmitting coil 100 along the first axis 100A and/or of the second transmitting coil 200 along the second axis 200A.

The cable 40 may include a first connector 41 at a first end of the cable 40 configured to couple and decouple the first end of the cable 40 to the coil assembly 14, or the first end of the cable 40 may be permanently coupled to the coil assembly 14. The cable 40 may include a second connector 42 at a second end of the cable 40 configured to couple and decouple the second end of the cable 40 to the electronics assembly 16, or the second end of the cable 40 may be permanently coupled to the electronics assembly 16. The first connector 41 and/or the second connector 42 may be lockable connectors. A lockable connector may refer to a connector that includes a locking mechanism generally known or available in the art that, when the connector is coupled to an assembly (e.g., the coil assembly 14 or the electronics assembly 16) and the locking mechanism is locked, prevents the connector from being decoupled from the assembly by a pulling force less than a threshold amount. The lockability of a connector provides a safety feature to reduce the risk of disconnection between the electronics assembly 16 and the coil assembly 14, for example, when the wireless power transfer device 10 is in use.

Referring to FIG. 16, the one or more internal wires in the cable 40 may include a first twisted pair of wires 44 including two wires, each electrically coupled to the first driver 410 at one end and electrically coupled to respective ends of the first wire 110 of the first transmitting coil 100 at another end. Accordingly, the first twisted pair of wires 44 may provide the first AC current to the first wire 110. The internal wires in the cable 40 may also include a second twisted pair of wires including two wires, each electrically coupled to the second driver 420 at one end and electrically coupled to respective ends of the second wire 210 of the second transmitting coil 200 at another end. Accordingly, the second twisted pair of wires may provide the second AC current to the second wire 210.

The internal wires may include a third twisted pair of wires 45 including two wires to respectively provide information about currents in the first and second wires 110 and 210 from the coil assembly 14 to the electronics assembly 16. In some embodiments, one of the two wires of the third twisted pair of wires 45 may have one end electrically coupled to the first wire 110 or to a current sensing circuit configured to measure or sense current in the first wire 110, and another end electrically coupled to the controller 600. Another one of the two wires of the third twisted pair of wires 45 may have one end electrically coupled to the second wire 210 or to a current sensing circuit configured to measure or sense current in the second wire 210, and another end electrically coupled to the controller 600.

The information about the currents in the first and second transmitting coils 100 and 200 that is provided via the third twisted pair of wires 45 may be utilized in a feedback system as described herein, for example, the second feedback system that utilizes load modulation. For example, the information about the currents in the first and second transmitting coils 100 and 200 may include and/or correspond to information in the signal transmitted from the receiver coil 800 to the wireless power transfer device 10 as described herein.

In some embodiments, at least one (e.g., all) of the one or more internal wires in the cable 40 is a shielded wire coated in a shielding material (e.g., braided copper or metallic coating). In some embodiments, a set of wires of the one or more internal wires may also be collectively shielded. For example, each of the two wires of the first twisted pair of wires 44 may be partially or entirely surrounded (e.g., coated) by a shielding material, and an additional shielding layer may partially or entirely surround (e.g., coat) both of the two wires of the first twisted pair of wires 44. Thus, the two wires of the first twisted pair of wires may be at least double shielded by the shielding material surrounding the two wires individually and by another shielding material surrounding the two wires collectively. In some embodiments, the internal wires may include Litz wire.

The cable 40 may include a sheath 43 as an outermost layer that partially or entirely encloses the one or more internal wires. The sheath 43 may include a shielding material.

Figure 17:
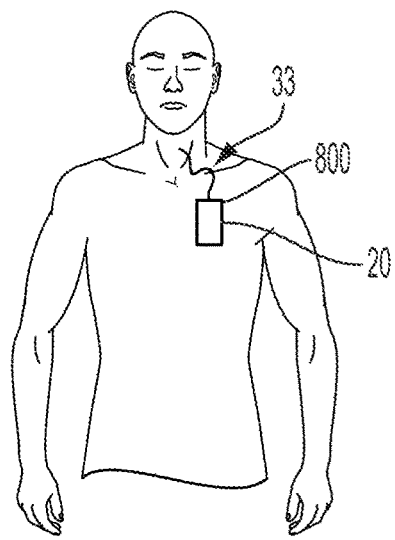
FIG. 17 shows a possible placement of an electronic device in a user.
Figure 18:
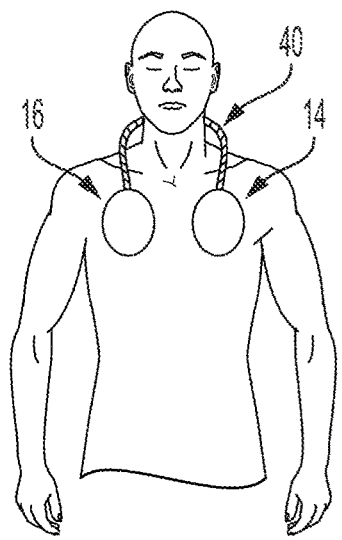
FIG. 18 shows a possible placement of a wireless power transfer device on the user of FIG. 17.
Figure 19:
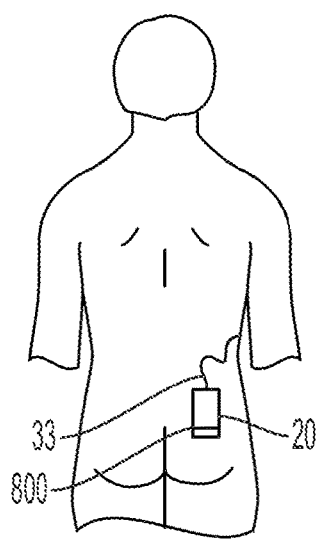
FIG. 19 shows another possible placement of an electronics device in a user.
Figure 20:
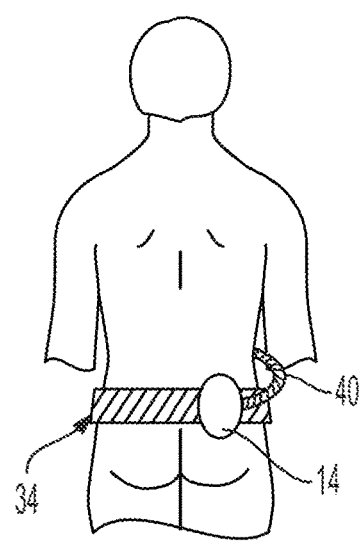
FIGS. 20 and 21 show a possible placement of the wireless power transfer device on the user of FIG. 19.
Figure 21:
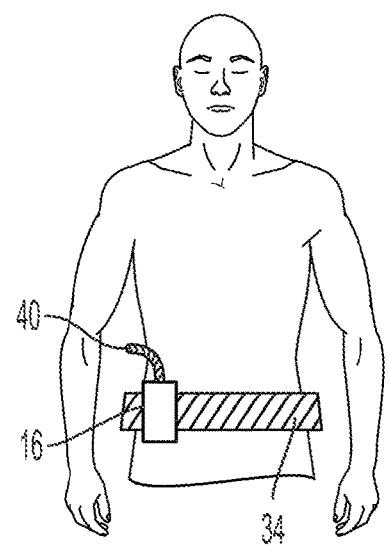

FIG. 17 shows a possible placement of an electronic device in a user. FIG. 18 shows a possible placement of a wireless power transfer device on the user of FIG. 17. FIG. 19 shows another possible placement of an electronics device in a user. FIGS. 20 and 21 show a possible placement of the wireless power transfer device on the user of FIG. 19.

Referring to FIGS. 17-21, electrically and manually coupling the electronics assembly 16 to the coil assembly 14 with the cable 40 increases the freedom that a user has to place the wireless power transfer device 10.

As shown in FIG. 17, the electronic device 20 may include a stimulator 33 (e.g., an electrode to provide stimulation to biological tissue). FIG. 17 shows a possible placement of the electronic device 20 in a user (e.g., in an upper torso region), and FIG. 18 illustrates how the cable 40 may allow the user to control placement of the coil assembly 14 in proximity with the electronic device 20 and space the electronics assembly 16 away from the coil assembly 14. For example, the user may wrap the cable 40 around his or her neck to allow the coil assembly 14 to be in proximity with the electronic device 20 at the left side of his or her chest and to allow the electronics assembly 16 to be at the right side of his or her chest.

FIG. 19 shows another possible placement of the electronic device 20 in a user (e.g., a lower torso region), and FIGS. 20 and 21 illustrate how the cable 40 may allow the user to control placement of the coil assembly 14 in proximity with the electronic device 20 and space the electronics assembly 16 away from the coil assembly 14. For example, the user may wrap the cable around the right or left side of his or her torso to allow the coil assembly 14 to be in proximity with the electronic device 20 at a front side of the user's lower torso and to allow the electronics assembly 16 to be at the back side of the user's lower torso. In some embodiments, the coil assembly 14 and the electronics assembly 16 may be attachable to a belt 34 configured to allow the coil assembly 14 and the electronics assembly to be attached or secured thereto. In some embodiments, the electronics assembly 16 may include a display to provide an interface with the wireless power transfer system.

Figure 22B:
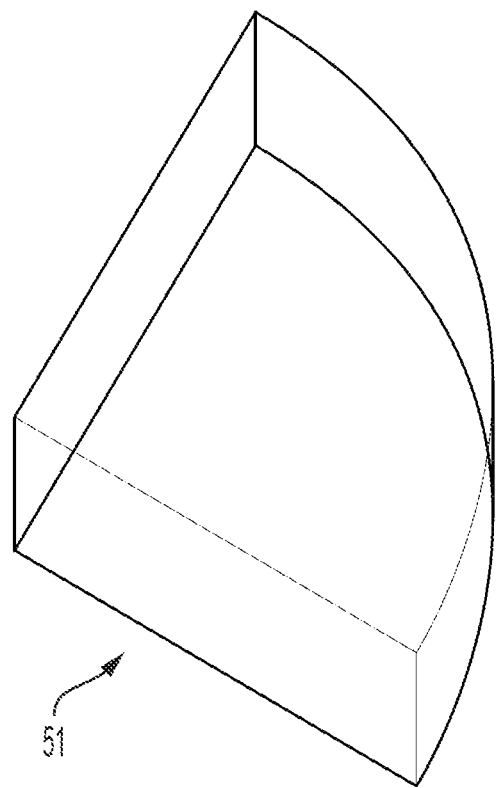
FIG. 22B shows a perspective view of a magnetic field shallow zone of FIG. 22A according to some embodiments.
Figure 23:
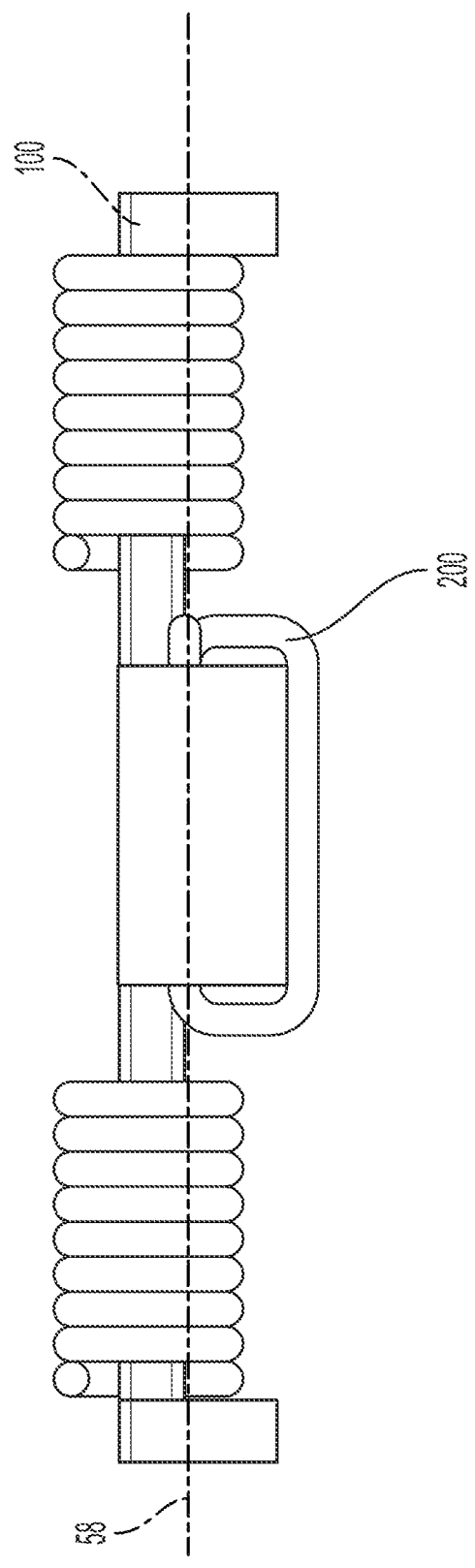
FIG. 23 shows a side view of the first and second transmitting coils according to some embodiments.
Figure 24:
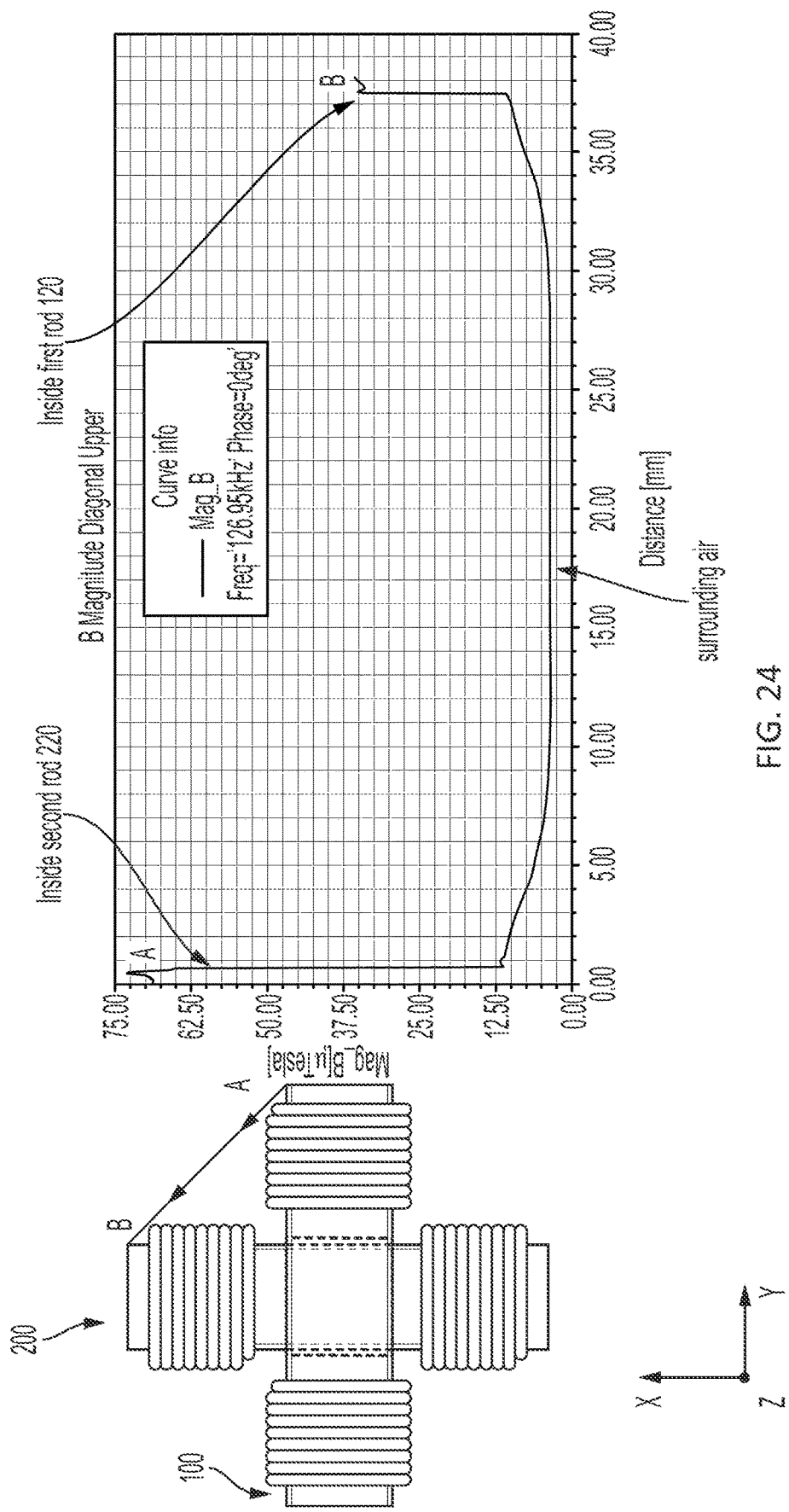
FIG. 24 shows a plan view of first and second transmitting coils and a graph of a magnitude of the magnetic field along line A-B generated by the first and second transmitting coils when the first and second transmitting coils are driven with AC currents that are in-phase and of a same amplitude, according to some embodiments.
Figure 25:
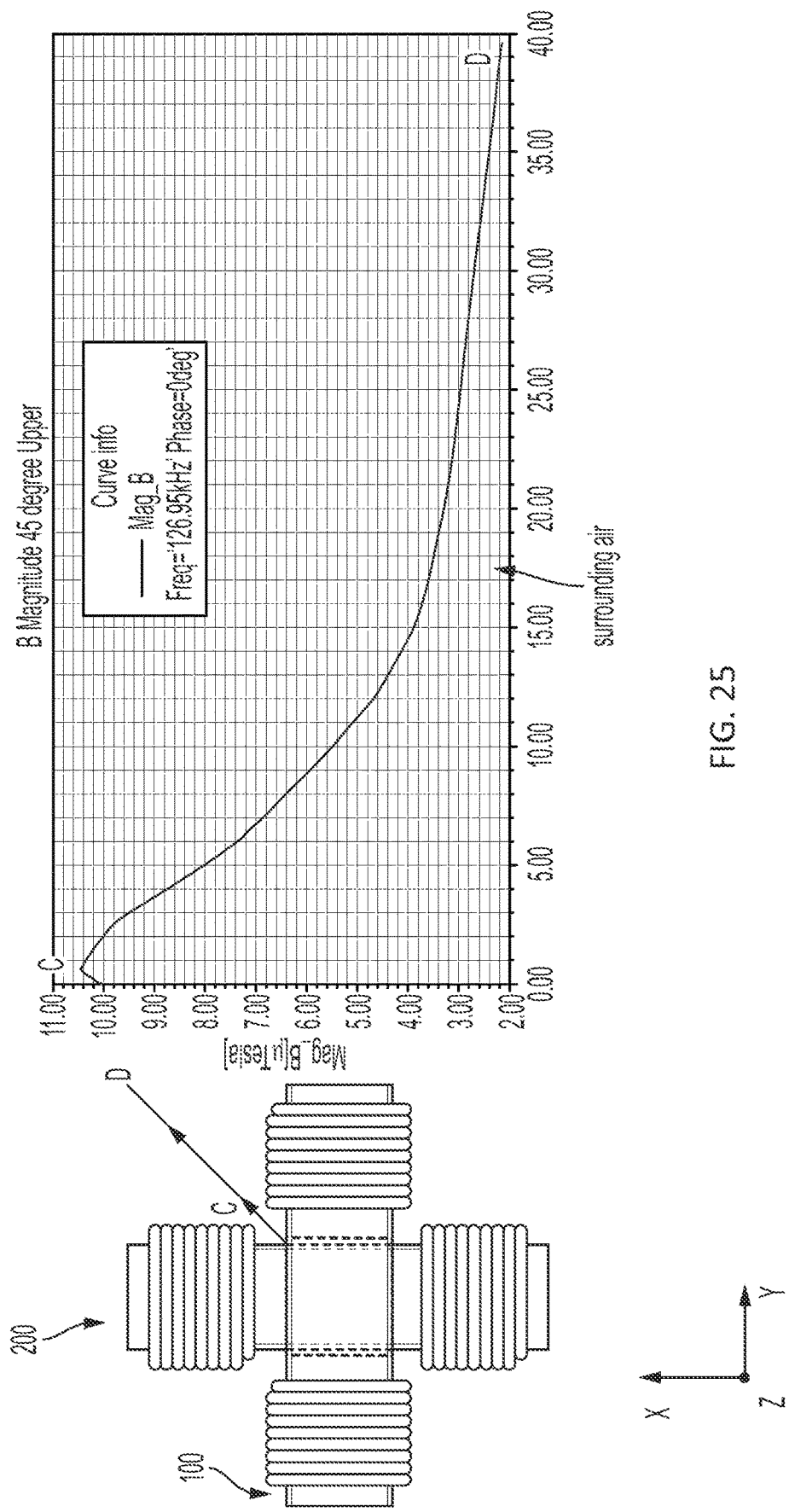
FIG. 25 shows a plan view of first and second transmitting coils and a graph of a magnitude of the magnetic field along line C-D generated by the first and second transmitting coils when the first and second transmitting coils are driven with AC currents that are in-phase and of a same amplitude, according to some embodiments.
Figure 26:
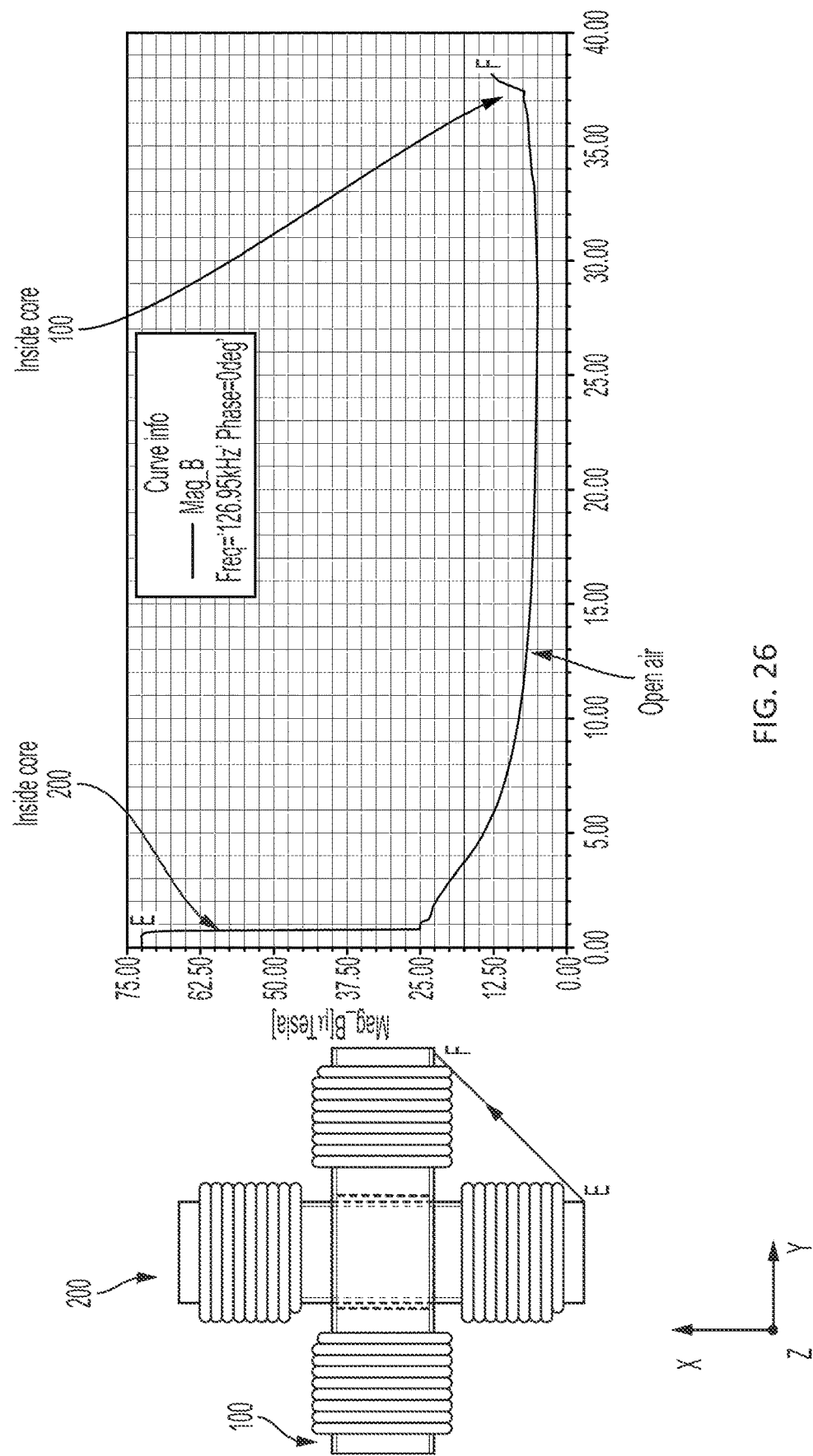
FIG. 26 shows a plan view of first and second transmitting coils and a graph of a magnitude of the magnetic field along line E-F generated by the first and second transmitting coils when the first transmitting coil is driven with AC current and the second transmitting coil is not driven, according to some embodiments.
Figure 27:
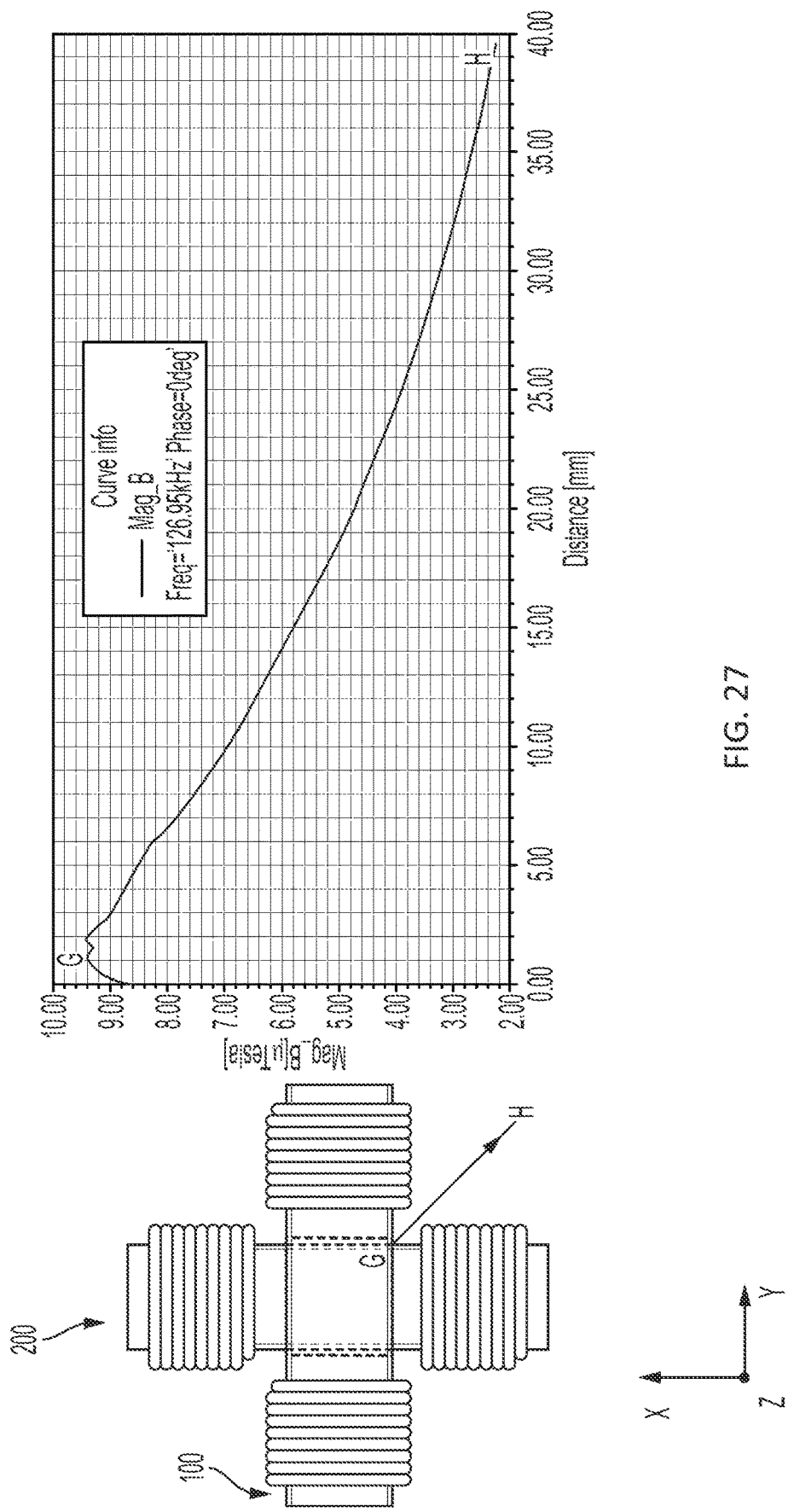
FIG. 27 shows a plan view of first and second transmitting coils and a graph of a magnitude of the magnetic field along line G-H generated by the first and second transmitting coils when the first transmitting coil is driven with AC current and the second transmitting coil is not driven, according to some embodiments.

FIG. 22A shows a plan view of a coil assembly according to some embodiments. FIG. 22B shows a perspective view of a magnetic field shallow zone of FIG. 22A according to some embodiments. FIG. 23 shows a side view of the first and second transmitting coils according to some embodiments. FIG. 24 shows a plan view of the first and second transmitting coils and a graph of a magnitude of the magnetic field along line A-B generated by the first and second transmitting coils when the first and second transmitting coils are driven with AC currents that are in-phase and of a same amplitude, according to some embodiments. FIG. 25 shows a plan view of the first and second transmitting coils and a graph of a magnitude of the magnetic field along line C-D generated by the first and second transmitting coils when the first and second transmitting coils are driven with AC currents that are in-phase and of a same amplitude, according to some embodiments. FIG. 26 shows a plan view of the first and second transmitting coils and a graph of a magnitude of the magnetic field along line E-F generated by the first and second transmitting coils when the first transmitting coil is driven with AC current and the second transmitting coil is not driven, according to some embodiments. FIG. 27 shows a plan view of the first and second transmitting coils and a graph of a magnitude of the magnetic field along line G-H generated by the first and second transmitting coils when the first transmitting coil is driven with AC current and the second transmitting coil is not driven, according to some embodiments.

Referring to FIGS. 22A-27, at least one electronic component 55 may be included in the coil assembly 14 and positioned in a magnetic field shallow zone. The electronic components 55 may include active electronic components and/or passive electronic components. The electronic components 55 may include electronic components to drive the first and second transmitting coils 100 and 200, electronic components of one or more LC resonant circuits, electronic components of a feedback system, and/or electronic components utilized to align a magnetic field generated by the first and second transmitting coils 100 and 200 with the electronic device 20.

As explained herein, negative interactions between the electronic components 55 and the magnetic field generated by the first and second transmitting coils 100 and 200 may occur, and the severity of these negative interactions is generally proportional to the magnetic flux of the magnetic field through surfaces of the electronic components 55. The magnetic flux through a surface of the electronic components 55 generally increases as the magnitude of the magnetic field at the surface increases and as the angle between the surface and the magnetic field at the surface gets closer to 90 degrees. Accordingly, it is desirable to position and/or orient the electronic components 55 in the coil assembly 14 to reduce the magnitude of the magnetic field at surfaces of the electronic components 55 and/or to decrease the angle between the surfaces and the magnetic field at the surfaces.

One or more magnetic field shallow zones may exist near the first and second transmitting coils 100 and 200, where a magnitude of a magnetic field generated by the first and second transmitting coils 100 and 200 is relatively low and/or substantially reduced, and where one or more of the electronic components 55 may be positioned in the magnetic field shallow zones to reduce or minimize the negative interactions between the electronic components and the magnetic field.

Referring to FIG. 22A, the first and second transmitting coils 100 and 200 may cross each other in a plan view at the area of overlap 300, and the magnetic field shallow zones may be positioned in a plan view angularly between the first transmitting coil 100 and the second transmitting coil 200.

For example, the first transmitting coil 100 may include a first portion 130 extending in the plan view from the area of overlap 300 (e.g., from a first side of the area of overlap 300) and a second portion 140 extending in the plan view from the area of overlap 300 (e.g., from a second side of the area of overlap 300 opposite to the first side), and the second transmitting coil 200 may include a first portion 230 extending in the plan view from the area of overlap 300 (e.g., from a third side of the area of overlap 300) and a second portion 240 extending in the plan view from the area of overlap 300 (e.g., from a fourth side of the area of overlap 300 opposite to the third side). In some embodiments, the area of overlap 300 may form a square or rectangle shape in the plan view defined by the first side, the second side, the third side, and the fourth side of the area of overlap 300.

A first magnetic field shallow zone 51 may be positioned in the plan view angularly between the first portion 130 and the first portion 230, a second magnetic field shallow zone 52 may be positioned in the plan view angularly between the second portion 140 and the first portion 230, a third magnetic field shallow zone 53 may be positioned in the plan view between the second portion 140 and the second portion 240, and a fourth magnetic field shallow zone 54 may be positioned in the plan view angularly between the first portion 130 and the second portion 240.

The magnetic field shallow zones may all be the same or similar in geometric shape, or one or more magnetic field shallow zones may be different in shape compared to one or more of the remaining magnetic field shallow zones.

In some embodiments, the first magnetic field shallow zone 51 may have a planar shape in the plan view of a rectangle (e.g., a square) or of a sector of a circle, ellipse, or egg shape. The planar shape may correspond to a top surface and/or bottom surface of the first magnetic field shallow zone 51. When the planar shape is a sector, the sector may span an angle ranging from about 15 degrees to about 165 degrees, about 45 degrees to about 135 degrees, about 88 degrees to about 92 degrees, 89 degrees to 91 degrees, or about 90 degrees. Two straight sides of the sector may be generally parallel to, and/or adjacent to, sidewalls of the first and second portions 130 and 230 that face the first magnetic field shallow zone 51. The corner of the sector where the two straight sides cross may be at or near, or may correspond to, a corner in the plan view where the sidewalls of the first and second portions 130 and 230 that face toward the first magnetic field shallow zone 51 cross. The two straight sides of the sector may have lengths respectively equal to or less than the sidewalls of the first and second portions 130 and 230 that face the first magnetic field shallow zone 51. In some embodiments, the planar shape of the first magnetic field shallow zone 51 is a sector of a circle having a radius equal to or less than the length of the first portion 130 and/or of the first portion 230. For example, the radius may be equal to or less than a distance between a first point along the first axis 100A corresponding to an end of the first transmitting coil 100 and a second point along the first axis 100A corresponding to the first side of the area of overlap 300.

In some embodiments, the planar shape of the first magnetic field shallow zone 51 is a rectangle, and two crossing sides of the rectangle and the corner of the rectangle where the two crossing sides cross may have features the same as or similar to the features described herein of the two straight sides of the sector and of the corner of the sector where the two straight sides of the sector cross.

The first magnetic field shallow zone 51 may have a thickness in a thickness direction (e.g., the Z-direction, as shown in FIG. 22A) perpendicular to the plan view (e.g., the X-Y plane, as shown in FIG. 22A), and the thickness of the first magnetic field shallow zone 51 may be uniform or variable over the planar shape of the first magnetic field shallow zone 51. In some embodiments, the thickness of the first magnetic field shallow zone 51 may be equal to or less than a largest or smallest distance in the thickness direction between a top side of a topmost one of the first and second transmitting coils 100 and 200 and a bottom side of another one of the first and second transmitting coils 100 and 200, for example, equal to or less than 0.5, 0.25, 0.10, 0.05, or 0.01 times any such thickness. In some examples, the thickness of the first magnetic field shallow zone 51 may be equal to or less than a largest, smallest, or average thickness of the first transmitting coil 100 or of the second transmitting coil 200, for example, equal to or less than 0.5, 0.25, 0.10, 0.05, or 0.01 times any such thickness.

The first magnetic field shallow zone 51 may be positioned along the thickness direction between the first and second transmitting coils 100 and 200 (e.g., between a top surface of a topmost one of the first and second transmitting coils 100 and 200 and a bottom surface of another one of the first and second transmitting coils 100 and 200).

Referring to FIG. 23, a plane 58 parallel to the plan view (e.g., parallel to the X-Y plane) may extend between the first and second transmitting coils 100 and 200, for example, between a bottom surface of a topmost one of the first and second transmitting coils 100 and 200 and a top surface of another one of the first and second transmitting coils 100 and 200. In some embodiments, the plane 58 may extend through the intermediate space 300a. In some embodiments, the plane 58 may extend through (e.g., intersect) a point equidistant in the thickness direction between the first and second transmitting coils 100 and 200 (e.g., equidistant between geometric centers of the first and second transmitting coils 100 and 200) or a point corresponding to a center (e.g., a geometric center) of the intermediate space 300a, and the first magnetic field shallow zone 51 may be centered in the thickness direction on the plane 58.

In some embodiments, the first magnetic field shallow zone 51 may include (e.g., be) a region where a magnitude of a magnetic field generated by the first and second transmitting coils 100 and 200 is lower than a set or threshold value.

In more detail, the first and second portions 130 and 140 of the first transmitting coil 100 may respectively include a first and second end of the first transmitting coil 100, and the first and second portions 230 and 240 of the second transmitting coil 200 may respectively include a first and second end of the second transmitting coil 200. For example, the first and second ends of the first transmitting coil 100 may correspond to the two first thick portions 120b (see FIG. 2) of the first transmitting coil 100, and the first and second ends of the second transmitting coil 200 may correspond to the two second thick portions 220b (see FIG. 2) of the second transmitting coil 200.

In some embodiments, the first magnetic field shallow zone 51 may include (e.g., be) a region where, when the first and second transmitting coils are driven with in-phase AC currents of a same magnitude, a first ratio of a first magnitude of a magnetic field at any point in the region to a second magnitude of a magnetic field at the first end of the first transmitting coil 100 (e.g., just inside the first rod 120 at a first end of the first rod 120) is less than a set value such as 0.30, 0.25, 0.20, 0.15, 0.10, 0.08, 0.05, 0.03, or 0.01. The first and second magnitudes may each be instantaneous magnitudes at a same point in time or may be magnitudes that are time-averaged over a set time span. The time span may be one or more periods (e.g., 1, 2, 5, 10, 20, 50, 100, or 1,000 periods) of the first AC current and/or the second AC current. In some embodiments, the time span is within a range of 0.01 second to 10 minutes.

The graph of FIG. 24 shows that, when the first and second transmitting coils 100 and 200 are driven with AC currents of a same magnitude and the first and second transmitting coils 100 and 200 are surrounded by air, the magnitude of the magnetic field generated by the first and second transmitting coils 100 and 200 is substantially reduced at portions of the line A-B outside of the first and second rods 120 and 220 and angularly between the first and second transmitting coils 100 and 200 compared to at and in end portions of the first and second rods 120 and 220. Referring to FIGS. 24 and 25, the graph of FIG. 25 shows that, when the first and second transmitting coils 100 and 200 are driven with AC currents of a same magnitude and the first and second transmitting coils 100 and 200 are surrounded by air, the magnitude of the magnetic field generated by the first and second transmitting coils 100 and 200 is substantially less along the line C-D angularly between the first and second transmitting coils 100 and 200 compared to at and in the end portions of the first and second rods 120 and 220.

In theory, when the first and second transmitting coils 100 and 200 are driven with in-phase AC currents of the same amplitude, there may be one or more isolated points in time over a period of the first AC current and/or the second AC current when the first and second transmitting coils 100 and 200 cease to generate magnetic fields, and the first ratio is undefined because the denominator is zero. However, it is to be understood that, when the first and second magnitudes of the first ratio are instantaneous magnitudes, the first and second magnitudes are magnitudes at a point of time different than points in time in which the first ratio may be undefined. It is to also be understood that when the first and second magnitudes of the first ratio are time-averaged magnitudes, the time-average does not include the first and second magnitudes at the isolated points in time where the first ratio may be undefined.

Because the magnetic field generated by the first and second transmitting coils 100 and 200 generally decreases as the distance from the first and second transmitting coils 100 and 200 increases, it will be understood that the region where the first ratio is below the set value may be further confined (e.g., truncated) by a shallow zone confinement region including all points that are (i) angularly between the first portions 130 and 230 in the plan view, and (ii) positioned in the thickness direction between a top surface of a topmost one of the first and second transmitting coils 100 and 200 and a bottom surface of another one of the first and second transmitting coils 100 and 200.

In some embodiments, the first magnetic field shallow zone 51 may include (e.g., be) a region where, when one of the first and second transmitting coils 100 and 200 is driven with AC current and another one of the first and second transmitting coils 100 and 200 is not driven, a second ratio of a first magnitude of a magnetic field at any point in the region to a second magnitude of a magnetic field at an end of the one of the first and second transmitting coils 100 and 200 (e.g., just inside the rod at an end of the rod of the one of the first and second transmitting coils 100 and 200) is less than a set value such as 0.30, 0.25, 0.20, 0.15, 0.10, 0.08, 0.05, 0.03, or 0.01. The first and second magnitudes may each be instantaneous magnitudes at a same point in time or may be magnitudes that are time-averaged over a set time span, as described herein. The graph of FIG. 26 shows that, when the second transmitting coil 200 is driven with AC current and the first transmitting coil 100 is not driven, and the first and second transmitting coils 100 and 200 are surrounded by air, the magnitude of the magnetic field generated by the first and second transmitting coils 100 and 200 is substantially reduced at portions of the line E-F outside of the first and second rods 120 and 220 and angularly between the first and second transmitting coils 100 and 200 compared to at and in an end portion of the second rod 220. Referring to FIGS. 26-27, the graph of FIG. 27 shows that, when the second transmitting coil 200 is driven with AC current and the first transmitting coil 100 is not driven, and the first and second transmitting coils 100 and 200 are surrounded by air, the magnitude of the magnetic field generated by the first and second transmitting coils 100 and 200 is substantially less along the line G-H angularly between the first and second transmitting coils 100 and 200 compared to at and in the end portion of the second rod 220.

In some embodiments, the first magnetic field shallow zone 51 may include a portion of a low-angle magnetic field plane that is parallel to the plan view (e.g., parallel to the X-Y plane) and between the first and second transmitting coils 100 and 200, where an angle between a magnetic field generated by the first and second transmitting coils 100 and 200 at the low-angle magnetic field plane to the low-angle magnetic field plane is less than a set angle such as 20 degrees, 15 degrees, 10 degrees, or 5 degrees. In some embodiments, the low-angle magnetic field plane is the plane 58. One or more of the electronic components 55 may be at the low-angle magnetic field plane, for example, may intersect the low-angle magnetic field plane or be spaced apart from the low-angle magnetic field plane in the thickness direction by less than a set distance. In some embodiments, the set distance may be a largest, smallest, or average thickness of the first transmitting coil 100 or 0.5, 0.25, 0.20, 0.15, 0.10, or 0.05 times any such thickness. The electronic components 55 at the low-angle magnetic field plane may be oriented to have their largest-area surface(s) generally parallel to the low-angle magnetic field plane. For example, the electronic components 55 at the low-angle magnetic field plane may be oriented to maximize their area in the plan view or to have an area in the plan view greater than a percentage of all possible orientations, such as 90%, 93%, 95%, 97%, or 99%.

Because the first and second axes 100A and 200A of the first and second transmitting coils 100 and 200 may be parallel in the plan view to the low-angle magnetic field plane and spaced apart in the thickness direction from the low-angle magnetic field plane by a relatively small distance compared to the lengths of the first and second transmitting coils 100 and 200, when one or both of the first and second transmitting coils 100 and 200 are driven with AC current, a direction of a magnetic field generated by the first and second transmitting coils 100 and 200 at the low-angle magnetic field plane may form a small angle to the low-angle magnetic field plane. Accordingly, the magnetic flux of the magnetic field generated by the first and second transmitting coils 100 and 200 through surfaces of electronic components 55 at the low-angle magnetic field plane and oriented to have their largest-area surface generally parallel with the low-angle magnetic field plane may be reduced.

The second, third, and fourth magnetic field shallow zones 52, 53, and 54 may each have any shape that the first magnetic field shallow zone 51 may have, and the second, third, and fourth magnetic field shallow zones 52, 53, and 54 may each have a shape that is the same as or different from the shape of the first magnetic field shallow zone 51. The second, third, and fourth magnetic field shallow zones 52, 53, and 54 may each be positioned and oriented in any manner similar to or the same as the first magnetic field shallow zone 51, and the second, third, and fourth magnetic field shallow zones 52, 53, and 54 may each be positioned and/or oriented in a manner that is the same as or different from the manner in which the first magnetic field shallow zone 51 is positioned and/or oriented. In some embodiments, the first and second axes 100A and 200A of the first and second transmitting coils 100 and 200 are perpendicular to each other in the plan view, and the first to fourth magnetic field shallow zones 51-54 are positioned in the plan view in four quadrants defined by the first and second transmitting coils 100 and 200.

Figure 28:
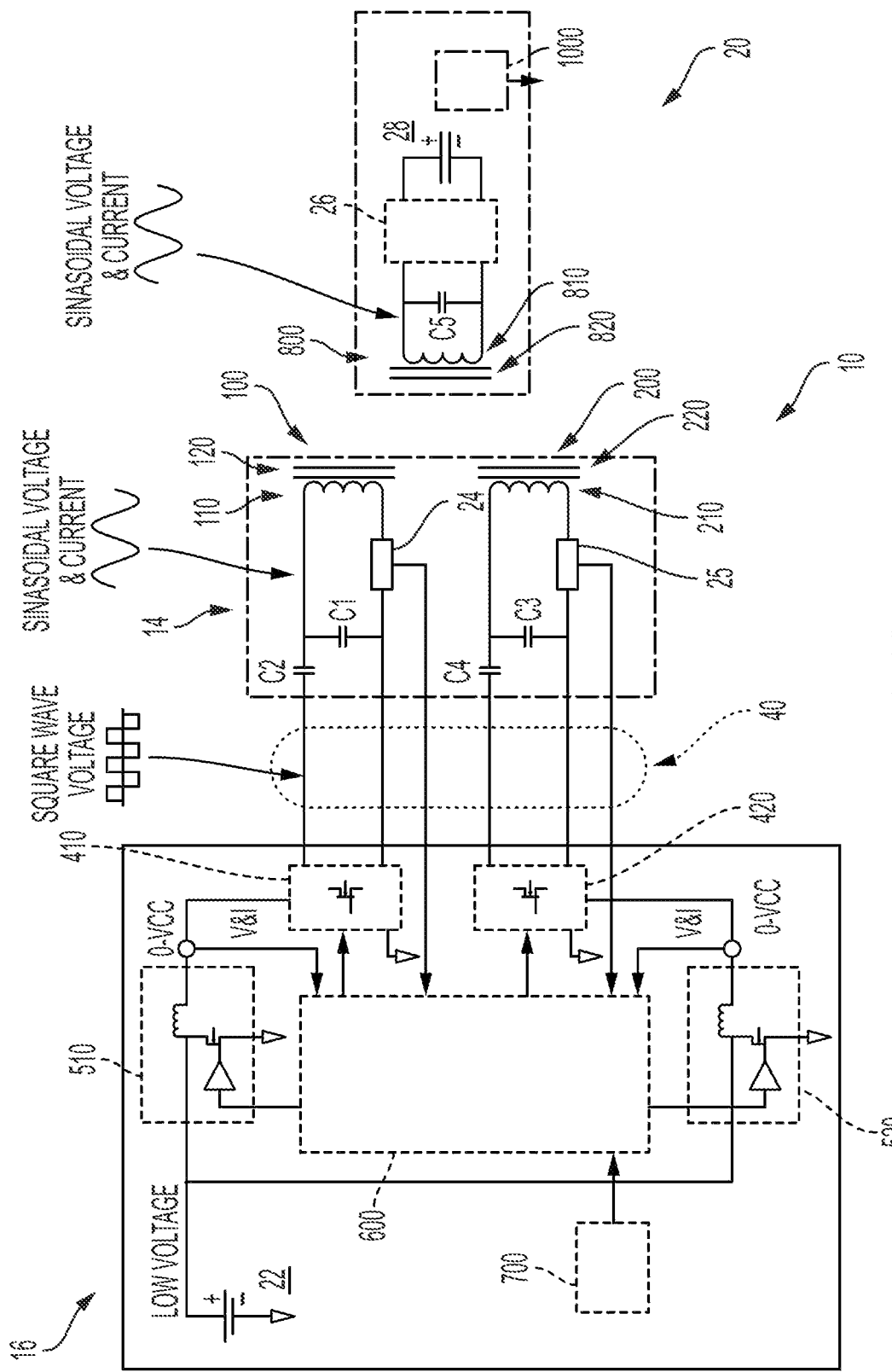
FIG. 28 shows a schematic view of a circuit diagram of the wireless power transfer system according to some embodiments.

FIG. 28 shows a schematic view of a circuit diagram of the wireless power transfer system according to some embodiments.

Referring to FIG. 28, the wireless power transfer device 10 may include the coil assembly 14, the electronics assembly 16, and a cable 40 coupled between the coil assembly 14 and the electronics assembly 16.

The coil assembly 14 may include the first and second transmitting coils 100 and 200, a first capacitor C1 coupled in parallel with the first wire 110 of the first transmitting coil 100, a second capacitor C2 coupled in series with the first capacitor C1 and first wire 110, a third capacitor C3 coupled in parallel with the second wire 210 of the second transmitting coil 200, a fourth capacitor C4 coupled in series with the third capacitor C3 and second wire 210, a first current sensor 24 coupled to the first wire 110, and a second current sensor 25 coupled to the second wire 210.

The wireless power transfer device 10 may include a first LC resonant circuit corresponding to the first transmitting coil 100 and a second LC resonant circuit corresponding to the second transmitting coil 200. The first LC resonant circuit includes the first wire 110, the first capacitor C1, and the second capacitor C2, and the second LC resonant circuit includes the second wire 210, the third capacitor C3, and the fourth capacitor C4. However, the present disclosure is not limited thereto. For example, in some embodiments, the first LC resonant circuit includes the first wire 110 and the first capacitor C1, and the second capacitor C2 is not included, and/or the second LC resonant circuit includes the second wire 210 and the third capacitor C3, and the fourth capacitor C4 is not included.

The first and second capacitors C1 and C2 may form an impedance matching network that matches the impedance of the first driver 410. The resonant frequency of the first LC resonant circuit may be defined by equation 1 below, $$f_{res1} = \frac{1}{2\pi\sqrt{L_{110}(C1_{cap} + C2_{cap})}},$$ [Equation 1]

wherein $f_{res1}$ is the resonant frequency of the first LC resonant circuit, $L_{110}$ is the inductance of the first wire 110, and $C1_{cap}$ and $C2_{cap}$ are the first and second capacitances of the first and second capacitors C1 and C2, respectively. The resonant frequency of the second LC resonant circuit may be defined in a manner similar to how the resonant frequency of the first LC resonant circuit is defined. In some embodiments, the resonant frequencies of the first and second LC resonant circuits are the same or similar, and an angle between the first and second axes 100A and 200A of the first and second transmitting coils may be within a range of 89 degrees to 91 degrees to avoid substantial coupling between the first and second transmitting coils 100 and 200 when the first transmitting coil 100 and/or the second transmitting coil 200 are driven.

A ratio of the second capacitance $C2_{cap}$ to the first capacitance $C1_{cap}$ may be set such that, when the first driver 410 produces its highest pulse voltage, the electronic device 20 will receive its required power dependent on a coupling coefficient between the electronic device 20 and the wireless power transfer device 10.

The first and second current sensors 24 and 25 are respectively configured to measure or sense a current flowing through the first and second wires 110 and 210 and to provide information about the current to the controller 600.

The electronics assembly 16 may include the first and second drivers 410 and 420, the first and second power modulation electronics 510 and 520, the controller 600, the receiver 700, and a permanent or rechargeable battery 22. The controller 600 may include a microcontroller or system on a chip that contains firmware and hardware. The controller 600 may be configured to output analog or digital signals to the first and second power modulation electronics 510 and 520 and to output digital square wave signals to the first and second drivers 410 and 420. The controller 600 may be configured to receive signals (e.g., voltage feedback) from the outputs of the first and second power modulation electronics 510 and 520, the first and second current sensors 24 and 25, and the receiver 700.

The first and second drivers 410 and 420 may output square wave voltages to the first and second LC resonant circuits. Sinusoidal voltage and current may be provided to the first and second wires 110 and 210 respectively in the first and second LC resonant circuits. Local feedback information may be provided to the controller 600 from the first and second current sensors 24 and 25, and global feedback information may be provided to the controller 600 from the receiver 700 that receives the global feedback information from the electronic device 20 (e.g., from the transmitter 1000). The local and/or global feedback information may be utilized in a feedback system, such as any feedback system described herein.

The electronic device 20 may include the receiver coil 800 comprising a receiver rod 820 and a receiver wire 810 wound around the receiver rod 820. The receiver rod 820 may include any material that the first rod 120 may include, and the receiver rod 820 may include a same or different material as the first rod 120 includes. The receiver wire 810 may be wound around the receiver rod 820, for example, to form a solenoid.

The electronic device 20 may include a fifth capacitor C5 coupled in parallel with the receiver wire 810 to form at least part of a third LC resonant circuit, a rechargeable battery 28, a power management system 26, and the transmitter 1000. In some embodiments, the third LC resonant circuit may include a sixth capacitor coupled in series with the fifth capacitor C5 and receiver wire 810. The fifth capacitor C5 and the sixth capacitor may form at least part of a capacitive matching network.

The power management system 26 may be configured to regulate system voltage and charging of the rechargeable battery 28, and may be configured to convert an AC voltage in the third LC resonant circuit to a DC voltage.

The transmitter 1000 may transmit information about a state of charge of the rechargeable battery 28, a voltage of the rechargeable battery 28, and/or a rectified voltage of the receiver coil 800 and/or of the third LC resonant circuit.

In some embodiments, the wireless power transfer device 10 is configured to pre-align, with the receiver coil 800 of the electronic device 20, a magnetic field to be generated by the wireless power transfer device 10 such that, in response to the wireless power transfer device 10 generating the magnetic field, the magnetic field is aligned, at the receiver coil 800, with the receiver coil 800.

In some embodiments, the wireless power transfer device 10 (e.g., the controller 600 of the wireless power transfer device 10) may be configured to determine (e.g., calculate, for example, via an algorithm) a magnetic field (e.g., configured to determine the magnetic field before generating the magnetic field), from among a plurality of directionally different potential magnetic fields that the wireless power transfer device 10 is configured to generate, that has, at the receiver coil 800, a direction aligned with the receiver coil 800. As utilized herein, reference to a direction of a magnetic field at the receiver coil 800 being aligned with the receiver coil 800 may include a direction of exact alignment (i.e., a direction parallel to an axis of the receiver coil 800) and a direction substantially optimally or suitably aligned (e.g., a direction within 15 degrees, 10 degrees, 5 degrees, 3 degrees, 1 degree, or 0.5 degrees from a direction closest to exact alignment) with the receiver coil 800 from among directions of the potential magnetic fields that the wireless power transfer device 10 is configured to generate. In some embodiments, based, for example, on the geometry of the wireless power transfer device 10 relative to the electronic device 20, the wireless power transfer device 10 is not able to generate a magnetic field having a direction at the receiver coil 800 that is exactly aligned with the receiver coil 800. However, the wireless power transfer device 10 may be configured to generate a plurality of directionally different magnetic fields having, at the receiver coil 800, different degrees of alignment with the receiver coil 800, including an optimal degree alignment (e.g., a degree of alignment closest to the exact alignment from among the different degrees of alignment), and the wireless power transfer device 10 may be configured to determine a magnetic field, from among the directionally different magnetic fields, having a degree of alignment with the receiver coil 800 that is the optimal degree of alignment or that deviates from the optimal degree of alignment by less than 15 degrees, 10 degrees, 5 degrees, 3, degrees, 1 degree, or 0.5 degrees.

In some embodiments, as explained herein, the wireless power transfer device 10 is configured to differentially drive the first and second transmitting coils 100 and 200 respectively with first and second currents (e.g., first and second AC currents) having controllably different amplitudes, and to thereby directionally control the magnetic field generated by the first and second transmitting coils 100 and 200. For example, a direction at a set position (e.g., at the receiver coil 800) of a potential magnetic field that the wireless power transfer device 10 is configured to generate may depend on a potential amplitude ratio of (i) an amplitude of a first current that the wireless power transfer device 10 is configured to drive the first transmitting coil 100 with to generate the potential magnetic field, to (ii) an amplitude of a second current that the wireless power transfer device 10 is configured to drive the second transmitting coil 200 with to generate the potential magnetic field. The wireless power transfer device 10 may be configured to determine (e.g., calculate, for example, by an algorithm) an amplitude ratio such that, in response to the first transmitting coil 100 being driven with a first current, the second transmitting coil 200 being driven with a second current, and a ratio of an amplitude of the first current to an amplitude of the second current being the amplitude ratio, the wireless power transfer device 10 will generate a magnetic field having, at the receiver coil 800, a direction aligned with the receiver coil 800. As utilized herein, reference to determining the amplitude ratio may include determining a ratio of amplitudes (e.g., from which any number of pairs of amplitudes of the first and second currents can be determined) and/or determining a pair of amplitudes of the first and second currents that satisfy the amplitude ratio. In some embodiments, the wireless power transfer device 10 may be configured to further determine a relative phase difference (e.g., in-phase corresponding to a relative phase difference of zero degrees, or a 180 degree relative phase difference) between the first and second currents such that, when the first and second transmitting coils are respectively driven with the first and second currents satisfying the amplitude ratio and the relative phase difference, the wireless power transfer device 10 generates the magnetic field having, at the receiver coil 800, the direction aligned with the receiver coil 800.

In some embodiments, the wireless power transfer device 10 is configured to determine the magnetic field that will have the direction aligned with the receiver coil 800 at the receiver coil 800 based on first and second reflected loads (or first and second reflected impedances) in the first and second LC resonant circuits of the wireless power transfer device 10. As described above, the first LC resonant circuit may include the first transmitting coil 100 (e.g., the first wire 110 of the first transmitting coil 100) and the first capacitor C1, and the second LC resonant circuit may include the second transmitting coil 200 (e.g., the second wire 210 of the second transmitting coil 200) and the third capacitor C3. The electronic device 20 may include the third LC resonant circuit including the receiver coil 800 (e.g., the receiver wire 810 of the receiver coil 800) and the fifth capacitor C5.

During driving of the first and second transmitting coils 100 and 200, the amplitude of the first current through the first transmitting coil 100 may be proportional to a first bus voltage provided by the first power modulation electronics 510 to the first driver 410, and the amplitude of the second current through the second transmitting coil 200 may be proportional to a second bus voltage provided by the second power modulation electronics 520 to the second driver 420. The first and second drivers 410 and 420 may respectively provide the first and second currents to the first and second transmitting coils 100 and 200 based, respectively, on the first and second bus voltages.

The amplitudes of the first and second currents respectively in the first and second transmitting coils 100 and 200 may also be affected by a reflected load (or reflected impedance) in each of the first and second LC resonant circuits that respectively results from the receiver coil 800 being coupled with the first and second transmitting coils 100 and 200. When the magnetic field generated by the first and second transmitting coils 100 and 200 has, at the receiver coil 800, a direction aligned with the receiver coil 800, the effect on the first and second currents resulting from the receiver coil 800 can be substantially the same. Accordingly, when the magnetic field generated by the first and second transmitting coils 100 and 200 has, at the receiver coil 800, the direction aligned with the receiver coil 800, a voltage ratio of the first bus voltage to the second bus voltage can be substantially the same as an amplitude ratio of the amplitude of the first current in the first transmitting coil 100 (e.g., as measured by the first current sensor 24) to the amplitude of the second current in the second transmitting coil 200 (e.g., as measured by the second current sensor 25). However, when the magnetic field generated by the first and second transmitting coils 100 and 200 has a direction at the receiver coil 800 that is not aligned with the receiver coil 800, the effect on the first and second currents resulting from the receiver coil 800 may differ, and the voltage ratio may differ from the amplitude ratio.

Accordingly, in some embodiments, the wireless power transfer device 10 may be configured to differentially drive the first and second transmitting coils 100 and 200 to generate a plurality of directionally different preliminary magnetic fields. In some embodiments, the wireless power transfer device 10 is configured to generate the plurality of preliminary magnetic fields to have different directions within a range of directions and at a set position (e.g., at the receiver coil 800 or at a position above an area of overlap between the first and second transmitting coils 100 and 200). For example, the wireless power transfer device 10 may be configured to generate the plurality of preliminary magnetic fields having directions at the set position that form an angle relative to one of the first and second transmitting coils 100 and 200 (e.g., relative to the first transmitting coil 100) that sequentially get larger as the preliminary magnetic fields are sequentially generated. Accordingly, the wireless power transfer device 10 can scan through a range of angles (e.g., 90 degrees or 180 degrees) via step changes in angle.

For each of the preliminary magnetic fields, the wireless power transfer device 10 may be configured to generate a corresponding comparison between a corresponding first reflected load (or first reflected impedance) in the first LC resonant circuit resulting from the receiver coil 800 and a corresponding second reflected load (or second reflected impedance) in the second LC resonant circuit resulting from the receiver coil 800. The wireless power transfer device 10 may be configured to determine the magnetic field (e.g., the amplitude ratio and the relative phase difference) based on the plurality of comparisons.

In some embodiments, for each of the preliminary magnetic fields, the wireless power transfer device may be configured to generate a corresponding comparison between (i) a corresponding preliminary voltage ratio of a corresponding first preliminary bus voltage provided by the first power modulation electronics 510 to a corresponding second preliminary bus voltage provided by the second variable power supply 520, and (ii) a corresponding preliminary amplitude ratio of an amplitude of a corresponding first preliminary current in the first transmitting coil 100 to an amplitude of a corresponding second preliminary current provided in the second transmitting coil 200. The wireless power transfer device 10 (e.g., the controller 600) may be configured to determine the magnetic field (e.g., the amplitude ratio and the relative phase difference) based on the plurality of comparisons.

The controller 600 may be configured to determine the first and second preliminary bus voltages based on the signals transmitted by the controller 600 to the first and second power modulation electronics 510 and 520. In some other embodiments, the controller 600 may be configured to receive feedback voltages (e.g., the first and second preliminary bus voltages) from the first and second power modulation electronics 510 and 520 and to determine the first and second preliminary bus voltages based on the feedback voltages received from the first and second power modulation electronics 510 and 520. In some embodiments, the first and second current sensors 24 and 25 may respectively be configured to measure the first and second preliminary currents in the first and second transmitting coils 100 and 200, and the controller 600 may be configured to receive the first and second preliminary currents from the first and second current sensors 24 and 25.

In some embodiments, the generating the corresponding comparison between the corresponding preliminary voltage ratio and the corresponding preliminary amplitude ratio includes generating a difference between the corresponding preliminary voltage ratio and the corresponding preliminary amplitude ratio. For example, the controller 600 may be configured to subtract a smaller one of the corresponding preliminary voltage ratio and the corresponding preliminary amplitude ratio from a larger one of the corresponding preliminary voltage ratio and the corresponding preliminary amplitude. In some other embodiments, the controller 600 may be configured to generate an absolute value of the difference between the corresponding preliminary voltage ratio and the corresponding preliminary amplitude. The controller 600 may determine that the magnetic field corresponds to (e.g., is the same as) the preliminary magnetic field whose corresponding comparison is smallest (or closest to zero) from among the plurality of comparisons.

In some embodiments, the generating the corresponding comparison between the corresponding preliminary voltage ratio and the corresponding preliminary amplitude ratio includes generating a ratio between the corresponding preliminary voltage ratio and the corresponding preliminary amplitude ratio. For example, the controller 600 may be configured to divide a larger one of the corresponding preliminary voltage ratio and the corresponding preliminary amplitude ratio from a smaller one of the corresponding preliminary voltage ratio and the corresponding preliminary amplitude (or vice versa). In some other embodiments, the controller 600 may be configured to always divide the corresponding preliminary voltage ratio from the corresponding preliminary amplitude ratio (or vice versa). The controller 600 may determine that the magnetic field corresponds to (e.g., is the same as) the preliminary magnetic field whose corresponding comparison is smallest (or closest to one) from among the plurality of comparisons.

The wireless power transfer device 10 may therefore be able to determine the magnetic field (e.g., the amplitude ratio and the relative phase difference) based on the reflected loads (or the reflected impedances) in the first and second LC resonant circuits.

In some embodiments, the wireless power transfer device 10 is configured to determine and/or confirm the magnetic field that will have the direction aligned with the receiver coil 800 at the receiver coil 800 based on power consumed by driving the first and second coils 100 and 200 in response to the wireless power transfer device 10 generating a plurality or preliminary magnetic fields (e.g., rotating a preliminary magnetic field continuously, or in a step-wise manner, through a range of angles). For example, the plurality of preliminary magnetic fields may be the plurality of preliminary magnetic fields utilized to determine the magnetic field based on the reflected impedances in the first and second LC circuits, and the wireless power transfer device 10 can separately determine the magnetic field based on the power consumed by driving the first and second coils 100 and 200 to generate the plurality of preliminary magnetic fields, in order to confirm that the magnetic field determined based on the reflected impedances in the first and second LC circuits is accurate.

The power consumed by the first and second coils 100 and 200 while driving the first and second coils 100 and 200 may be determined, for example, by feedback signals provided to the controller 600 from the first and second power modulation electronics 510 and 520. For example, the first and second power modulation electronics 510 and 520 may respectively provide first and second bus voltages and first and second bus currents to the first and second drivers 410 and 420 which, in turn, may drive the first and second coils 100 and 200. The wireless power transfer device 10 may be configured for the controller 600 to receive first and second feedback signals respectively from the first and second power modulations electronics 510 and 520 and that respectively include information about the first and second bus voltages and the first and second bus currents. Based on the information about the first and second bus voltages and the first and second bus currents, the wireless power transfer device 10 (e.g., the controller 600) may be configured to calculate (e.g., via an algorithm or equation, for example, an equation defining the consumed power in a coil as the product of bus voltage and bus current) how much power is consumed by driving the first and second coils 100 and 200. For example, the wireless power transfer device 10 may be configured to calculate a first power consumed by driving the first coil 100, a second power consumed by driving the second coil 200, and a sum of the first and second powers to obtain a consumed power.

For each of the plurality of preliminary magnetic fields generated by the wireless power transfer device 10, the wireless power transfer device 10 may be configured to calculate a corresponding consumed power that is a total power consumed by the first and second coils 100 and 200 while driving the first and second coils 100 and 200 to generate the preliminary magnetic field. The wireless power transfer device 10 may be configured to determine the magnetic field having a direction at the receiver coil 800 aligned with the receiver coil 800 based on the plurality of consumed powers. For example, the wireless power transfer device 10 may determine the magnetic field to correspond to (e.g., to be the same as) the preliminary magnetic field associated with the lowest consumed power from among the plurality of consumed powers.

This is because the quality factor (or Q factor) of the first and second coils 100 and 200 is greater, and less total power is consumed by the first and second coils 100 and 200, when a magnetic field generated by the wireless power transfer device 10 is more aligned with the receiver coil 800 compared to when the magnetic field is less aligned with the receiver coil 800. Accordingly, the preliminary magnetic field from among the plurality of preliminary magnetic fields that is most aligned with the receiver coil 800 should also require the least amount of total power consumption for driving the first and second coils 100 and 200 to generate the preliminary magnetic field.

In some embodiments, the wireless power transfer device 10 may determine the magnetic field based on the plurality of consumed powers to confirm that the magnetic field determined by the wireless power transfer device 10 via another process (e.g., any process disclosed herein) is accurate. For example, the wireless power transfer device 10 may generate a plurality of preliminary magnetic fields and determine the magnetic field based on information about reflected loads (or reflected impedances) in the first and second LC circuits, as disclosed herein. The wireless power transfer device 10 may also measure and/or calculate consumed powers respectively corresponding to the plurality of preliminary magnetic fields as they are generated, and may separately determine the magnetic field based on the plurality of consumed powers in order to confirm that the magnetic field determined based on the reflected loads (or reflected impedances) is accurate.

In some embodiments, the electronic device 20 may be configured such that power received via the receiver coil 800 is not consumed by other electronic components (e.g., to charge the rechargeable battery 28) of the electronic device 20 while the plurality of preliminary magnetic fields are generated. For example, the electronic device 20 may be configured to prevent (e.g., controllably prevent) other electronic components of the electronic device 20 from consuming power received in the receiver coil 800, for example, until set conditions are satisfied, such as receiving power in the receiver coil 800 for a time duration longer than a duration for which a preliminary magnetic field is to be generated. In some other embodiments, the electronic device 20 may be configured such that power received via the receiver coil 800 is consistently consumed (e.g., at a set, constant rate) by other electronic components of the electronic device 20 while the plurality of preliminary magnetic fields are generated.

The purpose for providing for consistent consumption of power received in the receiver coil 800 for all of the preliminary magnetic fields is that such power consumption can cause the power provided by the first and second power modulation electronics 510 and 520 (e.g., the first and second bus voltages) to increase in order to compensate for the consumption of the power received in the receiver coil 800 by the electronic components in the electronic device 20. Such increase in power provided by the first and second power modulation electronics 510 and 520 may affect the plurality of consumed powers associated with the first and second coils 100 and 200 and, if not consistent for all of the plurality of preliminary magnetic fields, may distort the determination (based on the plurality of consumed powers) of which magnetic field has a direction aligned with the receiver coil 800 at the receiver coil 800.

In some embodiments, the wireless power transfer device 10 may determine the magnetic field that will be aligned, at the receiver coil 800, with the receiver coil 800 based on power received in the receiver coil 800 in response to the wireless power transfer device 10 separately driving the first and second coils 100 and 200. For example, the wireless power transfer device 10 may determine the magnetic field based on (i) a first power received in the receiver coil 800 in response to the wireless power transfer device 10 driving the first coil 100 without driving the second coil 200, and (ii) a second power received in the receiver coil 800 in response to the wireless power transfer device 10 driving the second coil 200 without driving the first coil 100. In some embodiments, the first and second powers received in the receiver coil 800 may be respectively measured by the detector 900, and the electronic device 20 may be configured to transmit (e.g., via the transmitter 1000) information about the first and second powers received in the receiver coil 20 to the wireless power transfer device 10 (e.g., to the controller 600 via the receiver 700).

The first and second powers depend on how coupled (e.g., aligned) the first and second coils 100 and 200 are with the receiver coil 800 when the first and second coils 100 and 200 are separately driven. For example, the first power will be higher if the first coil 100 is more aligned, and thus more coupled, with the receiver coil 800 when the first coil 100 is driven compared to if the first coil 100 is less aligned, and thus less coupled, with the receiver coil 800.

Referring to FIG. 5A for convenience of description, in some embodiments, the wireless power transfer device 10 may calculate a power ratio of the second power to the first power. The power ratio will generally be equal to the tangent of a magnetic field angle formed between a first axis of the first coil 100 and a line parallel to a direction of a magnetic field (e.g., at a position above or below the area of overlap between the first and second coils 100 and 200) that is aligned with the receiver coil 800 at the receiver coil 800. For example, the magnetic field angle may be formed between the first axis of the first coil and the line in the X-Y plane shown in FIG. 5.

The wireless power transfer device 10 may calculate an arctangent of the power ratio to determine the magnetic field angle. Based on the magnetic field angle, the wireless power transfer device 10 may determine (e.g., via an algorithm) the magnetic field (e.g., determine a ratio of amplitudes of a first and second currents for respectively driving the first and second coils 100 and 200 to generate the magnetic field) that will be aligned, at the receiver coil 800, with the receiver coil 800. For example, if the first and second powers are the same, the wireless power transfer device 10 may calculate the power ratio to be 1.0, may calculate the arctangent of the power ratio to be 45 degrees, and may determine that the first and second coils 100 and 200 need to be driven with equal amplitudes to generate a magnetic field having a direction, at the receiver coil 800, that is aligned with the receiver coil 800.

Because the magnetic field angle can be measured either clockwise or counter-clockwise from the first axis of the first coil 100, the amplitude of ratios of the first and second currents for respectively driving the first and second coils 100 and 200 may not, by itself, be sufficient to determine whether the first and second coils 100 and 200 need to be driven in-phase or 180 degrees out-of-phase to generate the magnetic field having the direction, at the receiver coil 800, that is aligned with the receiver coil 800. In some embodiments, after the wireless power transfer device 10 determines the ratio of amplitudes, the wireless power transfer device 10 may determine whether to drive the first and second coils 100 and 200 in-phase or 180 degrees out-of-phase in order to generate the magnetic field based on (i) a third power received in the receiver coil 800 when the wireless power transfer device 10 drives the first and second coils 100 and 200 in-phase and with first and second amplitudes satisfying the amplitude ratio, and (ii) a fourth power received in the receiver coil 800 when the wireless power transfer device 10 drives the first and second coils 100 and 200 180 degrees out-of-phase and with the same first and second amplitudes satisfying the amplitude ratio. The third and fourth powers may be measured by the detector 900 and transmitted to the wireless power transfer device 10 (e.g., the controller 600) via the transmitter 1000. The larger of the third and fourth powers corresponds to the relative phase difference between the first and second currents.

For example, if the wireless power transfer device 10 determines that the ratio of amplitudes is 1.0, a third power may be measured in the receiver coil 800 and transmitted to the controller 600 in response to the wireless power transfer device 10 driving the first and second coils 100 and 200 in-phase and with equal amplitudes, and a fourth power may be measured in the receiver coil 800 and transmitted to the controller 600 in response to the wireless power transfer device 10 driving the first and second coils 100 and 200 180 degrees out-of-phase and with the same equal amplitudes. If the wireless power transfer device 10 determines that the third power is greater than the fourth power, the wireless power transfer device 10 can determine that the first and second coils 100 and 200 need to be driven both in-phase and with first and second currents satisfying the ratio of amplitudes in order to generate the magnetic field having a direction at the receiver coil 800 aligned with the receiver coil 800.

In some embodiments, after the magnetic field that will have a direction, at the receiver coil 800, aligned with the receiver coil 800 and the wireless power transfer device 10 generates the magnetic field to charge or power the electronic device 20, the wireless power transfer device 10 may perform a test to determine whether the magnetic field is still aligned with the receiver coil 800. The wireless power transfer device 10 may be configured to perform such a test automatically after a set amount of time has lapsed from when the wireless power transfer device 10 first generated the magnetic field, or the wireless power transfer device 10 may be configured to perform the test in response to set conditions occurring, such as receiving a signal (e.g., an error signal or an alert signal) from the electronic device 20 or a signal (e.g., from a user, physician, etc.) prompting the wireless power transfer device 10 to perform the test.

The test may include varying the direction of the magnetic field (e.g., as measured at a position such as at the receiver coil 800 and/or above or below the area of overlap between the first and second coils 100 and 200) by a set angular change (e.g., 5 degrees, 10 degrees, 15 degrees, etc.) in two opposite directions (e.g., clockwise and counter-clockwise) from the direction of the magnetic field that was determined to be aligned, at the receiver coil 800, with the receiver coil 800. A power received in the receiver coil 800 when the magnetic field is varied in one of the two opposite directions may be measured, and another power received in the receiver coil 800 when the magnetic field is varied in the other one of the two opposite directions may be measured. If the magnetic field is still aligned at the receiver coil 800 with the receiver coil 800, then these two measured powers should be substantially equal (e.g., within a threshold range of error). If the magnetic field is no longer aligned, then these two measured powers should substantially differ, and the wireless power transfer device 10 may re-align the magnetic field.

For each function, process, or operation that the wireless power transfer device 10 is disclosed herein as being configured to perform, the wireless power transfer device 10 may be configured in some embodiments to perform the function, process, or operation in response to executing (e.g., via the controller 600) computer-readable instructions for performing the function, process, or operation and that are stored in a memory (e.g., the first memory 27). For example, generating determinations, executing algorithms, etc. that the wireless power transfer device 10 is disclosed herein as being configured to do may be done by the wireless power transfer device 10 in response to executing computer-readable instructions that are stored in the memory and are for generating such determinations, executing such algorithms, etc. For each function, process, or operation that the electronic device 20 is disclosed herein as being configured to perform, the electronic device 20 may be configured in some embodiments to perform the function, process, or operation in response to executing (e.g., via a controller of the electronic device 20) computer-readable instructions for performing the function, process, or operation and that are stored in a memory (e.g., the second memory 29). The system and/or any other relevant devices or components according to embodiments of the present invention described herein may be implemented utilizing any suitable hardware, firmware (e.g. an application-specific integrated circuit), software, or a combination of software, firmware, and hardware. For example, the various components of the system may be formed on one integrated circuit (IC) chip or on separate IC chips. Further, the various components of the system may be implemented on a flexible printed circuit film, a tape carrier package (TCP), a printed circuit board (PCB), or formed on one substrate. Further, the various components of the system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although some embodiments of the present disclosure have disclosed herein, the present disclosure is not limited thereto, and the scope of the present disclosure is defined by the appended claims and equivalents thereof.

What is claimed is:

1. A wireless power transfer system comprising a wireless power transfer device, the wireless power transfer device comprising:
   a coil assembly, comprising:
      a first transmitting coil oriented along a first axis,
      a second transmitting coil above the first transmitting coil in an area of overlap between the first and second transmitting coils, and oriented along a second axis different from the first axis, and
      a nonmagnetic material magnetically decoupling the first transmitting coil from the second transmitting coil in the area of overlap between the first and second transmitting coils; and
   an electronics assembly, comprising at least one electronic component.

2. The wireless power transfer system of claim 1, wherein the wireless power transfer device comprises a cable electrically coupled between the electronics assembly and the coil assembly.

3. The wireless power transfer system of claim 2, wherein the at least one electronic component comprises:
   a driver configured to provide a first current to the first transmitting coil and a second current to the second transmitting coil, and
   a controller configured to control the first and second currents provided by the driver.

4. The wireless power transfer system of claim 3, wherein the cable comprises:
   a first twisted pair of internal wires to provide the first current from the driver to the first transmitting coil; and
   a second twisted pair of internal wires to provide the second current from the driver to the second transmitting coil.

5. The wireless power transfer system of claim 3, wherein the cable comprises one or more internal wires configured to provide information about current in the first transmitting coil and/or current in the second transmitting coil from the coil assembly to the electronics assembly.

6. The wireless power transfer system of claim 3, wherein the at least one electronic component comprises a receiver configured to wirelessly receive data and to transmit the data to the controller.

7. The wireless power transfer system of claim 3, wherein the at least one electronic component comprises power modulation electronics configured to provide power to the driver.

8. The wireless power transfer system of claim 2, wherein the electronics assembly comprises a battery.

9. The wireless power transfer system of claim 2, wherein a length of the cable is equal to or greater than a length of the first transmitting coil along the first axis.

10. The wireless power transfer system of claim 1, wherein the electronics assembly and the coil assembly are in a same container and are spaced apart from each other in the container by at least 0.25 times a length of the first transmitting coil along the first axis,
    wherein the at least one electronic component comprises a driver configured to provide a first current to the first transmitting coil and a second current to the second transmitting coil.

11. The wireless power transfer system of claim 2, wherein the coil assembly comprises:
    a first LC resonant circuit corresponding to the first transmitting coil and a second LC resonant circuit corresponding to the second transmitting coil.

12. The wireless power transfer system of claim 2, comprising an electronic device comprising a receiver coil.

13. A wireless power transfer system comprising a wireless power transfer device, the wireless power transfer device comprising:
    a first transmitting coil oriented along a first axis;
    a second transmitting coil on the first transmitting coil and oriented along a second axis different from the first axis;
    a nonmagnetic material magnetically decoupling the first transmitting coil from the second transmitting coil in an area of overlap between the first and second transmitting coils; and
    at least one electronic component in a magnetic field shallow zone angularly positioned in a plan view between a portion of the first transmitting coil extending in the plan view from the area of overlap and a portion of the second transmitting coil extending in the plan view from the area of overlap,
    wherein the magnetic field shallow zone comprises a region where, when the first and second transmitting coils are driven with in-phase AC currents of a same magnitude, a magnetic field generated by the first and second transmitting coils at any point in the region is substantially less in magnitude than the magnetic field at an end of the first transmitting coil.

14. The wireless power transfer system of claim 13, wherein the first and second axes are perpendicular to each other in the plan view and four magnetic field shallow zones including the magnetic field shallow zone are positioned in the plan view in four quadrants defined by the first and second transmitting coils, and
    wherein a plurality of electronic components are in the four magnetic field shallow zones.

15. The wireless power transfer system of claim 13, wherein the at least one electronic component comprises at least one selected from among a capacitor, a transistor, a resistor, an inductor, a diode, a transducer, a transformer, and a current sensor.

16. The wireless power transfer system of claim 13, wherein a ratio of a first magnitude of the magnetic field at any point in the region to a second magnitude of the magnetic field at the end of the first transmitting coil is less than 0.2.

17. The wireless power transfer system of claim 13, wherein the region has:
a planar shape in the plan view of a 90 degree sector of a circle having a radius equal to or less than a distance on the first axis between a first point corresponding to the end of the first transmitting coil and a second point corresponding to an edge of the area of overlap proximal to the end of the first transmitting coil; and
a thickness in a thickness direction perpendicular to the plan view that is uniform over the planar shape and less than an average thickness of the first transmitting coil, and
wherein the region is centered in the thickness direction on a plane that is parallel to the plan view and equidistant between the first and second transmitting coils in the thickness direction.

18. The wireless power transfer system of claim 13, wherein the magnetic field shallow zone comprises a portion of a low-angle magnetic field plane parallel to the plan view that is equidistant between the first and second transmitting coils in a thickness direction perpendicular to the low-angle magnetic field plane.

19. The wireless power transfer system of claim 13, wherein the magnetic field shallow zone comprises a portion of a low-angle magnetic field plane parallel to the plan view and between the first and second transmitting coils where, when the first and second transmitting coils are driven with AC current, an angle between a magnetic field generated by the first and second transmitting coils to the low-angle magnetic field plane is less than 15 degrees.

20. The wireless power transfer system of claim 19, wherein an electronic component of the at least one electronic component is in the low-angle magnetic field plane.

21. The wireless power transfer system of claim 13, comprising an LC resonant circuit corresponding to the first transmitting coil and comprising a first capacitor in the magnetic field shallow zone.

22. The wireless power transfer system of claim 21, comprising a second LC resonant circuit corresponding to the second transmitting coil and comprising a second capacitor in the magnetic field shallow zone.

23. The wireless power transfer system of claim 13, comprising an electronic device comprising a receiver coil.

24. A wireless power transfer system comprising a wireless power transfer device, the wireless power transfer device comprising:
a first transmitting coil oriented along a first axis;
a second transmitting coil above the first transmitting coil in an area of overlap between the first and second transmitting coils, and oriented along a second axis different from the first axis;
a nonmagnetic material magnetically decoupling the first transmitting coil from the second transmitting coil in the area of overlap between the first and second transmitting coils;
a first LC resonant circuit corresponding to the first transmitting coil; and
a second LC resonant circuit corresponding to the second transmitting coil.

25. The wireless power transfer system of claim 24, wherein the first transmitting coil comprises a first rod and a first wire wound around the first rod, and the second transmitting coil comprises a second rod and a second wire wound around the second rod, and
wherein the first LC resonant circuit comprises the first wire and a first capacitor coupled in parallel with the first wire, and the second LC resonant circuit comprises the second wire and a second capacitor coupled in parallel with the second wire.

26. The wireless power transfer system of claim 25, wherein the first LC resonant circuit further comprises a third capacitor coupled in series with the first capacitor and first wire, and the second LC resonant circuit further comprises a fourth capacitor coupled in series with the second capacitor and second wire.

27. The wireless power transfer system of claim 24, wherein the wireless power transfer device comprises:
a coil assembly comprising the first transmitting coil, the second transmitting coil, the nonmagnetic material, the first LC resonant circuit, and the second LC resonant circuit; and
an electronics assembly comprising a driver to provide a first current to the first LC resonant circuit and a second current to the second LC resonant circuit, and
wherein the electronics assembly is spaced apart from the coil assembly.

28. The wireless power transfer system of claim 24, comprising an electronic device comprising a receiver coil.

* * * * *